United States Patent
Talukder et al.

(10) Patent No.: US 12,491,262 B2
(45) Date of Patent: Dec. 9, 2025

(54) GENE DELIVERY AGENTS

(71) Applicant: TIBA Biotech LLC, Cambridge, MA (US)

(72) Inventors: Poulami Talukder, Medford, MA (US); Maria Varghese, Wilmington, MA (US); Heliang Song, Winchester, MA (US); Nathan Ivanowsky, Medford, MA (US)

(73) Assignee: TIBA Biotech LLC, Cambridge, MA (US)

( * ) Notice: Subject to any disclaimer, the term of this patent is extended or adjusted under 35 U.S.C. 154(b) by 0 days.

(21) Appl. No.: 18/932,511

(22) Filed: Oct. 30, 2024

(65) Prior Publication Data
US 2025/0144233 A1 May 8, 2025

Related U.S. Application Data

(60) Provisional application No. 63/594,495, filed on Oct. 31, 2023.

(51) Int. Cl.
| | | |
|---|---|---|
| *A61K 48/00* | (2006.01) | |
| *A61K 9/51* | (2006.01) | |
| *C07C 69/34* | (2006.01) | |
| *C07C 229/16* | (2006.01) | |
| *C07C 323/12* | (2006.01) | |
| *C07D 207/46* | (2006.01) | |
| *C07D 249/04* | (2006.01) | |
| *C07F 9/10* | (2006.01) | |
| *C07F 9/6509* | (2006.01) | |
| *C07F 9/6518* | (2006.01) | |
| *C07H 15/04* | (2006.01) | |
| *C07H 15/26* | (2006.01) | |

(52) U.S. Cl.
CPC ........ *A61K 48/0033* (2013.01); *A61K 9/5123* (2013.01); *C07C 69/34* (2013.01); *C07C 229/16* (2013.01); *C07C 323/12* (2013.01); *C07D 207/46* (2013.01); *C07D 249/04* (2013.01); *C07F 9/10* (2013.01); *C07F 9/650952* (2013.01); *C07F 9/6518* (2013.01); *C07H 15/04* (2013.01); *C07H 15/26* (2013.01)

(58) Field of Classification Search
CPC ...... A61K 48/00; A61K 9/5123; C07C 69/34; C07C 279/16; C07C 323/12; C07D 207/46; C07D 249/04
See application file for complete search history.

(56) References Cited

U.S. PATENT DOCUMENTS

| | | | |
|---|---|---|---|
| 11,859,201 B2 | 1/2024 | Talukder et al. | |
| 2010/0075255 A1 | 3/2010 | Taguchi | |
| 2012/0296048 A1 | 11/2012 | Etrych et al. | |
| 2016/0015823 A1 | 1/2016 | Demeule et al. | |
| 2016/0287715 A1 | 10/2016 | Charles et al. | |
| 2016/0339106 A1 | 11/2016 | Shanta | |
| 2017/0079916 A1 | 3/2017 | Khan et al. | |
| 2018/0155328 A1 | 6/2018 | Song et al. | |
| 2019/0023921 A1 | 1/2019 | Sato et al. | |
| 2019/0048049 A1 | 2/2019 | Dasseux | |
| 2019/0240354 A1 | 8/2019 | Abrams et al. | |
| 2020/0306191 A1 | 10/2020 | Schariter et al. | |
| 2021/0128488 A1* | 5/2021 | Du | A61K 9/5123 |
| 2022/0380299 A1* | 12/2022 | Benenato | C07C 279/32 |
| 2023/0149562 A1 | 5/2023 | Talukder et al. | |

FOREIGN PATENT DOCUMENTS

| | | |
|---|---|---|
| JP | 2018537403 A1 | 12/2018 |
| WO | WO-2011/006453 A1 | 1/2011 |
| WO | WO-2018/154387 A1 | 8/2018 |
| WO | WO-2019/191341 A1 | 10/2019 |
| WO | WO-2020/132196 A1 | 6/2020 |
| WO | WO-2021/207020 A1 | 10/2021 |
| WO | 2022212838 A1 | 10/2022 |

OTHER PUBLICATIONS

Wenqing Li et al., Biomimetic nanoparticles deliver mRNAs encoding costimulatory receptors and enhance T cell mediated cancer immunotherapy, Nature Communications, 12, 7263. (Year: 2021).*
Wenaing Li et al., Biomimetic nanoparticles deliver mRNAs encoding costimulatory receptors and enhance T cell mediated cancer immunotherapy, Nature Communications, 12, 7263. (Year: 2021).*
J. Wang et al., Disulfide Linkage: A Potent Strategy in Tumor-Targeting Drug Discovery, Current Medicinal Chemistry, 19, 2976-2983. (Year: 2012).*
Alabi, C.A. et al., Multiparametric approach for the evaluation of lipid nanoparticles for siRNA delivery, Proc Natl Acad Sci, 110(32):12881-6, Aug. 6, 2013.
Cui, C. et al., Cellular uptake, intracellular trafficking, and antitumor efficacy of doxorubicin-loaded reduction-sensitive micelles, Biomaterials, 34, 3858-3869 (2013).
Duncan, R. et al., Dendrimer biocompatibility and toxicity, Adv. Drug Delivery Rev., 57, 2215-2237 (2005).
Huang, Y.-F. et al., Nanoparticle-mediated IgE-Receptor Aggregation and Signaling in RBL Mast Cells, Journal of American Chemical Society, 131, 17328-17334 (2009).

(Continued)

*Primary Examiner* — Jake M Vu
*Assistant Examiner* — Jagadishwar R Samala
(74) *Attorney, Agent, or Firm* — Morse, Barnes-Brown & Pendleton, P.C.; Martin Z. Zhang, Esq.

(57) ABSTRACT

Nanoparticle compositions for delivery of nucleic acids to subjects including aminoalkyl branched lipid-like molecules as carriers, and therapeutic or immunogenic nucleic acid agents enclosed within the nanoparticle containing are described. Also provided are methods for treating or preventing diseases or conditions in a subject by administering the nanoparticle compositions that provide immune responses and synergistic therapeutic or preventive effects.

24 Claims, 8 Drawing Sheets

(56) References Cited

OTHER PUBLICATIONS

Leung, A. K. K. et al., Lipid Nanoparticles Containing siRNA Synthesized by Microfluidic Mixing Exhibit an Electron-Dense Nanostructured Core, The Journal of Physical Chemistry C, 116, 18440-18450 (2012).
Li, Wenqing et al., Biomimetic nanoparticles deliver mRNAs encoding costimulatory receptors and enhance T cell mediated cancer immunotherapy, Nature Communications, 12:7264 (2021).
PubChem SID 463550556 Structure, Apr. 28, 2022, 5 pages.
Ryu, J.H. et al., Redox-sensitive disassembly of amphiphilic copolymer based micelles, Langmuir, 26(10):7086-92, May 18, 2010.
Shen, Z. et al., Development of a Library of Disulfide Bond-Containing Cationic Lipids for mRNA Delivery, Pharmaceutics, 15, 477 (2023).
Yang, J.P. et al., Time-dependent maturation of cationic liposome-DNA complex for serum resistance, Gene Therapy, 5, 380-387 (1998).
Zuhorn, I. S. et al., Nonbilayer Phase of Lipoplex-Membrane Mixture Determines Endosomal Escape of Genetic Cargo and Transfection Efficiency, Molecular Therapy, 11, 801-810 (2005).
International Search Report issued in PCT Application No. PCT/US2024/053740, dated Feb. 5, 2025.
Akiyama, et al., "Synthesis of Novel Polyesteramine Dendrimers by Divergent and Convergent Methods," Tetrahedrone, 69:6810-6820, (2013).
Amis, E. J. et al. "Preparation and Characterization of Polymer/Dendrimer Blends", Project Report, Polymers Division, National Institute of Standards and Technology, (2000).
Barnard, A. et al. "Degradable self-assembling dendrons for gene delivery: experimental and theoretical insights into the barriers to cellular uptake", J Am Chem Soc. 133(50): 20288-300, (2011).
Barnard, A. et al. "Effects of a PEG additive on the biomolecular interactions of self-assembled dendron nanostructures", Org. Biomol. Chem. 10: 8403-8409, (2012).
Boussif, O. et al. "A versatile vector for gene and oligonucleotide transfer into cells in culture and in vivo: Polyethylenimine" (1995) Proc. Natl. Acad. Sci. U.S.A. 92: 7297-7301.
Cao, et al., "Synthesis and Unimolecular Micelles of Amphiphilic Dendrimer-Like Star Polymer with Various Functional Surface Groups," Macromolecules, 44:1500-1512, (2011).
Carlmark, et al., "Dendritic Architectures Based on bis-MPA: Functional Polymeric Scaffolds for Application-Driven Research," Chem. Soc. Rev., 42:5858-5879, (2013).
Carnahan, M. A. and Grinstaff, M. W. "Synthesis and Characterization of Poly(glycerol-succinic acid) Dendrim", Macromolecules 34: 7648-7655, (2001).
Carnahan, M. A. and Grinstaff, M. W. "Synthesis and Characterization of Polyether-Ester Dendrimers from Glycerol and Lactic Acid", J. Am. Chem. Soc. 123: 2905-2906, (2001).
Carnahan, M. A. and Grinstaff, M. W. "Synthesis of Generational Polyester Dendrimers Derived from Glycerol and Succinic or Adipic Acid", Macromolecules 39: 609-616, (2006).
Cong, L. et al. "Multiplex Genome Engineering Using CRISPR/Cas Systems" (2013) Science 339(6121): 819-823.
Dufes, C. et al. "Dendrimers in gene delivery", Adv. Drug Delivery Rev. 57: 2177-2202, (2005).
Extended Search Report for EP patent application 21785142.7 dated Oct. 21, 2024.
Geall, A. J. et al. "Nonviral delivery of self-amplifying RNA vaccines", Proc Natl Acad Sci U S A. 109(36): 14604-9, (2012).
Ghobril, C. et al. "Dendrimers in nuclear medical imaging", New Journal of Chemistry 36(2): 310-323, (2012).
Gomes, C. P. "Translating chitosan to clinical delivery of nucleic acid-based drugs", MRS Bull. 39: 60-70, (2014).
Han, et al., "Convergent Synthesis of PAMAM Dendrimers Containing Tetra(ethyleneoxide) at Core Using Click Chemistry," Bull. Korean Chem. Soc., 33(10):3501-3504, (2012).
Han, S. et al. "Sugar Functionalized Synergistic Dendrimers for Biocompatible Delivery of Nucleic Acid Therapeutics", Polymers 10(9): 1034, (2018).

Hanurry, E. Y. et al. "In vitro siRNA delivery via diethylenetriamine- and tetraethylenepentamine-modified carboxyl group-terminated Poly(amido)amine generation 4.5 dendrimers", Materials Science and Engineering 106 (110245): 1-11, (2020).
Hassett, K. J. et al. "Optimization of Lipid Nanoparticles for Intramuscular Administration of mRNA Vaccines"Mal Ther Nuc, leic Acids 15: 1-11, (2019).
Hong, S. J. et al. "Sugar-based gene delivery systems: Current knowledge and new perspectives", Carbohydr Polym. 181: 1180-1193, (2018).
Hsu, H. J. et al. "Poly(ethylene glycol) Corona Chain Length Controls End-Group-Dependent Cell Interactions of Dendron Micelles", Macromolecules. 4 7: 6911-6918, (2014).
Jinek, M. et al. "A programmable dual RNA-guided DNA endonuclease in adaptive bacterial immunity", Science 337(6096): 816-821, (2012).
Jones, C. H. et al. "Overcoming nonviral gene delivery barriers: perspective and future", Mol. Pharmaceutics 10: 4082-4098, (2013).
Kadhim, A. "The synthesis of star copolymers for the delivery of macromolecular guest and photodynamic therapy", Doctoral Thesis, University of Sheffield, (2018).
Ledin, et al., "Convergent Assembly and Surface Modification of Multifunctional Dendrimers by Three Consecutive Click Reactions," Chem. Eur. J., 17:839-846, (2011).
Mellet, C. O. et al. "Cyclodextrin-based gene delivery systems", Chem. Soc. Rev. 40: 1586-1608, (2011).
Mendes, L. P. et al. "Dendrimers as Nanocarriers for Nucleic Acid and Drug Delivery in Cancer Therapy", Molecules 22(9): 1401, (2017).
Mintzer, M. A. and Simanek, E. E. "Nonviral Vectors for Gene Delivery", Chem. Rev. 109: 259-302, (2009).
Mintzer, M. A., and Grinstaff, M. W. "Biomedical applications of dendrimers: a tutorial", Chem. Soc. Rev. 40: 173-190, (2011).
Mortell, K. H. et al. "Recognition specificity of neoglycopolymers prepared by ring-opening metathesis polymerization", Journal of the American Chemical Society 118: 2297-2298, (1996).
Mui, B. L. et al. "Influence of Polyethylene Glycol Lipid Desorption Rates on Pharmacokinetics and Pharmacodynamics of siRNA Lipid Nanoparticles", Molecular therapy. Nucleic acids 2(12): e139, (2013).
Mukherjee, S. et al. "Water-soluble polyacetylene: a promising tool for sustainable drug delivery?", Therapeutic Delivery 8(11): 929-932, (2017).
Nishikawa, M. and Huang, L. "Nonviral vectors in the new millennium: delivery barriers in gene transfer", Hum. Gene Ther. 12: 861-870, (2001).
Non-Final Office Action for U.S. Appl. No. 17/917,365 dated Jun. 26, 2025.
Nouri, A. et al. "Insight into the role of N,N-dimethylaminoethyl methacrylate (DMAEMA) conjugation onto poly (ethylenimine): cell viability and gene transfection studies", J. Mater. Sci. Mater. Med. 23: 2967-2980, (2012).
Pandita, D. et al. "Gene delivery into mesenchymal stem cells: a biomimetic approach using RGD nanoclusters based on poly-(amidoamine) dendrimers," Biomacromolecules, 12:472-481, (2011).
Percec, V. et al. "Modular synthesis of amphiphilic Janus glycodendrimers and their self-assembly into glycodendrimersomes and other complex architectures with bioactivity to biomedically relevant lectins", J Am Chem SoÑ. 135(24): 9055-77, (2013).
PubChem-SI D-439633012.
Ravina, M. et al. "Core-shell dendriplexes with sterically induced stoichiometry for gene delivery", Macromolecules 43: 6953-6961, (2010).
Reichmuth, A. M. et al. "mRNA vaccine delivery using lipid nanoparticles", Therapeutic Delivery 7(5): 319-334, (2016).
Rodrigues, J. et al. "Poly(alkylidenamines) dendrimers as scaffolds for the preparation of low-generation ruthenium based metal-lodendrimers", New J. Chem. 35: 1938-1943, (2011).
Santos, J. L. et al. "Functionalization of poly(amidoamine) dendrimers with hydrophobic chains for improved gene delivery in mesenchymal stem cells", J. Controlled Release 144:55-64, (2010).
Santos, J. L. et al. "Osteogenic differentiation of mesenchymal stem cells using PAMAM dendrimers as gene delivery vectors" (2009) J. Controlled Release 134: 141-148.

(56) References Cited

OTHER PUBLICATIONS

Santos, J. L. et al. "Receptor-mediated gene delivery using PAMAM dendrimers conjugated with peptides recognized by mesenchymal stem cells", Mal. Pharmaceutics 7(3):763-774, (2010).

Tang, Y. et al. "Apoptosis of A549 cells by small interfering RNA targeting survivin delivery using poly-β-amino ester/ guanidinylated O-carboxymethyl chitosan nanoparticles", Asian J. Pharm. Sci. 15: 121-128, (2020).

Thomas et al., "Progress and problems with the use of viral vectors for gene therapy", Nature Reviews, 4: 346-338. (2003).

Twibanire et al., "Polyester Dendrimers," Polymers, 4:794-879, (2012).

Welsh, D. J. et al. "'On-off' multivalent recognition: degradable dendrons for temporary highaffinity DNA binding", Angew. Chem., Int. Ed. 48: 4047-4051, (2009).

World Health Organization "WHO manual on animal influenza diagnosis and surveillance", 5 Rev. 1, (2002).

Yan, et al., "Functional Polyesters Enable SElectrice siRNA Delivery to Lung Cancer Over Matched Normal Cells," PNAS, pp. E5702-E5710, (Sep. 12, 2016).

Zhao, J. et al. "Polyester-based nanoparticles for nucleic acid delivery", Materials Science & Engineering C. 92: 983-994, (2018).

Zhou, et al., "Modular Degradable Dendrimers Enable Small RNAs to Extend Survival in an Aggressive Liver Cancer Model," PNAS, 113(3):520-525, (Jan. 19, 2016).

Invitation to Pay Additional Search Fees issued in PCT Application No. PCT/US2025/037123 dated Sep. 15, 2025.

\* cited by examiner

NP1: SEAP Replicon RNA-Compound 8 (formulated with pH 3 buffer)
NP2: SEAP Replicon RNA-Compound 8 (formulated with pH 5 buffer)

NP1: SEAP Replicon RNA-Compound 8 (formulated with pH 3 buffer)
NP2: SEAP Replicon RNA-Compound 8 (formulated with pH 5 buffer)

GENE DELIVERY AGENTS

CROSS REFERENCE TO RELATED APPLICATION

This application claims the benefit of priority to U.S. Provisional Application No. 63/594,495 filed Oct. 31, 2023, the entire content of which is incorporated by reference.

FIELD OF INVENTION

The disclosure relates to aminoalkyl branched lipid-like molecules as carriers for efficient delivery of nucleic acids to a subject for treating or preventing diseases and/or disorders, and nanoparticle compositions comprising the carriers and nucleic acids. The disclosure also relates to methods of formulating the nanoparticle compositions and methods of treating diseases and/or disorders in the subjects with such nanoparticle compositions.

BACKGROUND

There remains a need to design novel nucleic acid carriers with multifunctional properties that can efficiently package and deliver genetic materials to a patient's cells for therapeutic effects. An ideal nucleic acid delivery vehicle should be biodegradable to prevent accumulation and subsequent cytotoxicity (see Duncan et al., 2005, Adv. Drug Delivery Rev. 57, 2215-22). Biodegradable drug carriers should be stable in the plasma during delivery and can be degraded in the cytosolic environment to facilitate release of genetic materials.

Phospholipids have been used in nucleic acid delivery. Commonly used transfection agent Lipofectamine 2000 is a 3:1 mixture of cationic lipids and phospholipid 1,2-dioleoyl-sn-glycero-3-phosphoethanolamine (DOPE). See Yang et al., Gene Therapy 5, 380-387 (1998). While these phospholipids help solubilize RNAs, they also improve transfection efficiency by forming non-bilayer structures during endosomal membrane fusion, resulting in the destabilization of endosomal membrane and release of cargo. See Leung et al., the Journal of Physical Chemistry C, 116, 18440-18450 (2012); and Sehorn et al., Molecular Therapy 11, 801-810 (2005).

Glycolipids are another class of membrane lipids with potential application as nucleic acid delivery agents. These carbohydrate-containing lipids help to maintain the stability of the cell membrane and also facilitate cellular recognition.

Nevertheless, both phospholipids and glycolipids suffer from low delivery efficiency and weak stability. There is a need to develop novel nucleic acid carriers to improve gene delivery by enhanced cellular uptake and payload release.

SUMMARY

The present invention is based on an unexpected discovery that certain aminoalkyl lipid-like compounds are very effective in delivering therapeutic or immunogenic nucleic acid agents.

Accordingly, one aspect of the invention relates to compounds of Formula I:

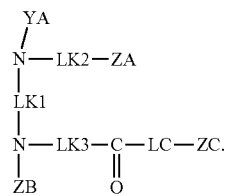

In the formula above,

YA is H, $C_1$-$C_4$ alkyl, $C_2$-$C_4$ alkenyl, or $C_2$-$C_4$ alkynyl;

ZA is H, halo, hydroxyl, $C_1$-$C_{30}$ amino, $C_1$-$C_{30}$ amido, $C_1$-$C_{30}$ carbonyl, $C_1$-$C_{30}$ carboxylate, sugar, diazolyl, triazolyl, phosphate, ethylene glycol (including its derivatives such as O—$CH_2$—$CH_2$—OReg, Reg being H or $C_1$-$C_6$ alkyl), or $C_4$-$C_{30}$ polyethylene glycol (namely, (O—$CH_2$—$CH_2$)$_{npeg}$$R_{PEG}$, npeg being 2-15 and $R_{PEG}$ being H or $C_1$-$C_6$ alkoxy);

ZB is H or

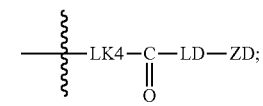

each of LC or LD is $CH_2$ or 0;

each of ZC and ZD, independently, is $C_1$-$C_{30}$ alkyl, $C_2$-$C_{30}$ alkenyl, or $C_2$-$C_{30}$ alkynyl;

LK1 is $C_3$-$C_8$ alkylene, $C_3$-$C_8$ alkenylene, $C_3$-$C_8$ alkynylene, or alkylene-heterocycloalkylene-alkylene;

each of LK2, LK3, and LK4, independently, is a bond, $C_1$-$C_8$ alkylene, $C_2$-$C_8$ alkenylene, $C_2$-$C_8$ alkynylene, or alkylene-heterocycloalkylene-alkylene; and the compound has 20 to 200 carbon atoms.

Compounds of Formula I can have one or any combinations of the following features:

i. each of alkyl, alkylene, alkenyl, alkenylene, alkynyl, alkynylene, alkylene-heterocycloalkylene-alkylene, amino, amido, carbonyl, carboxylate is unsubstituted or substituted with one or more of halo, hydroxyl, $C_1$-$C_6$ amino, $C_2$-$C_6$ carbamate, $C_2$-$C_{20}$ carboxylate, $C_2$-$C_{20}$ carbonyl, aryl, $C_1$-$C_{10}$ phosphate, ethylene glycol, $C_4$-$C_{30}$ polyethylene glycol, disulfanyl, diazolyl, triazolyl, or sugar; and each of diazolyl, triazolyl, phosphate and sugar is unsubstituted or substituted with halo, hydroxyl, alkyl, alkenyl, alkynyl, $C_1$-$C_6$ amino, $C_2$-$C_6$ carbamate, $C_2$-$C_{20}$ carboxylate, $C_2$-$C_{20}$ carbonyl, aryl, $C_1$-$C_{10}$ phosphate, ethylene glycol, $C_4$-$C_{30}$ polyethylene glycol, disulfanyl, diazolyl, triazolyl, nucleobase or sugar;

ii. disulfanyl is unsubstituted or substituted with one or more of halo, hydroxyl, aryl, and $C_1$-$C_{20}$ carboxylate; each of diazolyl and triazolyl is unsubstituted or substituted with one or more of halo, $C_1$-$C_{20}$ alkyl, $C_2$-$C_{20}$ alkenyl, and $C_2$-$C_{20}$ alkynyl; and the compound has 40 to 100 carbon atoms and at least a moiety selected from disulfanyl, diazolyl, triazolyl, phosphate, ethylene glycol, polyethylene glycol, and sugar;

iii. The compound of any one of claims 1-3, wherein YA is H or $C_1$-$C_4$ alkyl, and alkyl is unsubstituted or substituted with one or more groups selected from hydroxyl, halo, sugar, $C_1$-$C_6$ amino, $C_1$-$C_6$ carbamate, $C_4$-$C_{30}$ polyethylene glycol, ethylene glycol, phosphate, nucleobase, imidazole, morpholine, pyrrolidine, piperidine and piperazine, acetyl, methylsulfonyl, methylformamido, dimethylformamido, methylthioforamido, dimethyl-thioformamido, (E)-N'-cyano-N-methylformimidamido, (E)-N'-cyano-N,N-dimethylformimidamido, (E)-N'-nitroformimidamido, (E)-N,N-dimethyl-N'-nitroformimidamido, (E)-N'-methoxyformimidamido, (E)-N'-sulfamoylformimidamido, thiazoyl, 2-(methylamino)-3,4-dioxocyclobut-1-en-1-yl, 2-(dimethylamino)-3,4-dioxocyclobut-1-en-1-yl, 2-(methyl-carbamoyl)acetyl, and malonamido;

iv. YA is H, —CH$_3$, —C$_2$H$_5$, —C$_3$H$_7$, —C$_2$H$_4$OH, —C$_3$H$_6$OH, —C$_2$H$_4$N(CH$_3$)$_2$, —C$_3$H$_6$N(CH$_3$)$_2$, —C$_2$H$_4$O(CO)NHCH$_3$, C$_3$H$_6$OC$_{14}$H$_{19}$O$_9$, —C$_3$H$_6$O(CO)NHCH$_3$, or —C$_3$H$_6$OP(O)(OC$_2$H$_5$)$_2$.

v. LK1 is —(CH$_2$)$_3$—, —(CH$_2$)$_4$—, or

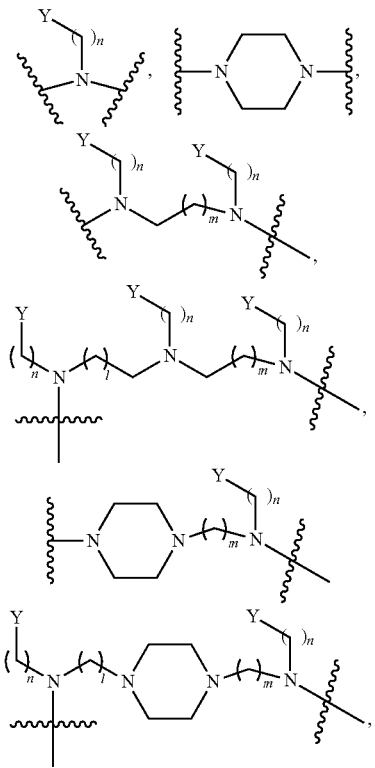

in which each of l, m, n independently is 0 to 20; Y is H, —OH, —OMe, —NMe$_2$,

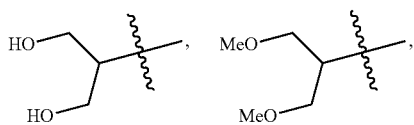 [SMILES: *C(CO)CO ; *C(COC)COC]

heterocycloalkyl, aryl, or heteroaryl; preferably, LK1 is —(CH$_2$)$_3$—, —(CH$_2$)$_4$—, or

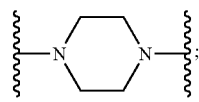

vi. each of LK2, LK3, and LK4, independently, is —(CH$_2$)$_2$— or —(CH$_2$)$_3$—;

vii. each of LC and LD is O.

viii ZA is C$_2$-C$_{20}$ amino, C$_2$-C$_{20}$ amido, C$_2$-C$_{20}$ carboxylate, diazolyl, triazolyl, or disulfanyl, each of amino, amido, carboxylate, or disulfanyl is unsubstituted or substituted with one or more groups selected from halo, hydroxyl, disulfanyl, carboxylate, sugar, phosphate, ethylene glycol and C$_4$-C$_{30}$ polyethylene glycol; and each of diazolyl and triazolyl is unsubstituted or substituted with one or more groups selected from halo, hydroxyl, alkyl, alkenyl, alkynyl, disulfanyl, carboxylate, sugar, phosphate, ethylene glycol, and C$_4$-C$_{30}$ polyethylene glycol;

ix. ZA contains one or more groups selected from hydroxyl, sugar, phosphate, ethylene glycol, and C$_4$-C$_{10}$ polyethylene glycol;

x. ZA is C$_2$-C$_{20}$ amino substituted with one or more of —C(O)—O-ZA2-XA-XA-ZA3, —C(O)—O-ZA2-(XA-XA-ZA3)$_2$, —C(O)—O-ZA2-(XA-XA-ZA3)$_3$, —C(O)—O-ZA2-diazolyl-ZA4, —C(O)—O-ZA2-triazolyl-ZA4, —C(O)—O-ZA4, in which XA is CH$_2$ or S; ZA2 is C$_4$-C$_{10}$ alkylene, C$_4$-C$_{10}$ alkenylene, or C$_4$-C$_{10}$ alkynylene; and each of ZA3 and ZA4, independently, is C$_1$-C$_{30}$ alkyl, N(CH$_3$)$_2$, or NHCH$_3$. ZA3 can be hydroxy, halogen, isoprenyl, tert-butyl amino, dimethylamino, C$_1$-C$_{12}$ amino, acylamino, alkoxy, aryl, aryloxy, heteroaryl; one or more carbon atoms in aliphatic, aryl, heteroaliphatic, or heteroaryl groups mentioned above can be further substituted with hydroxyl, halo, amino, C$_1$-C$_{12}$ alkyl, C$_2$-C$_{12}$ alkenyl, C$_1$-C$_{12}$ alkylamino, acylamino, alkoxy, aryl, arylamino, aryloxy, heteroaryl;

xi. ZB is H, ZB1-C(O)—O-ZB2-XB—XB-ZB3, ZB1-C(O)—O-ZB2-(XB—XB-ZB3)$_2$, ZB1-C(O)—O-ZB2-(XB—XB-ZB3)$_3$, -ZB1-C(O)—O-ZB2-diazolyl-ZB4, -ZB1-C(O)—O-ZB2-triazolyl-ZB4, -ZB1-C(O)—O-ZB4, in which XB is CH$_2$ or S; ZB1 is C$_1$-C$_4$ alkylene; ZB2 is C$_4$-C$_{10}$ alkylene, C$_4$-C$_{10}$ alkenylene, or C$_4$-C$_{10}$ alkynylene; and each of ZB3 and ZB4, independently, is C$_1$-C$_{30}$ alkyl, N(CH$_3$)$_2$, or NHCH$_3$;

xii. ZB is H, —(CH$_2$)$_{nb1}$—C(O)—O—(CH$_2$)$_{nb2}$—XB—XB—(CH$_2$)$_{nb3}$, —(CH$_2$)$_{nb1}$—C(O)—O—(CH$_2$)$_{nb2}$-diazolyl-Z, —(CH$_2$)$_{nb1}$—C(O)—O—(CH$_2$)$_{nb2}$-triazolyl-Z, —(CH$_2$)$_{nb1}$—C(O)—O-Z, in which XB is CH$_2$ or S; Y is H, —CH$_3$, —C$_2$H$_5$, —C$_3$H$_7$, —CH$_2$CH$_2$OH, —CH$_2$CH$_2$CH$_2$OH, —CH$_2$CH$_2$—N(CH$_3$)$_2$, —CH$_2$CH$_2$CH$_2$N(CH$_3$)$_2$, —CH$_2$CH$_2$OC(O)—NHCH$_3$, —CH$_2$CH$_2$CH$_2$OC(O)—NHCH$_3$; Z is C$_1$-C$_{30}$ alkyl, N(CH$_3$)$_2$, or NHCH$_3$; nb1 is 1-4; nb2 is 4-10; and nb3 is 1-20;

xiii. The compound of any one of claims 1-12, wherein ZC is ZC2-XC—XC-ZC3, ZC2-(XC—XC-ZC3)$_2$, ZC2-(XC—XC-ZC3)$_3$, ZC1-C(O)—O-ZC2-XC—XC-ZC3, -ZC2-diazolyl-ZC4, -ZC2-triazolyl-ZC4, ZC4, in which XC is CH$_2$ or S, preferably S; ZC1 is C$_1$-C$_4$ alkylene; ZC2 is C$_4$-C$_{10}$ alkylene, C$_4$-C$_{10}$ alkenylene, or C$_4$-C$_{10}$ alkynylene; and each of ZC3 and ZC4, independently, is C$_1$-C$_{30}$ alkyl, N(CH$_3$)$_2$, or NHCH$_3$;

xiv. ZC is Z, —(CH$_2$)$_{nc2}$—XC—XC—(CH$_2$)$_{nc3}$, —(CH$_2$)$_{nc1}$—C(O)—O—(CH$_2$)$_{nc2}$-diazolyl-Z, or —(CH$_2$)$_{nc2}$-triazolyl-Z, in which XC is CH$_2$ or S; Z is C$_1$-C$_{30}$ alkyl, N(CH$_3$)$_2$, or NHCH$_3$;

nc1 is 1-4, nc2 is 4-10, and nc3 is 1-20;

xv. ZA contains one or more groups selected from hydroxyl, sugar, phosphate, ethylene glycol, and C$_4$-C$_{10}$ polyethylene glycol; each of LK3 and LK4 is —$(CH_2)_2$—; ZB is —$(CH_2)_2$—C(O)—O—$(CH_2)_{nb2}$—XB—XB-ZB3; ZC is —$(CH_2)_{nc2}$—XC—XC-ZC3; each of XC and XB is S; each of nb2 and nc2, independently, is 5-8, preferably 6; and each of ZB3 and ZC3, independently, is $C_6$-$C_{12}$ alkyl;

xvi. ZC and ZD, independently, is preferably $C_4$-$C_{12}$ (e.g., $C_4$-$C_{10}$, $C_4$-$C_8$, and $C_6$) alkylene substituted with $C_2$-$C_{30}$ (e.g., $C_3$-$C_{25}$, $C_4$-$C_{20}$, and $C_6$-$C_{12}$) disulfanyl, in which disulfanyl contains a straight or branched alkyl;

xvii. ZA is preferably $C_2$-$C_{30}$ (e.g., $C_3$-$C_{25}$, $C_6$-$C_{20}$, $C_{16}$, and $C_{18}$) amido containing alkyl or alkenyl substituted with hydroxyl, phosphate, or sugar; alternatively, ZA is $C_2$-$C_{30}$ (e.g., $C_3$-$C_{25}$, $C_4$-$C_{20}$, $C_5$, $C_{16}$, and $C_{18}$) secondary or tertiary amino containing alkyl or alkenyl substituted with hydroxyl, phosphate, sugar, carboxylate, or disulfanyl; and xviii. the compound is a compound of Formula 1a, 1b, 1c, 1d, 1e, 1f, 1g, 1h, or 1i:

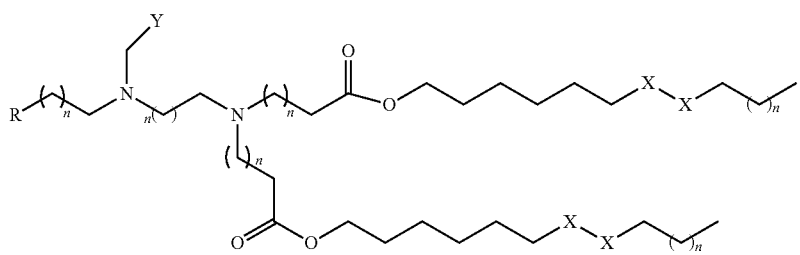

Formula 1a

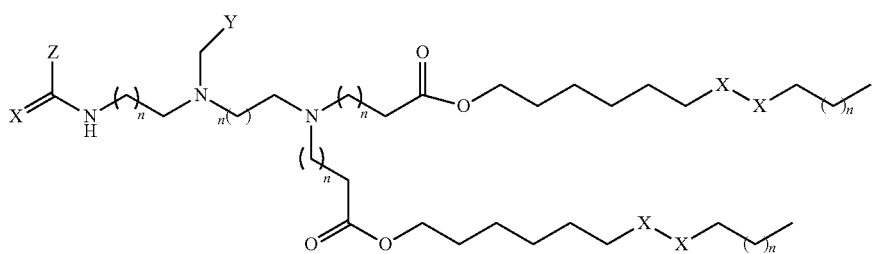

Formula 1b

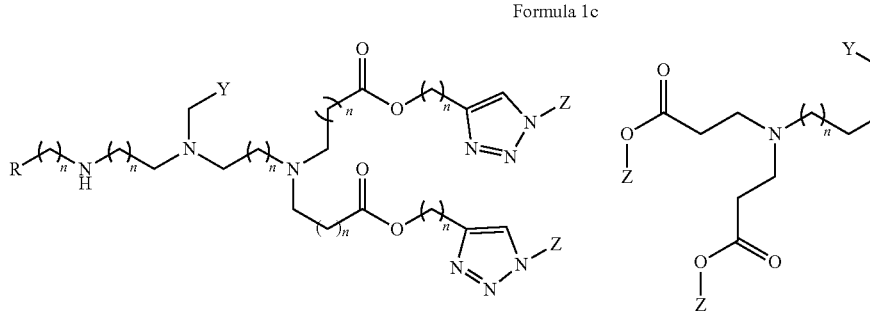

Formula 1c

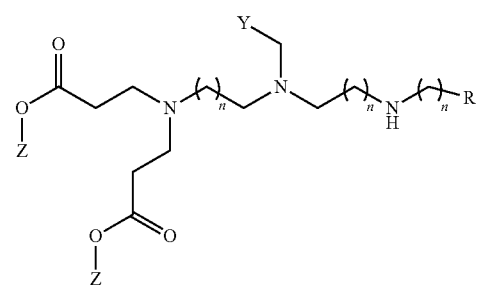

Formula 1d

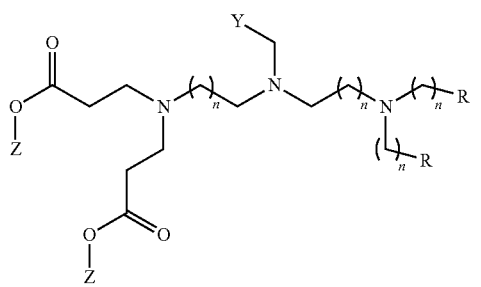

Formula 1e

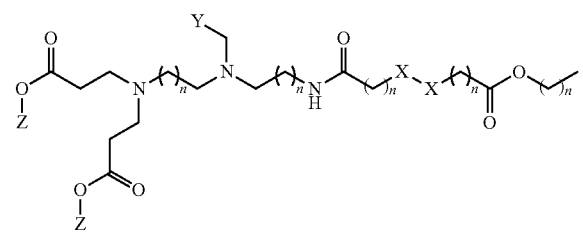

Formula 1f

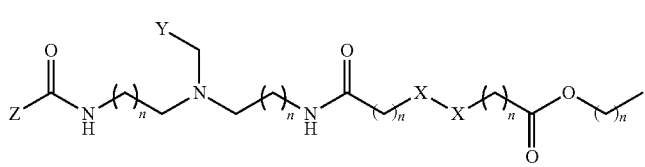

Formula 1g

Formula 1h

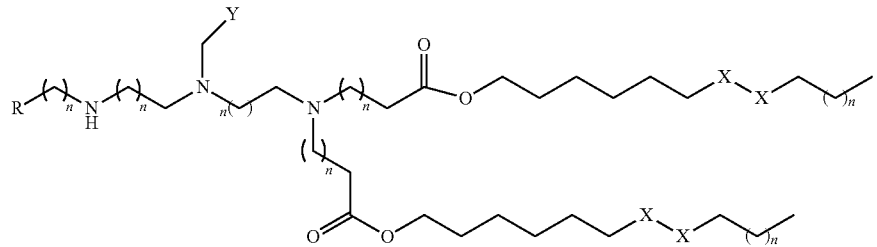

Formula 1i

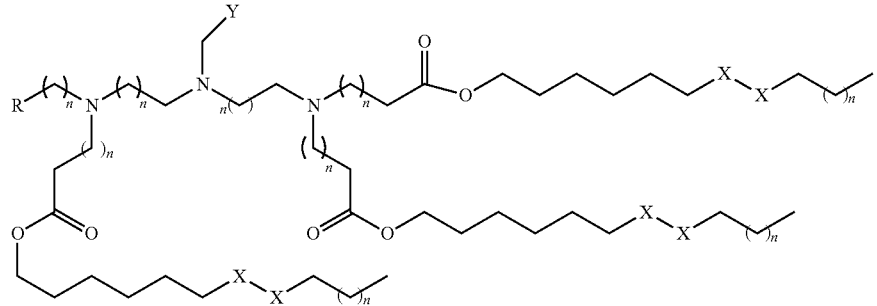

in which X is CH$_2$ or S; Y is H, X is CH$_2$ or S; Y is H, CH$_3$, C$_2$H$_5$, C$_3$H$_7$, CH$_2$CH$_2$OH, CH$_2$CH$_2$CH$_2$OH, CH$_2$CH$_2$N(CH$_3$)$_2$, CH$_2$CH$_2$CH$_2$N(CH$_3$)$_2$, CH$_2$CH$_2$OC(O)—NHCH$_3$, CH$_2$CH$_2$CH$_2$OC(O)NHCH$_3$; Z is C$_1$-C$_{30}$ alkyl, N(CH$_3$)$_2$, or NHCH$_3$; R is OH, OCH$_3$, CH$_3$, N(CH$_3$)$_2$, CF$_3$, sugar, phosphate, ethylene glycol, or C$_4$-C$_{30}$ polyethylene glycol; and n is 0 to 20.

A subset of the compounds of Formula I have a structure of Formula 1j below:

Formula 1j

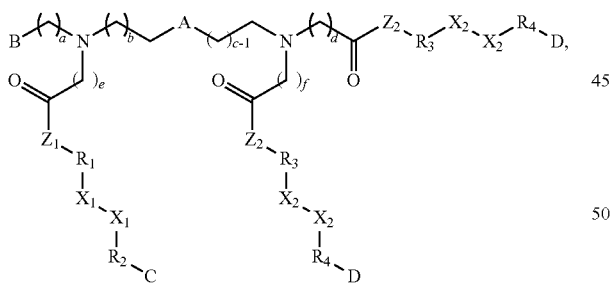

in which Z1, Z2, X1, X2 independently is CH$_2$, S, O; B can be selected from hydrogen, hydroxy, amino, dimethylamino, acylamino, trifluoromethyl, ethylene glycol, polyethylene glycol, nucleobase, imidazole, morpholine, pyrrolidine, piperidine, piperazine, sugar or phosphate moiety. Non-limiting examples of sugar are furanose monosaccharide (e.g., xylo-, ribo-, or arabinofuranose), pyranose monosaccharide (e.g., glucose, mannose, galactose), disaccharide (e.g., lactose, trehalose), or polysaccharide (e.g., cyclodextrin), and the like; A is an amine linker selected from

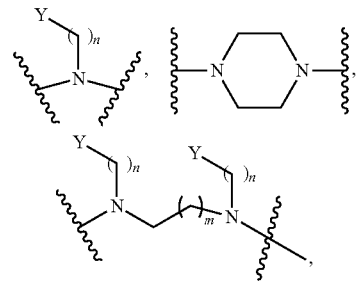

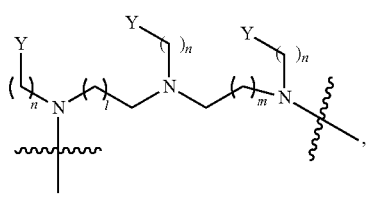

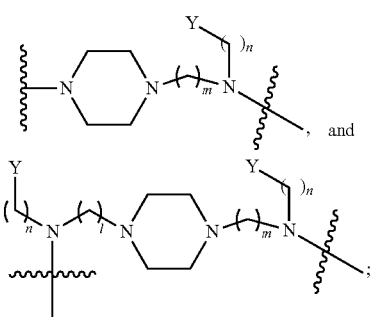

l, m, n independently is 0 to 20;
Y is —H, —OH, —OMe, —NMe2,

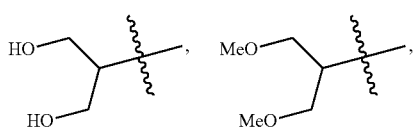 [SMILES: *C(CO)CO ; *C(COC)COC]

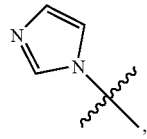

aryl or heteroaryl. Examples of aryl or heteroaryl include:

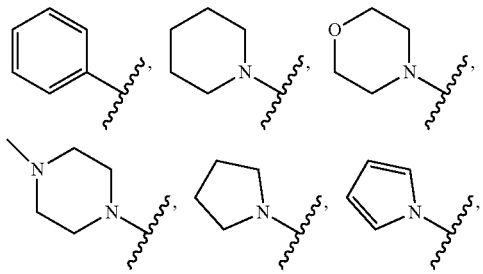

wherein each of R1, R2, R3 and R4, independently a C1-C24 bivalent aliphatic radical, a bivalent aryl radical, a C1-C24 bivalent heteroaliphatic radical, or a bivalent heteroaryl radical. C and D can be selected from hydrogen, hydroxy, halogen, isoprenyl, tert-butyl amino, dimethylamino, C1-C12 alkylamino, acylamino, alkoxy, aryl, arylamino, aryloxy, heteroaryl One or more carbon atoms in aliphatic, aryl, heteroaliphatic, or heteroaryl groups mentioned above can be further substituted with hydroxyl, halo, amino, $C_1$-$C_{12}$ alkyl, $C_2$-$C_{12}$ alkenyl, $C_1$-$C_{12}$ alkylamino, acylamino, alkoxy, aryl, arylamino, aryloxy, or heteroaryl.

Shown below are exemplary compounds of this invention.

Compound 3

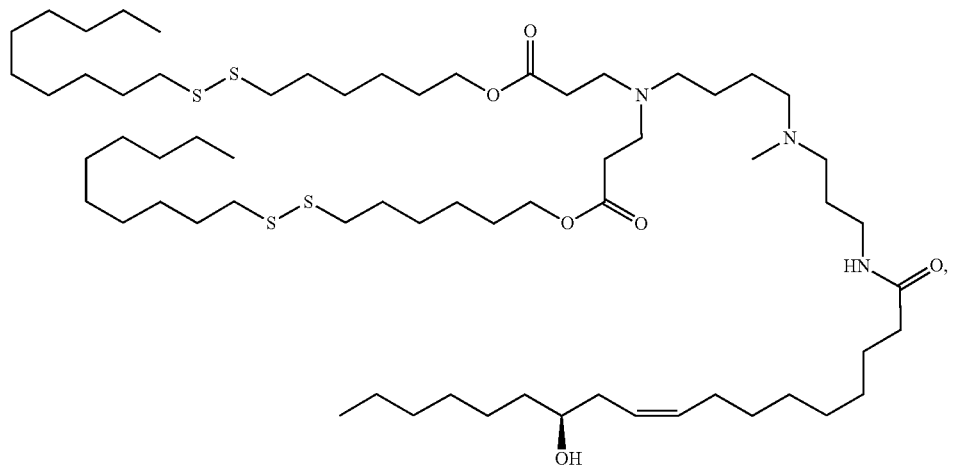

Compound 5

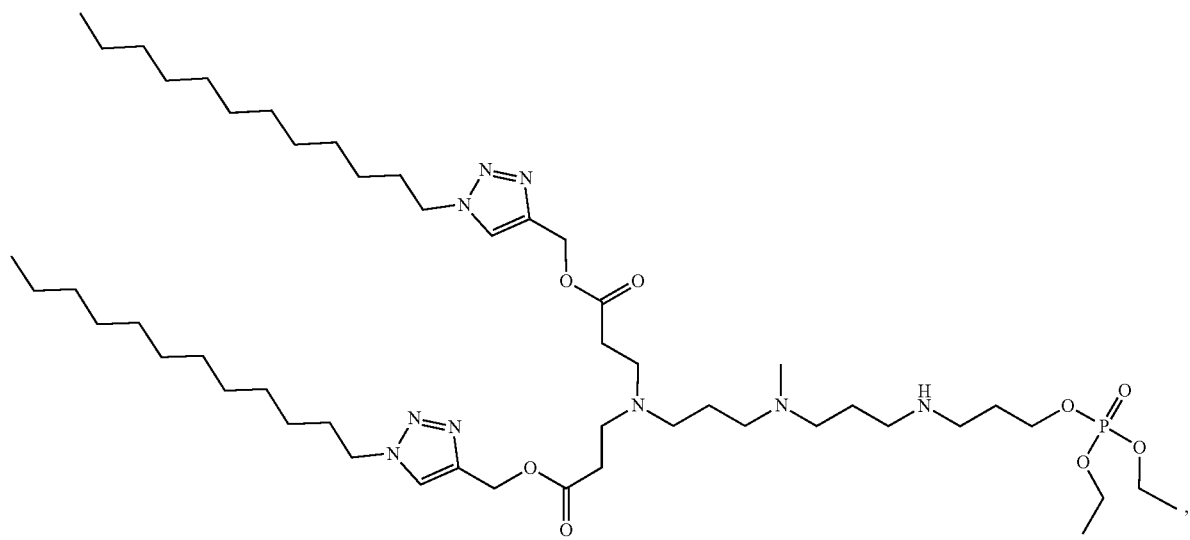

-continued
Compound 6
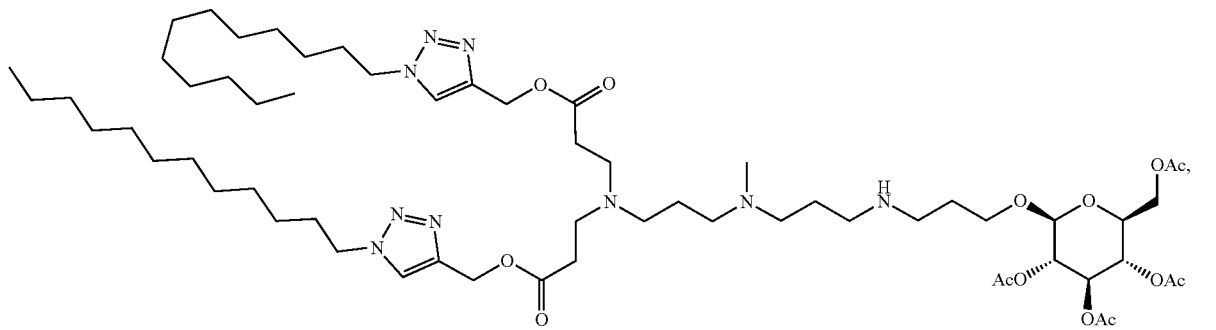
Compound 8
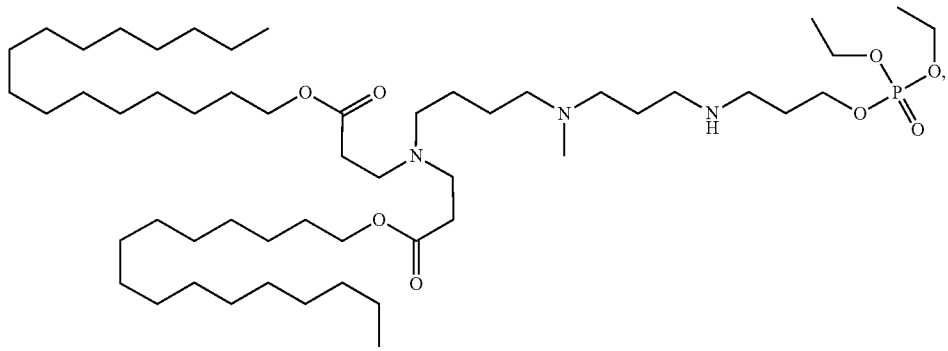
Compound 9
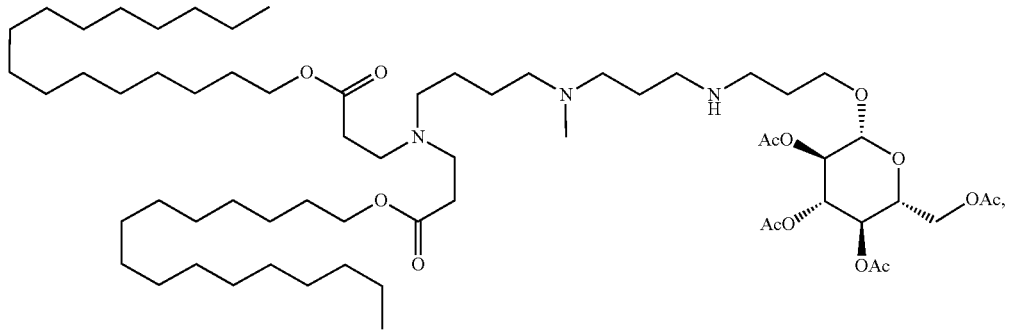
Compound 13
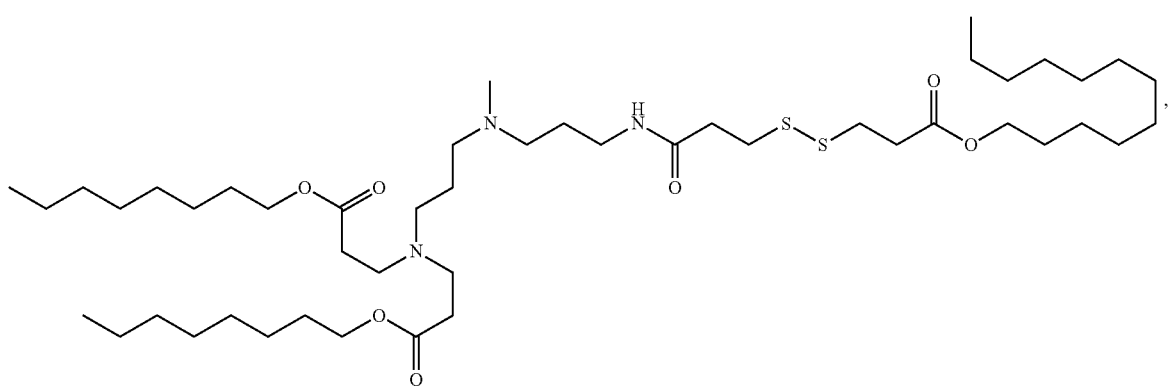

Compound 15
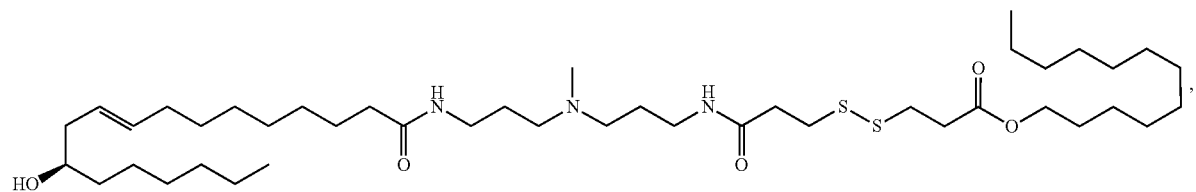
Compound 18
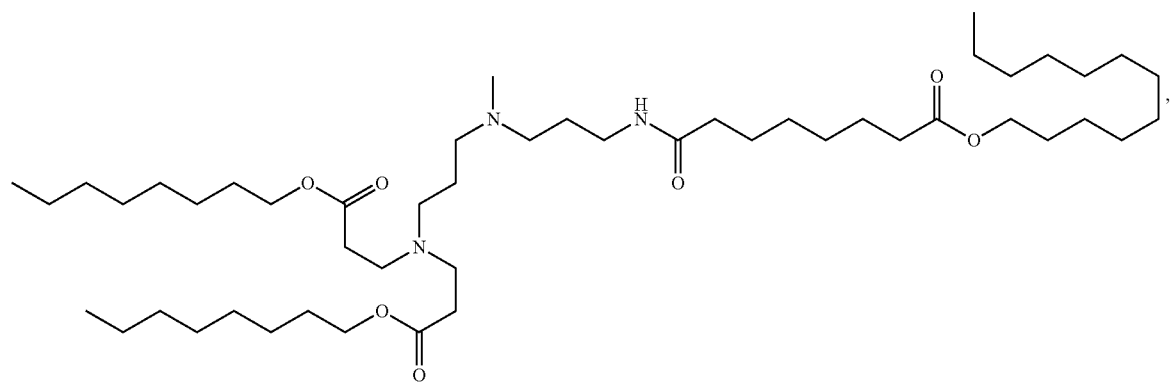
Compound 20
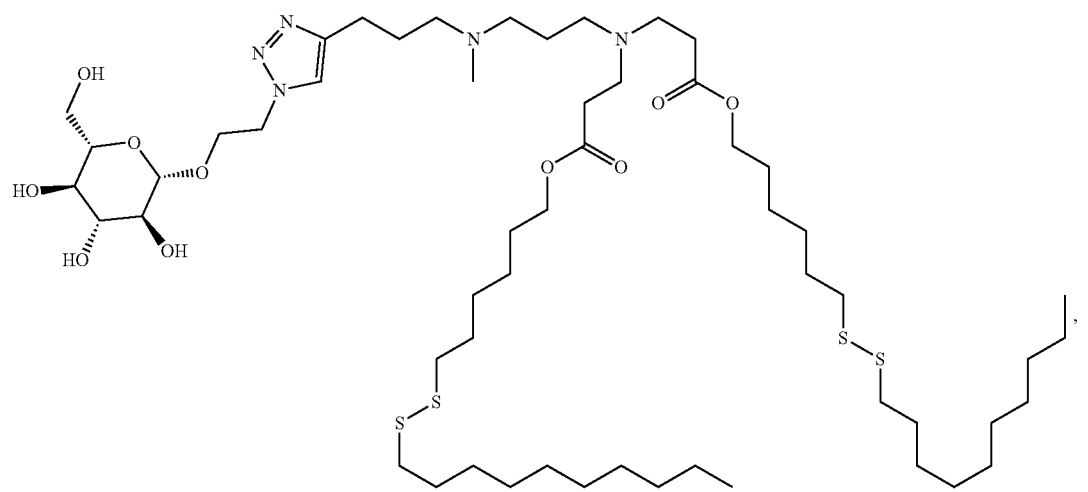

Compound 21
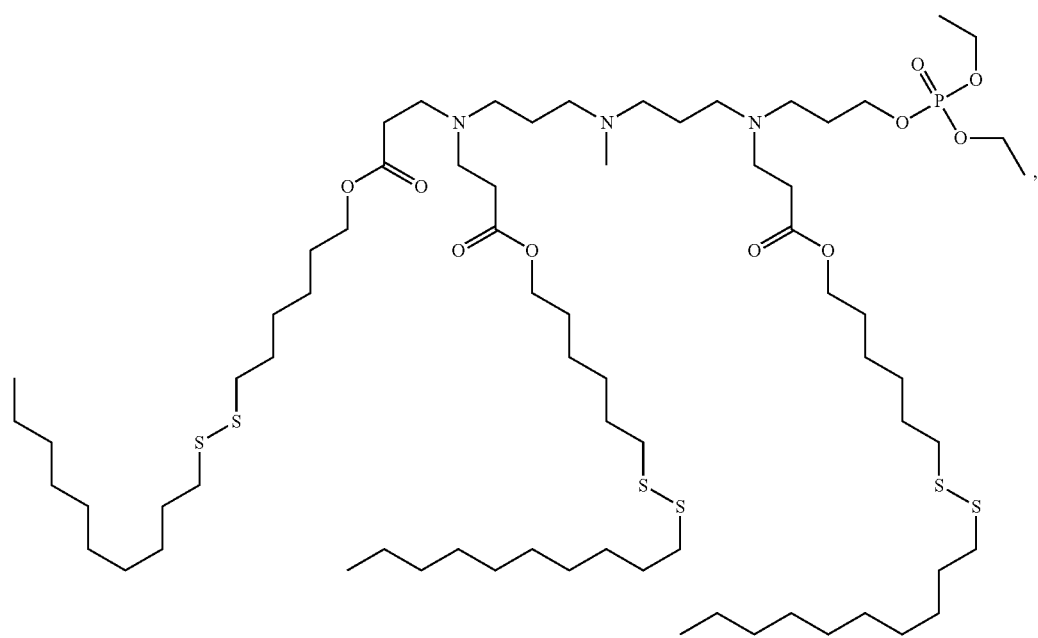
Compound 22
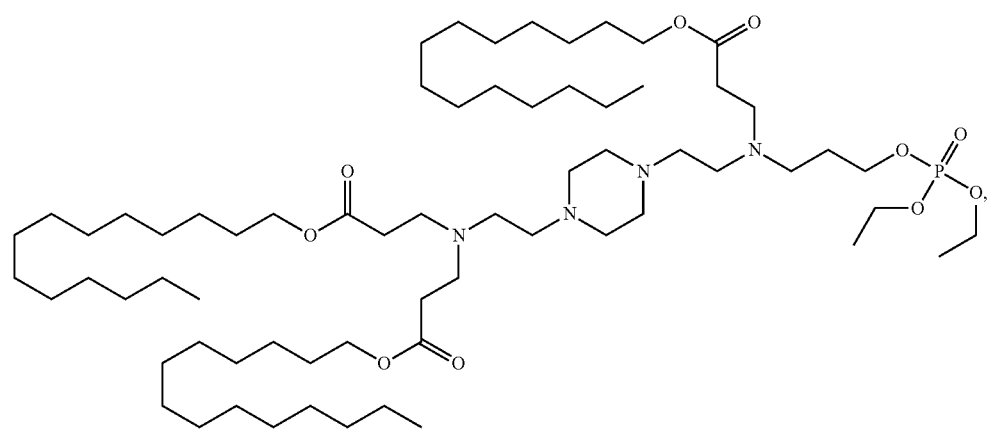

-continued
Compound 25
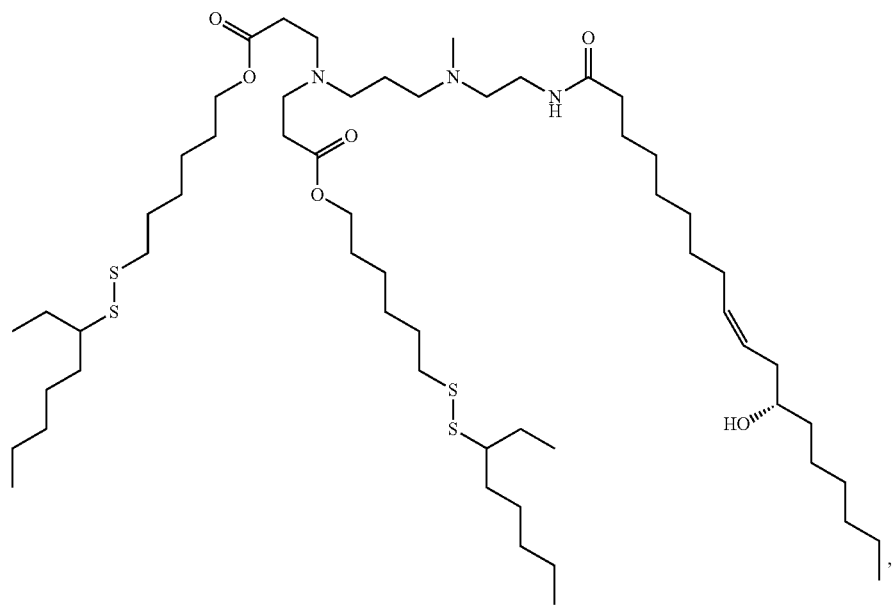
Compound 26
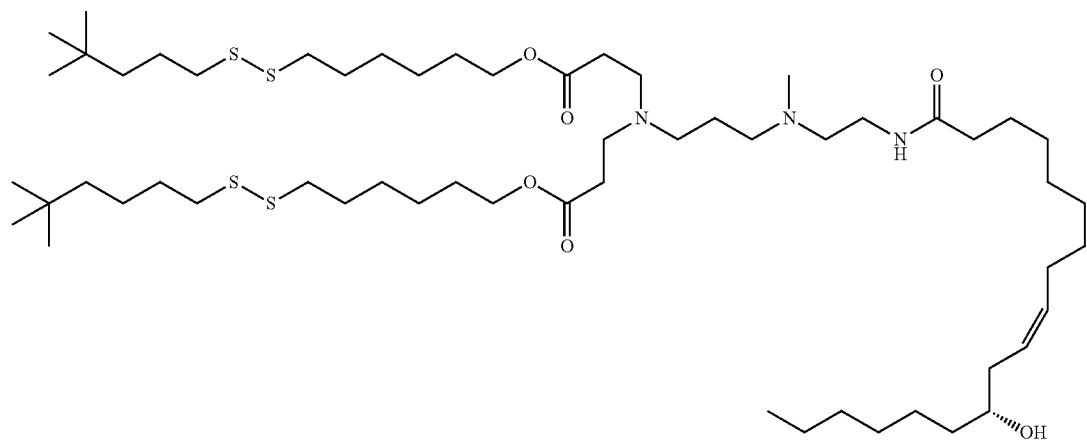
Compound 27
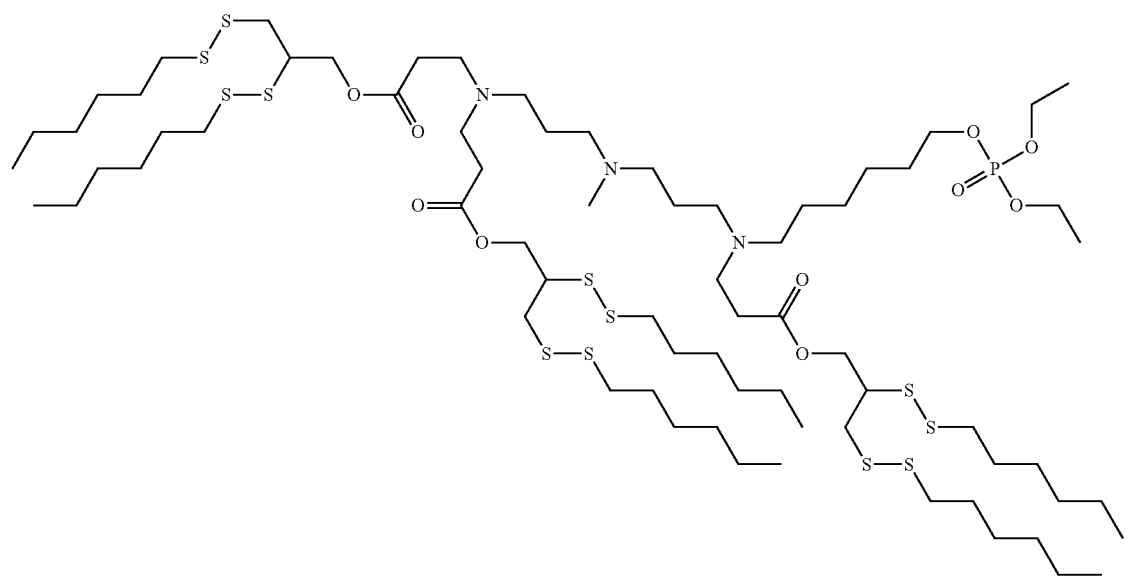

Compound 28
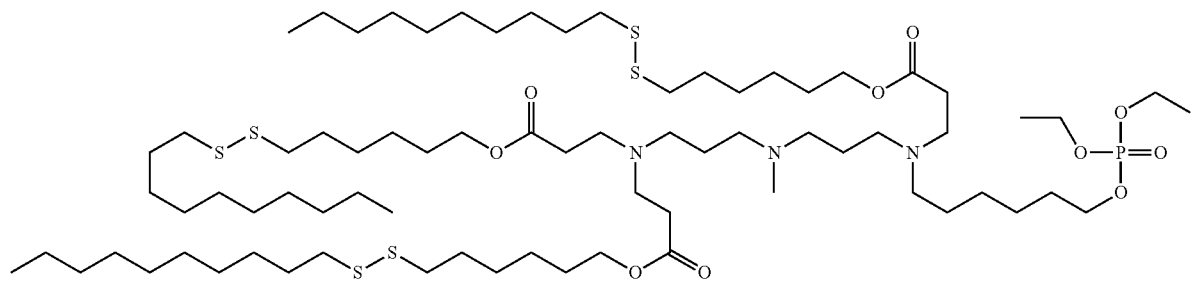
Compound 29
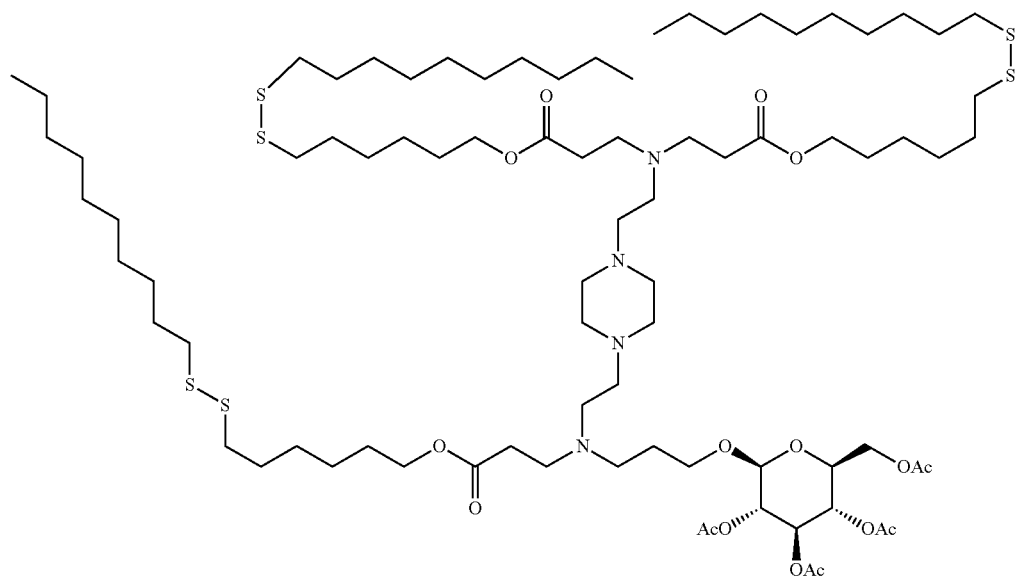
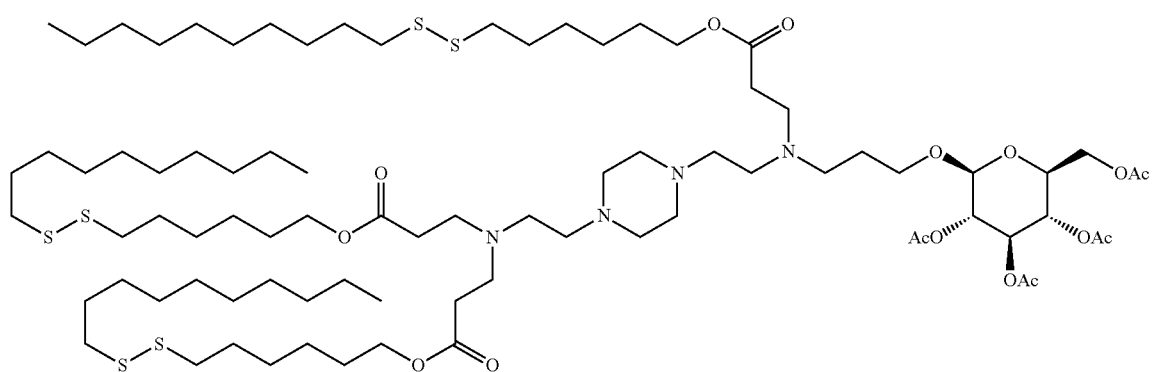

-continued
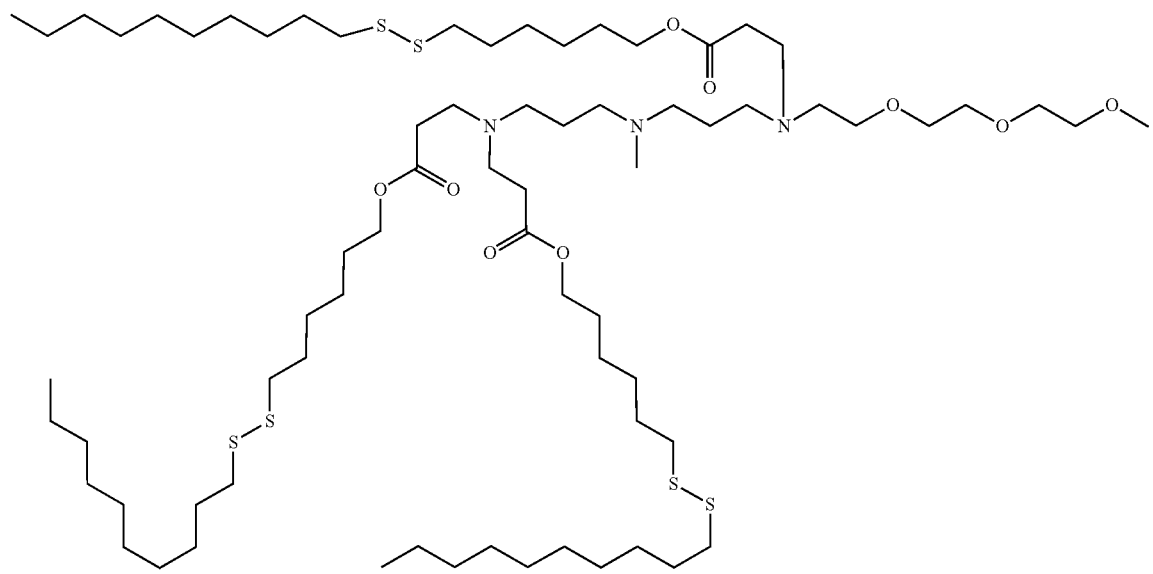
Compound 30
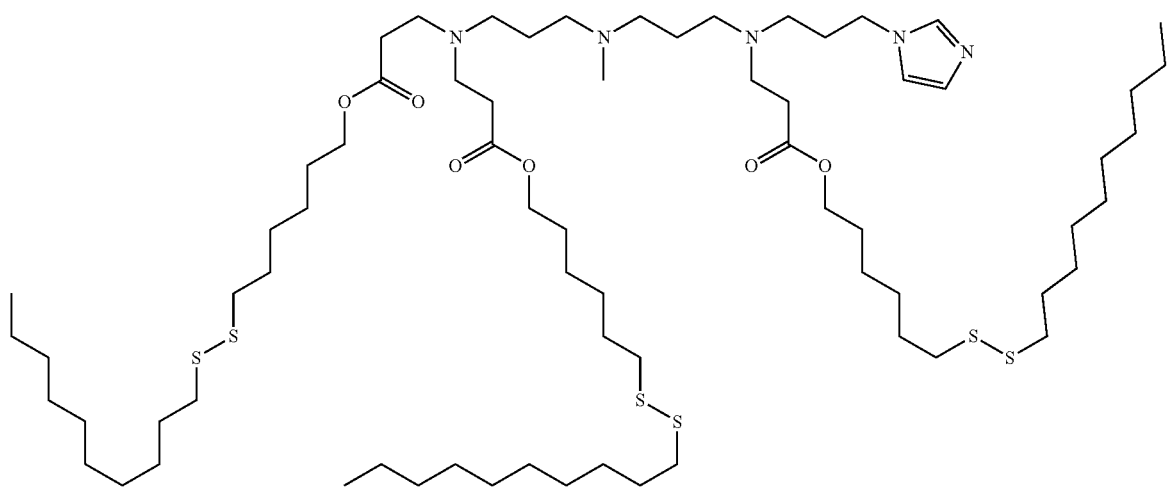
Compound 31
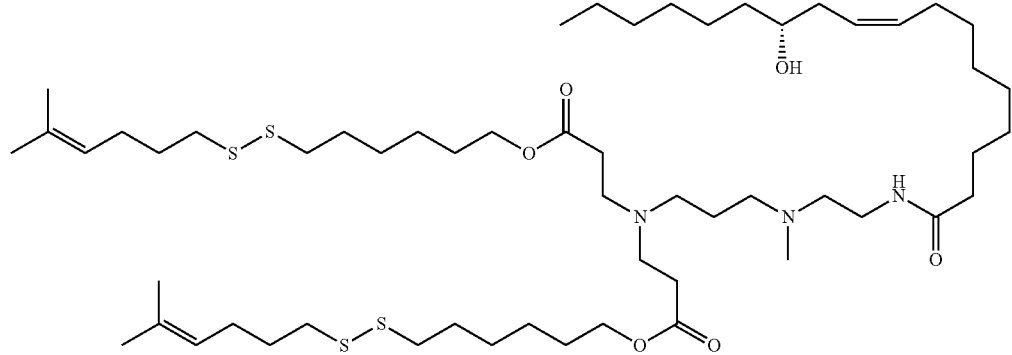
Compound 32

Compound 33
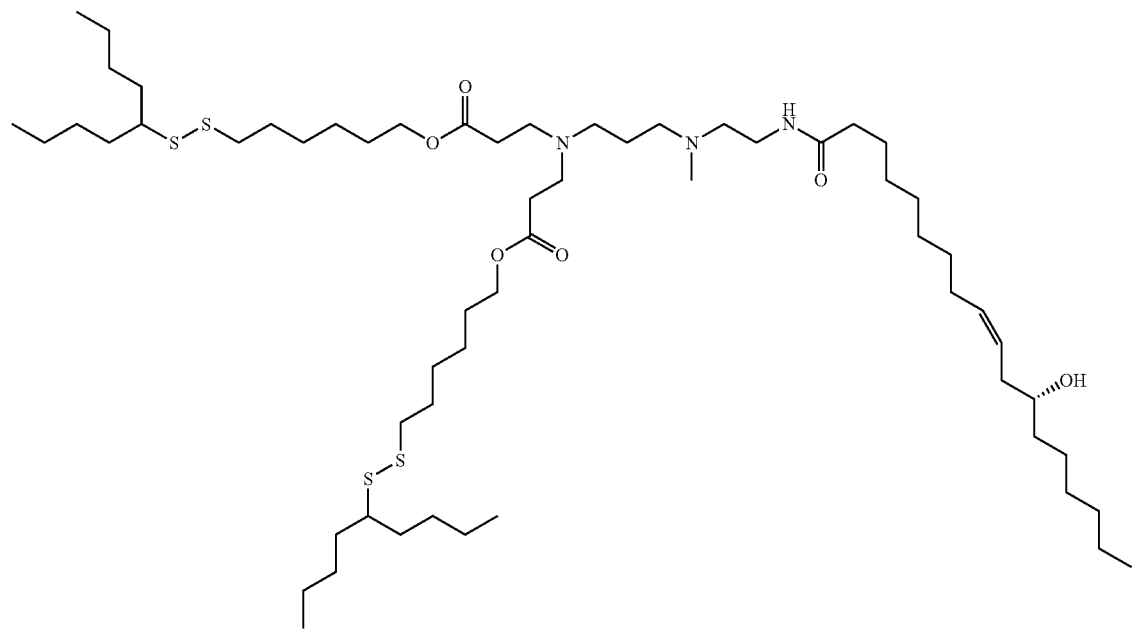
Compound 34
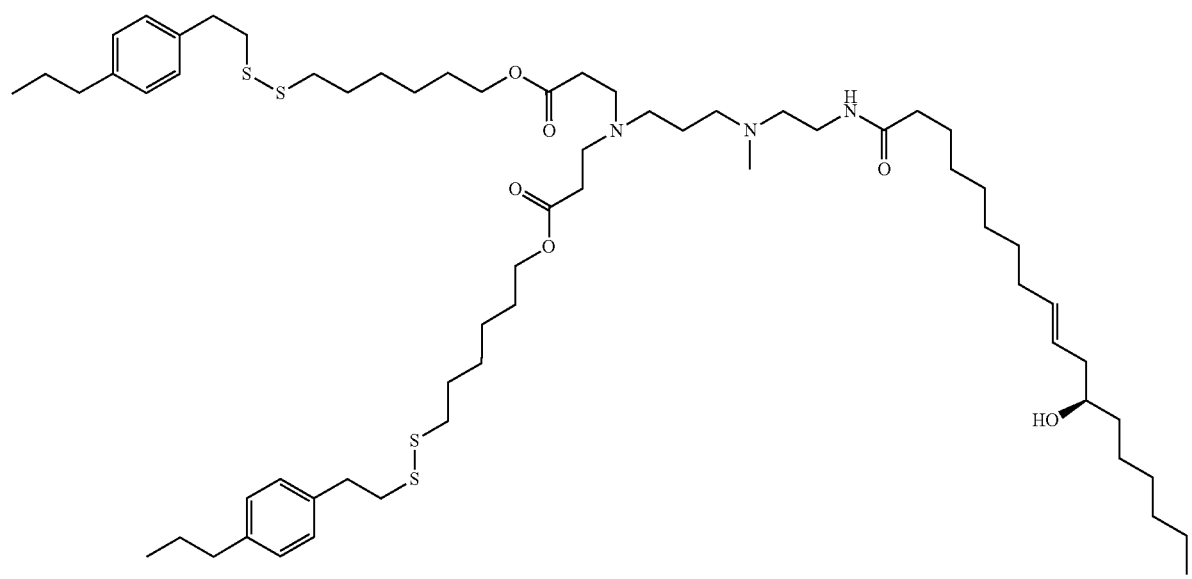

Compound 35
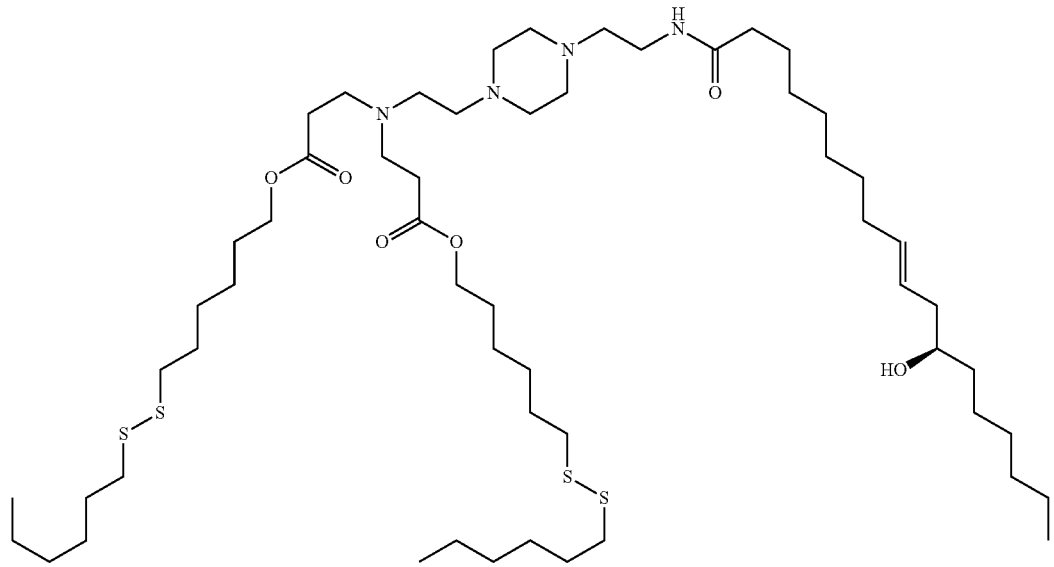
Compound 36
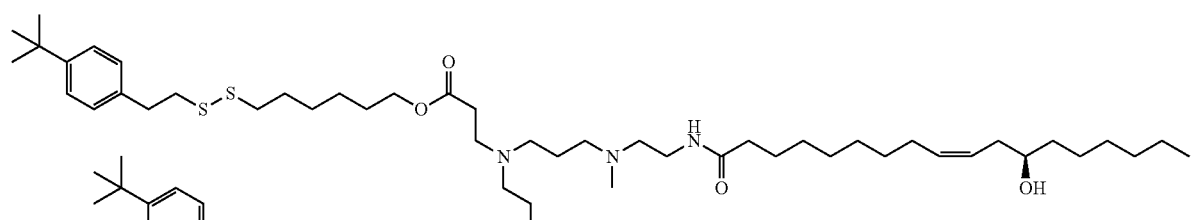
Compound 37
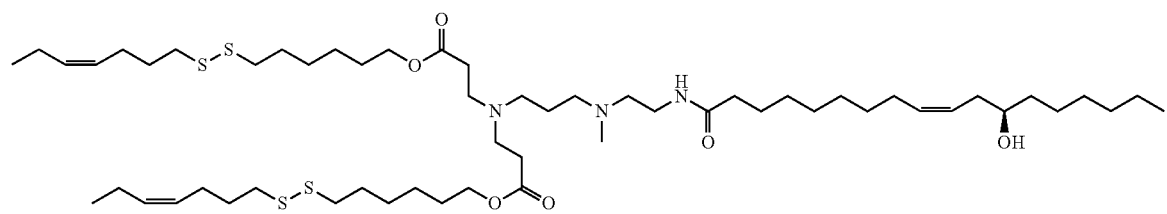
Compound 38
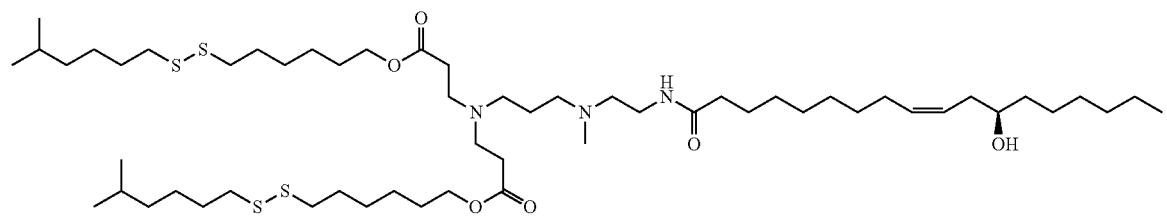
Compound 39
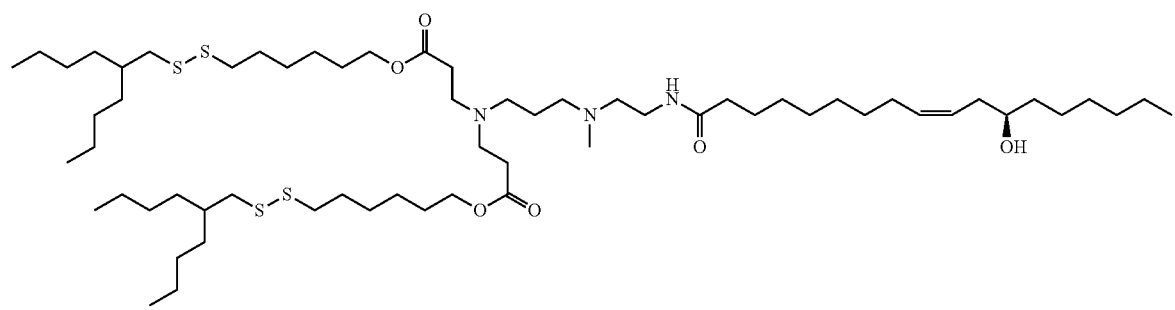

-continued
Compound 40
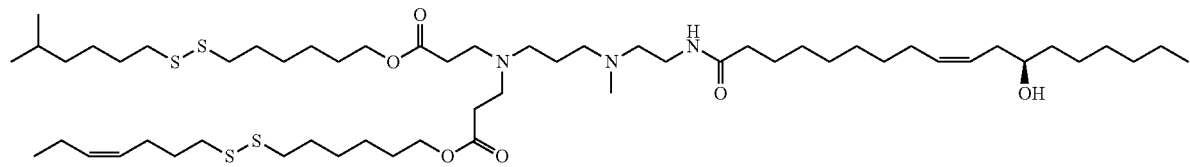
Compound 41
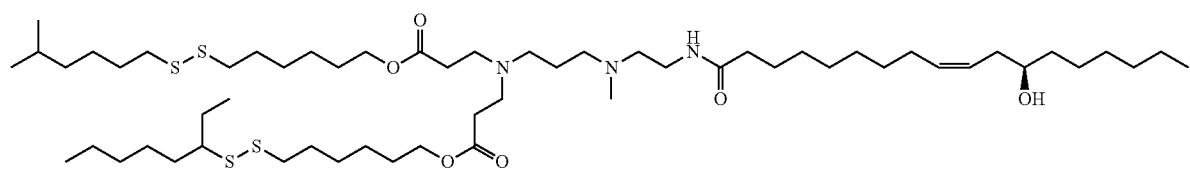
Compound 42
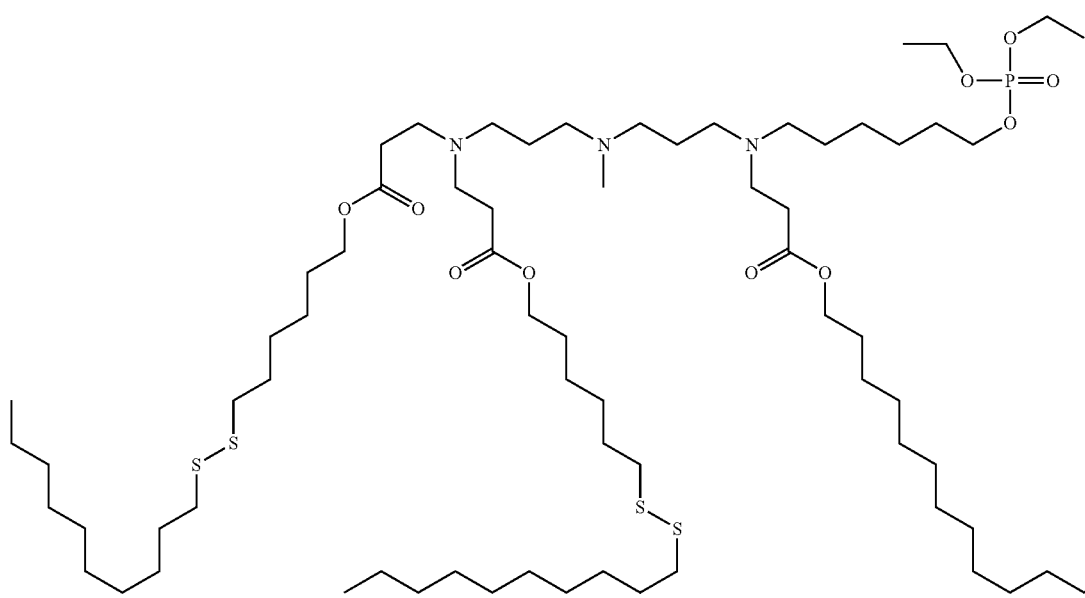
Compound 43
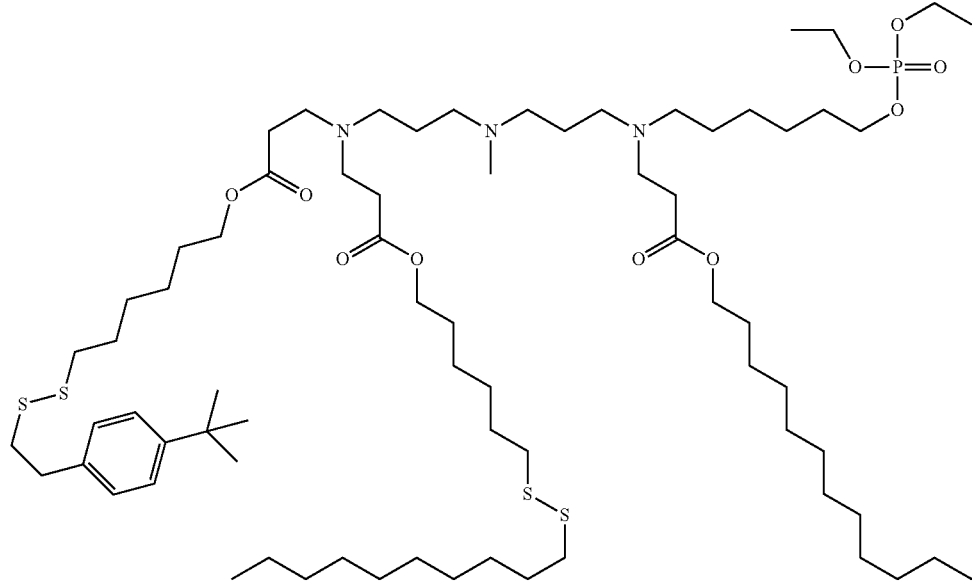

-continued

Compound 44

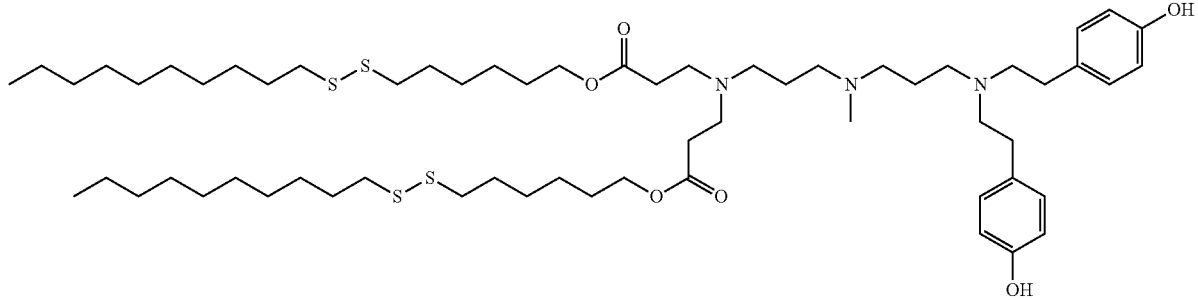

Another aspect of the invention relates to a nanoparticle composition containing any one of the compounds described above and a therapeutic or immunogenic nucleic acid agent fully or partially encapsulated therein. The therapeutic or immunogenic nucleic acid agent can be selected from the group consisting of a polynucleotide, oligonucleotide, DNA, cDNA, RNA, repRNA, siRNA, miRNA, sgRNA, and mRNA. Preferably, the therapeutic or immunogenic nucleic acid agent encodes one or more antigens selected from the group consisting of infectious disease, pathogen, cancer, autoimmunity disease and allergenic disease. More preferably, the therapeutic or immunogenic nucleic acid agent comprises an RNA or DNA capable of silencing, inhibiting or modifying the activity of a gene.

In some embodiments, the nanoparticle composition further contains a PEG-lipid such as 1,2-dimyristoyl-sn-glycero-3-phosphoethanolamine-N-[methoxy (poly-ethylene glycol)-2000], and 1,2-dimyristoyl-rac-glycero-3-methoxy-polyethylene glycol-2000. Typically, the PEG-lipid is in a range from 0.1 mol % to 10 mol % of the PEG-lipid per nanoparticle composition.

In other embodiments, the nanoparticle composition further contains at least one of a phospholipid and cholesterol or derivative thereof. Exemplary phospholipids are 1,2-dioleoyl-sn-glycero-3-phosphoethanolamine (DOPE) and distearoylphosphatidylcholine (DSPC).

Preferably, the nanoparticle composition contains the phospholipid in a range from 10 mol % to 60 mol % of the phospholipid per nanoparticle composition where mol % of phospholipid is calculated as (mol of phospholipid/[mol of phospholipid+mol of cholesterol or derivative thereof+mol of PEG lipid+mol of nucleic acid carrier+mol of nucleic acid])×100.

In addition, the nanoparticle composition can contain the cholesterol or derivative thereof in a range from 20 mol % to 75 mol % of the cholesterol or derivative thereof per nanoparticle composition, in which mol % of cholesterol or derivative thereof is calculated as (mol of cholesterol or derivative thereof/[mol of cholesterol or derivative thereof+mol of phospholipid+mol of PEG lipid+mol of nucleic acid carrier+mol of nucleic acid])×100

Also within the scope of the invention is a method for treating or preventing a disease or condition in a subject comprising: administering a therapeutically effective amount of any one of the nanoparticle compositions described above. In general, the therapeutically effective amount of the nanoparticle composition contains the therapeutic or immunogenic nucleic acid agent in a range from 0.01 mg nucleic acid to 10 mg nucleic acid per kg body weight of the subject.

The subject is a mammal such as a rodent, a canine, a primate, an equine, a high value agricultural animal, and a human, preferably a human.

Still within the scope of the invention is a method for delivering a nucleic acid to a subject comprising administering a pharmaceutically effective amount of any one of the nanoparticle compositions described above to a subject in need thereof.

The effective amount of the nanoparticle composition has the therapeutic or immunogenic nucleic acid agent in a range from 0.01 mg nucleic acid to 10 mg nucleic acid per kg body weight of the subject.

The details of one or more embodiments of the invention are set forth in the drawings and description below. Other features, objects, and advantages of the invention will be apparent from the drawings and description and from the claims.

BRIEF DESCRIPTION OF THE DRAWINGS

The following detailed description of preferred embodiments of the present invention will be better understood when read in conjunction with the appended drawings. For the purpose of illustrating the invention, particular embodiments are shown in the drawings. It is understood, however, that the invention is not limited to the precise arrangements and instrumentalities shown. In the drawings.

DETAILED DESCRIPTION

Figure 1:
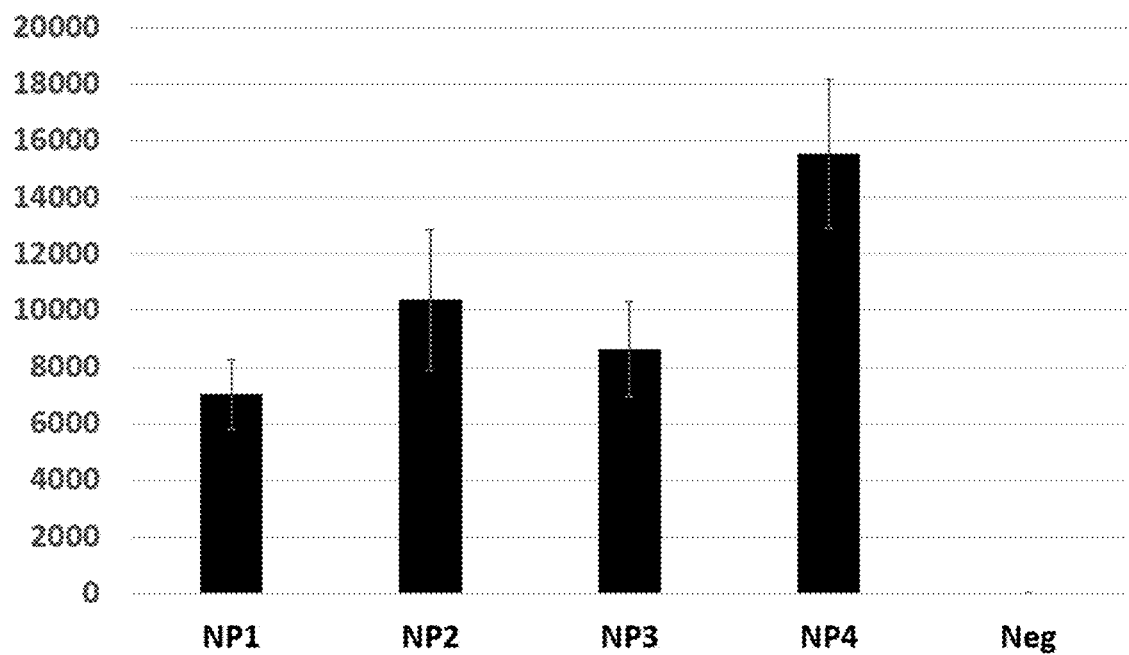
FIG. 1 illustrates quantification in vivo of SEAP expression after administration of nanoparticle formulations with compound 3. SEAP replicon RNA and SEAP mRNA formulated with compound 3 produced nanoparticles that resulted in SEAP protein production.

Certain terminology is used in the following description for convenience only and is not limiting.

The term "alkyl" or "alkylene" as used herein, means a straight or branched chain, monovalent or divalent hydrocarbon. An alkyl group herein may have from 1 to 30 carbon atoms (e.g., 1-25, 2-20, 3-16, 5-8, 1-6, and 1-4) unless otherwise specified. An alkyl group may have 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or a number of carbon atoms in a range from a first of the foregoing values to a second of the foregoing values, where the first and second values selected are any two of the foregoing values and the first value is less than the second. Examples include methyl (Me), ethyl, n-propyl, i-propyl, n-butyl, i-butyl, and t-butyl. Alkyl chain length may be used to control the hydrophobicity and self-assembly properties of a nucleic acid carrier.

The term "alkenyl" or "alkenylene" refers to a linear or branched monovalent or divalent hydrocarbon moiety that contains at least one double bond.

The term "alkoxy" refers to O-alkyl.

The term "alkynyl" or "alkynylene" refers to a linear or branched monovalent or divalent hydrocarbon moiety that contains at least one triple bond.

The term "cycloalkyl or "cycloalkylene" refers to a saturated or unsaturated, cyclic, nonaromatic, monovalent or divalent hydrocarbon moiety, Such as cyclohexyl and cyclohexylene. The term "cycloalkenyl or "cycloalkenylene" refers to a non-aromatic, cyclic hydrocarbon moiety that contains at least one double bond. The term "cycloalkynyl" or "cycloalkynylene" refers to a non-aromatic, cyclic hydrocarbon moiety that contains at least one triple bond.

The term "heterocycloalkyl" refers to a nonaromatic 5-8 membered monocyclic, 8-12 membered bicyclic, or 11-14 membered tricyclic ring system having one or more heteroatoms (e.g., O, N, P, and S). Examples include aziridinyl, azetidinyl, pyrrolidinyl, dihydrofuranyl, tetrahydrofuranyl, tetrahydropyranyl, tetrahydrothiophenyl, tetrahydro-2-H-thiopyran-1,1-dioxidyl, piperazinyl, piperidinyl, morpholinyl, imidazolidinyl, azepanyl, dihydrothiadiazolyl, dioxanyl, and quinuclidinyl. Both "cycloalkyl" and "heterocyclyl" also include fused, bridged, and spiro ring systems. They further include substituted groups such as halocycloalkyl and haloheterocyclyl.

The term "aliphatic" herein refers to a saturated or unsaturated, linear or branched, acyclic or cyclic, nonaromatic hydrocarbon moiety. Examples include, but are not limited to, alkyl, alkylene, alkenyl, alkenylene, alkynyl, alkynylene, cycloalkyl, cycloalkylene, cycloalkenyl, cycloalkenylene, cycloalkynyl, and cycloalkynylene moieties. The term "heteroaliphatic" herein refers to an aliphatic moiety containing at least one heteroatom (e.g., O, S, N, and P).

The term "aryl" herein refers to a monocyclic, bicyclic or tricyclic aromatic ring system. Examples include phenyl, biphenyl, 1- or 2-naphthyl, 1,2-dihydronaphthyl, 1,2,3,4-tetrahydronaphthyl, indenyl, and indanyl. Aryl can be unsubstituted or substituted with alkyl, alkenyl, alkynyl, cycloalkyl, heterocycloalkyl, aryl, heteroaryl, amino, ether, ester, and the like. The term "aralkyl" refers to alkyl substituted with aryl, i.e., aryl-alkyl.

The term "heteroaryl" herein refers to an aromatic monocyclic, bicyclic, tricyclic, and tetracyclic ring system having one or more heteroatoms (such as 0, S or N). Examples include pyridinyl, pyrimidinyl, quinolinyl, isoquinolinyl, indolyl, benzimidazolyl, benzoxazolyl, benzothiophenyl, benzofuranyl, pyrazolyl, triazolyl, oxazolyl, thiadiazolyl, tetrazolyl, oxazolyl, isoxazolyl, carbazolyl, furyl, imidazolyl, thienyl, thiazolyl, and benzothiazolyl. The term "heteroaralkyl" refers to alkyl substituted with heteroaryl, i.e., heteroaryl-alkyl.

The term "heterocyclyl" includes heterocycloalkyl and heteroaryl.

The term "amino" refers to primary ($NH_2$), secondary (—NH—), tertiary

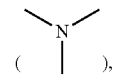

or quaternary

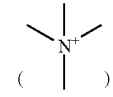

amine group bonding to or being included in one or more of $C_1$-$C_{30}$ (e.g., $C_2$-$C_{20}$ and $C_4$-$C_{16}$) aliphatic, $C_1$-$C_{30}$ (e.g., $C_2$-$C_{20}$ and $C_4$-$C_{16}$) heteroaliphatic, aryl, or heteroaryl moieties. Examples include alkyl amino, dialkyl amino, alkenyl amino, etc. Aliphatic amino examples include $C_1$-$C_{30}$ alkyl amino, $C_2$-$C_{30}$ alkenyl amino, $C_2$-$C_{30}$ alkynyl amino, and $C_3$-$C_{30}$ cycloalkyl. $C_1$-$C_{30}$ heterocycloalkyl amino is an example of heteroaliphatic amino.

The term "amido" refers to —NR'—C(O)—R" or —C(O)—NR'R", in which R' is H, $C_1$-$C_{30}$ (e.g., $C_2$-$C_{20}$ and $C_4$-$C_{16}$) aliphatic, $C_1$-$C_{30}$ (e.g., $C_2$-$C_{20}$ and $C_4$-$C_{16}$) heteroaliphatic, aryl, or heteroaryl; R" is $C_1$-$C_{30}$ (e.g., $C_2$-$C_{20}$ and $C_4$-$C_{16}$) aliphatic, $C_1$-$C_{30}$ (e.g., $C_2$-$C_{20}$ and $C_4$-$C_{16}$) heteroaliphatic, aryl, or heteroaryl; or R' and R", together with the atom(s) they bond to, form a heterocycloalkyl or heteroaryl ring.

The term "carbonyl" refers to —C(O)—R", in which R" is (e.g., $C_2$-$C_{20}$ and $C_4$-$C_{16}$) aliphatic, $C_1$-$C_{30}$ (e.g., $C_2$-$C_{20}$ and $C_4$-$C_{16}$) heteroaliphatic, aryl, or heteroaryl.

The term "carboxylate" refers to —O—C(O)—R" or —C(O)—O—R", in which R" is (e.g., $C_2$-$C_{20}$ and $C_4$-$C_{16}$) aliphatic, $C_1$-$C_{30}$ (e.g., $C_2$-$C_{20}$ and $C_4$-$C_{16}$) heteroaliphatic, aryl, or heteroaryl.

The term "disulfanyl" refers to —S—S—R", in which R" is $C_1$-$C_{30}$ (e.g., $C_2$-$C_{20}$ and $C_4$-$C_{16}$) aliphatic, $C_1$-$C_{30}$ (e.g., $C_2$-$C_{20}$ and $C_4$-$C_{16}$) heteroaliphatic, aryl, or heteroaryl. Preferred R" groups include $C_1$-$C_{30}$ (e.g., $C_2$-$C_{20}$ and $C_4$-$C_{16}$) alkyl, $C_2$-$C_{30}$ (e.g., $C_2$-$C_{20}$ and $C_4$-$C_{16}$) alkenyl, $C_2$-$C_{30}$ (e.g., $C_2$-$C_{20}$ and $C_4$-$C_{16}$) alkynyl, $C_3$-$C_{30}$ (e.g., $C_4$-$C_{20}$ and $C_4$-$C_{16}$) cycloalkyl, $C_1$-$C_{30}$ (e.g., $C_2$-$C_{20}$ and $C_4$-$C_{16}$) heterocycloalkyl, aryl, heteroaryl, aralkyl, and heteroaralkyl.

The term "halo" refers to H, F, Cl, Br, or I.

The term "sugar" refers to soluble carbohydrates including monosaccharide, disaccharide, and oligosaccharide. Examples of a monosaccharide are glucose, fructose, and galactose. Disaccharides are sugars made of two bonded monosaccharides such as sucrose, lactose, and maltose. Oligosaccharide contains 3-10 monosaccharides.

The term nucleobase includes the purine (e.g. adenine and guanine) and pyrimidine (e.g. uracil, thymine and cytosine) moiety present in nucleosides and nucleotides which form hydrogen bonds in nucleic acid hybridization. In the context of the present invention the term nucleobase also encompasses modified nucleobases which may differ from naturally occurring nucleobases, but are functional during nucleic acid hybridization. In some embodiments the nucleobase moiety is modified by modifying or replacing the nucleobase. In this context "nucleobase" refers to both naturally occurring nucleobases such as adenine, guanine, cytosine, thymidine, uracil, xanthine and hypoxanthine, as well as non-naturally occurring variants. Such variants are for example described in Hirao et al (2012) Accounts of Chemical Research vol 45 page 2055 and Bergstrom (2009) Current Protocols in Nucleic Acid Chemistry Suppl. 37 1.4.1.

Polyethylene glycol is represented by —$(OCH_2CH_2)_n$—H, or —$(OCH_2CH_2)_n$—$OR_{PEG}$, in which n is typically 2-30 (e.g., 2-20, 2-10, and 2-6) and $R_{PEG}$ is $C_1$-$C_6$ alkyl.

The term "phosphate" refers to —O—P(O)OR'OR", in which each of R' and R", independently, is H, $C_1$-$C_{30}$ alkyl, $C_3$-$C_{30}$ cycloalkyl, $C_3$-$C_{30}$ heterocycloalkyl, aryl, or heteroaryl.

Alkyl, alkylene, alkenyl, alkenylene, alkynyl, alkynylene, alkoxy, cycloalkyl, cycloalkylene, heterocyclyl, aliphatic, heteroaliphatic, amino, amido, carbonyl, carboxylate, carbamate, aryl, aralkyl, disulfanyl, phosphate, nucleobase, and sugar mentioned herein include both substituted and unsubstituted moieties, unless specified otherwise. Examples of a substituent include deuterium (D), hydroxyl (OH), halo (e.g., F and Cl), amino ($NH_2$), cyano (CN), nitro ($NO_2$), alkyl, alkenyl, alkynyl, alkoxy, cycloalkyl, acylamino, alkylamino, aminoalkyl, haloalkyl (e.g., trifluoromethyl), heterocyclyl, alkoxycarbonyl, amido, carboxy (COOH), alkanesulfonyl, alkylcarbonyl, alkenylcarbonyl, carbamido, carbamyl, carboxyl, thioureido, thiocyanato, sulfonamido, aryl, arylamino, aralkyl, and heteroaryl. All substitutes can be further substituted.

The term "compound", when referring to a compound of this invention, also includes its salts, solvates, and prodrugs. The pharmaceutically acceptable salts include those listed in Handbook of Pharmaceutical Salts: Properties, Selection and Use, 2nd Revised Edition, P. H. Stahl and C. G. Wermuth (Eds.), Wiley-VCH, New York, (2011). In addition to pharmaceutically acceptable salts, other salts are contemplated in the invention. They may serve as intermediates in the purification of compounds or in the preparation of other pharmaceutically acceptable salts, or are useful for identification, characterization or purification of compounds of the invention. A solvate refers to a complex formed between an active compound and a pharmaceutically acceptable solvent. Examples of a pharmaceutically acceptable solvent include water, ethanol, isopropanol, ethyl acetate, acetic acid, and ethanolamine. A prodrug refers to a compound that, after administration, is metabolized into a pharmaceutically active drug. Examples of a prodrug include esters and other pharmaceutically acceptable derivatives.

The compounds of the present invention may contain one or more non-aromatic double bonds or asymmetric centers. Each of them occurs as a racemate or a racemic mixture, a single R enantiomer, a single S enantiomer, an individual diastereomer, a diastereomeric mixture, a cis-isomer, or a trans-isomer. Compounds of such isomeric forms are within the scope of this invention. They can be present as a mixture or can be isolated using chiral synthesis or chiral separation technologies.

The term "treating" or "treatment" refers to administering one or more of the compounds to a subject with the purpose to confer a therapeutic effect, e.g., to slow, interrupt, arrest, control, or stop of the progression of an existing disorder and/or symptoms thereof, but does not necessarily indicate a total elimination of all symptoms. "An effective amount" refers to the amount of a compound that is required to confer the therapeutic effect. Effective doses will vary, as recognized by those skilled in the art, depending on the types of symptoms treated, route of administration, excipient usage, and the possibility of co-usage with other therapeutic treatment.

The term "substitute" refers to the ability to change one functional group, or moiety, of a compound for another functional group or moiety, provided that the valency of all atoms on the parent structure is maintained. The substituted group is interchangeably referred herein as "substitution" or "substituent." When more than one position in any given structure is substituted with more than one substituent selected from a specified group, the substituent may be either the same or different at every position.

Numerical values or ranges (preceded by "about" or without it) refer to the explicitly recited numbers, and the numbers within the experimental error of the measure contemplated. Embodiments described with the modifier "about" may be altered to remove "about" in order to form further embodiments herein. Likewise, embodiments described without the modifier "about" may be altered to add "about" in order to form further embodiments herein.

A range expressed as being between two numerical values, one as a low endpoint and the other as a high endpoint, includes the values between the numerical values and the low and high endpoints. Embodiments herein include sub-ranges of a range herein, where the subrange includes a low and high endpoint of the subrange selected from any increment within the range selected from each single increment of the smallest significant figure, with the condition that the high endpoint of the subrange is higher than the low endpoint of the subrange.

Further embodiments herein include replacing one or more "including" or "comprising" in an embodiment with "consisting essentially of" or "consisting of" "Including" and "comprising," as used herein, are open ended, include the elements recited, and do not exclude the addition of one or more other element. "Consisting essentially of" means that addition of one or more element compared to what is recited is within the scope, but the addition does not materially affect the basic and novel characteristics of the combination of explicitly recited elements. "Consisting of" refers to the recited elements, but excludes any element, step, or ingredient not specified.

The words "a" and "one," as used in the claims and in the corresponding portions of the specification, are defined as including one or more of the referenced items unless specifically stated otherwise. This terminology includes the words above specifically mentioned, derivatives thereof, and words of similar import. The phrase "at least one" followed by a list of two or more items, such as "A, B, or C" or "A, B, and C" means any individual one of A, B or C as well as any combination thereof.

Embodiments here address the need to design novel nucleic acid carriers and formulate those novel materials for therapeutic cargo (e.g., mRNA) delivery. Embodiments herein comprise a new class of multifunctional aminoalkyl-branched lipid-like molecules. The core structure of these molecules may be composed of three key components in its structure, including an ionizable amine, biodegradable linkages (e.g., ester, disulfide residues), and lipid tails to provide hydrophobic interactions to stabilize the nanoparticle formulations. The amino head group of these multifunctional aminoalkyl-branched lipid-like molecules may also be modified to incorporate functionalities with H-bond donor-acceptor configurations to drive complexation and thus particle formation with mRNA via hydrogen bonds.

In embodiments herein, the amino head group was also modified to include hydrophilic biomimetic ligands. Examples of these modifications include alteration with a sugar or phosphate moiety.

An embodiment comprises a nanoparticle composition comprising a nucleic acid carrier having the structure of one of Formulas I, 1a, 1b, 1c, 1d, 1e, 1f, 1g, 1h, 1i or 1j:

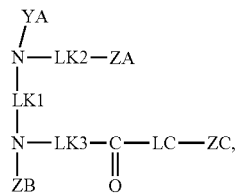

I

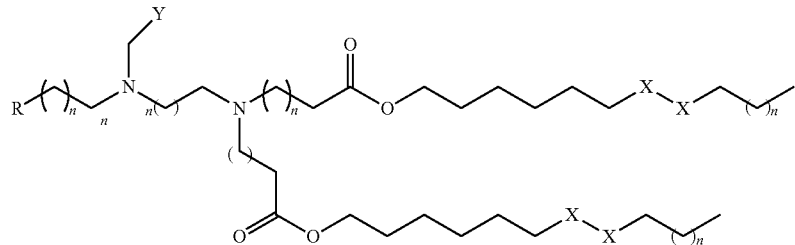

Formula 1a

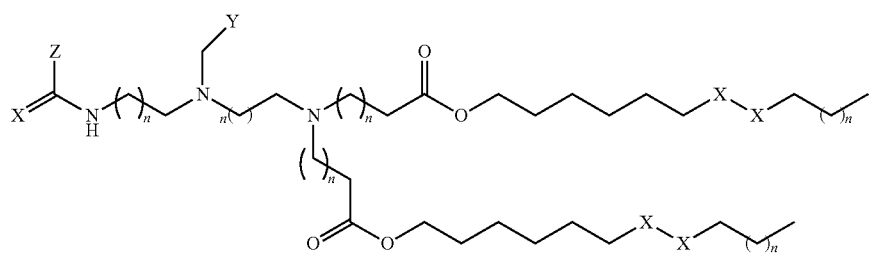

Formula 1b

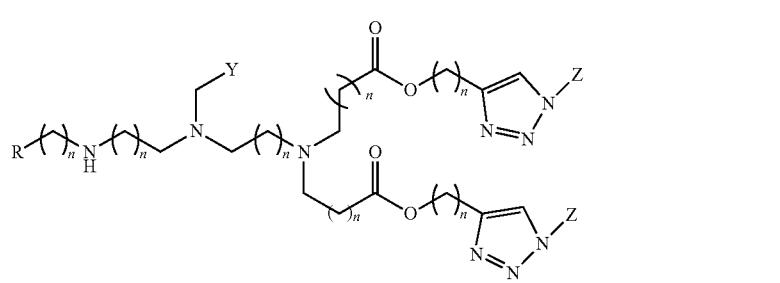

Formula 1c

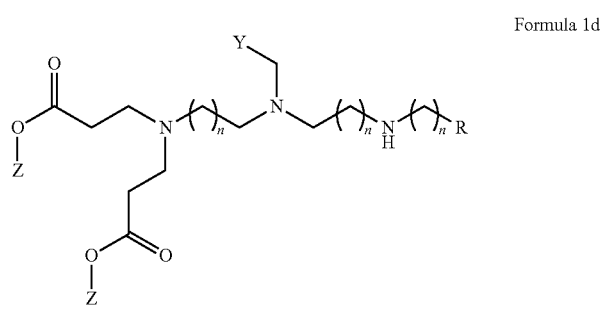

Formula 1d

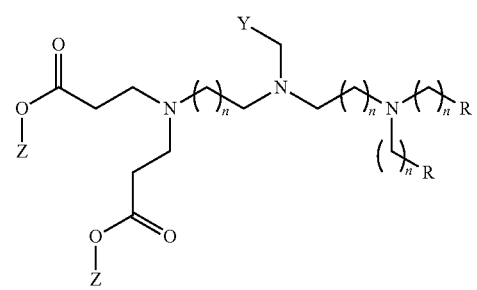

Formula 1e

-continued

Formula 1f
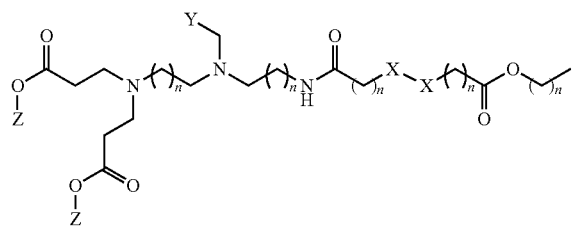

Formula 1g
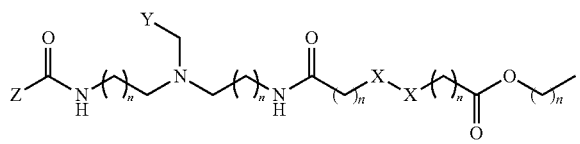

Formula 1h
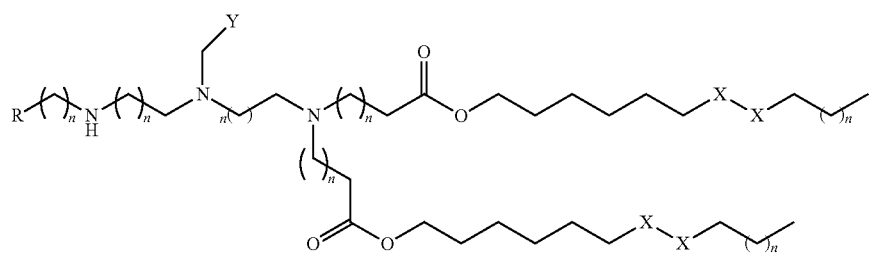

Formula 1i
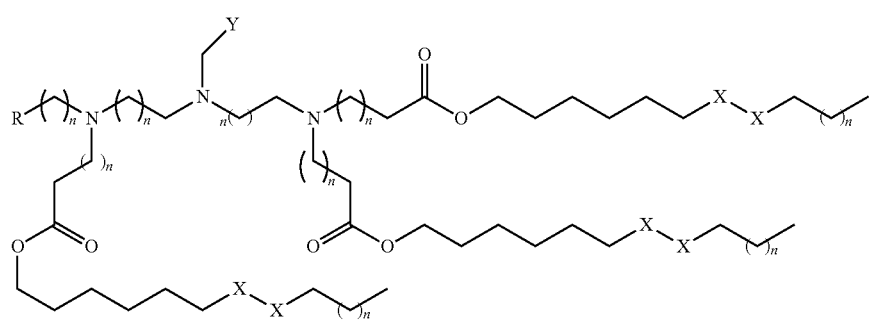

Formula 1j
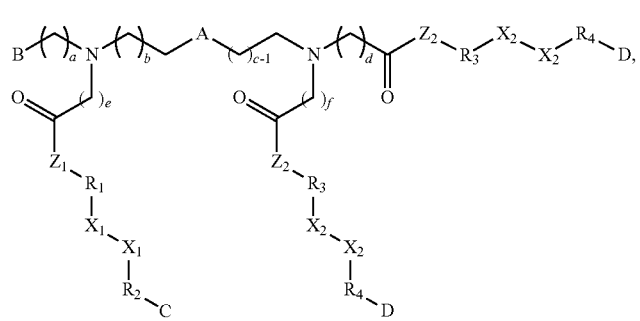

wherein all variables are defined above.

The hydrophobic unit Z of Formula 1b, 1c, 1d, 1e, 1f and 1g may be a $C_4$-$C_{28}$ alkyl or $C_4$-$C_{28}$ alkenyl group. It may be a pentyl, hexyl, heptyl, octyl, nonyl, decyl, undecyl, dodecyl, tridecyl, tetradecyl, pentadecyl, hexadecyl, heptadecyl, octadecyl, but-3-en-1-yl, oct-7-en-1-yl, 12-tridecenyl, 14-pentadecenyl, 17-octadecenyl, oleyl, linoleyl, arachidoneyl, 16-hydroxyhexadecyl, or 12-hydroxy-9-cis-octadecenyl (ricinoleyl) group.

The R of Formula 1a, Formula 1c, Formula 1d, Formula 1e, Formula 1h, and Formula 1I, may be a sugar or phosphate moiety. Non-limiting examples of sugar are furanose monosaccharide (e.g., xylo-, ribo-, or arabinofuranose), pyranose monosaccharide (e.g., glucose, mannose, galactose), disaccharide (e.g., lactose, trehalose), or oligosaccharide (e.g., cyclodextrin), etc.

In Formulas I and 1a-1j above, each contains at least a hydrophobic tail connecting to the amine backbone through a linker. Take Formula I as an example. Moieties LK2-ZA, ZB, and LK3-C(O)-LC-ZC each can be such a hydrophobic tail. As another example in Formula 1j above, when d, e, and f is 2, moieties $CH_2$—$CH_2$—$C(O)$-$Z_1$—$R_1$—$X_1$—$X_1$—$R_2$—C, $CH_2$—$CH_2$—$C(O)$-$Z_2$—$R_3$—$X_2$—$X_2$—$R_4$-D and $CH_2$—$CH_2$—$C(O)$-$Z_2$—$R_3$—$X_2$—$X_2$—$R_4$-D each can be a hydrophobic tail connected with amine linker N—$(CH_2)_b$$CH_2$A or N—$CH_2(CH_2)_{c-1}$A. Similarly, in Formulas 1a to 1i, hydrophobic tails are provided as shown in each individual formula. These hydrophobic tails are present for self-assembly.

The moieties (i.e., hydrophobic tails) may be introduced by coupling a protected or unprotected amine as a substrate with a functional reagent such as an acrylate to form a moiety of the compounds of this invention. Examples 1 (Compound 3), 2 (Compound 8), 4 (compound 12), 7 (Compounds 19, 21, 25, and 26), infra, illustrate these coupling reactions.

The acrylates may be saturated or unsaturated having $C_4$-$C_{28}$ chains. Exemplary acrylates are included below together with corresponding moieties formed thereof in compounds of this invention.
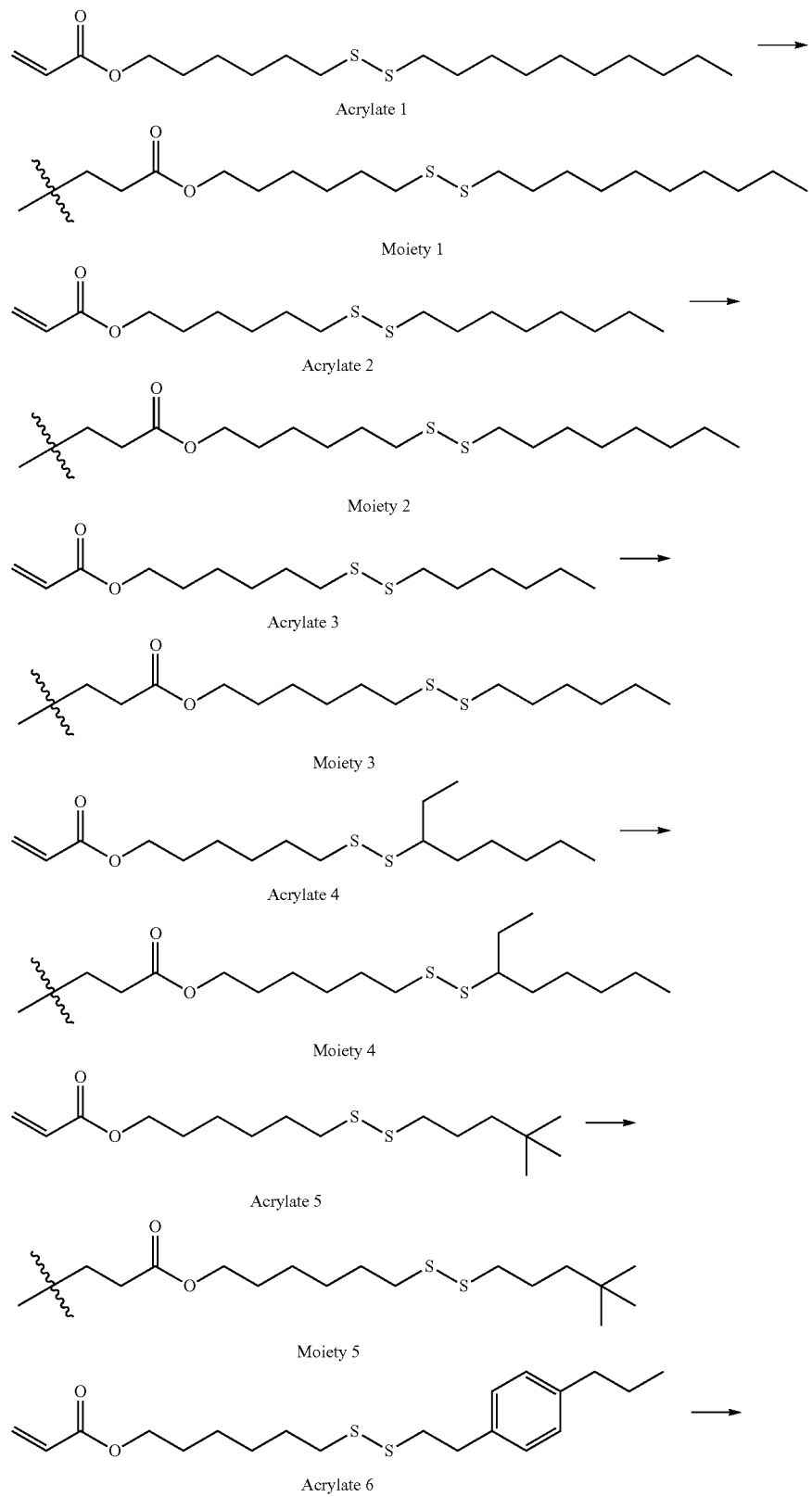

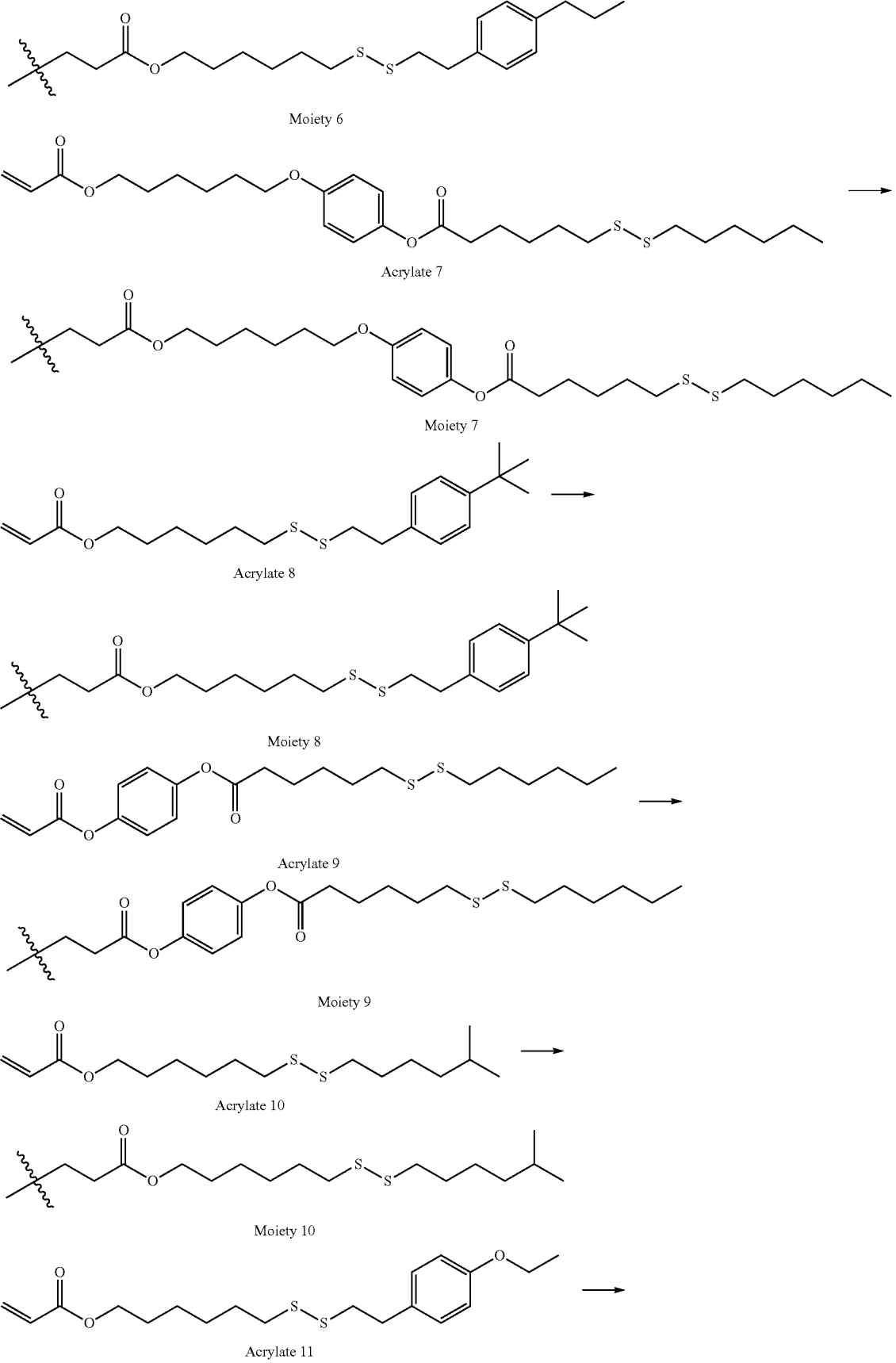

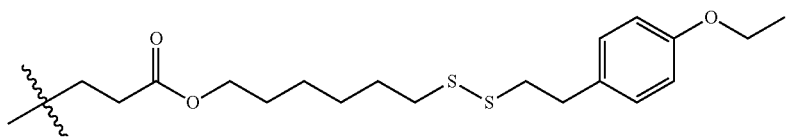
Moiety 11
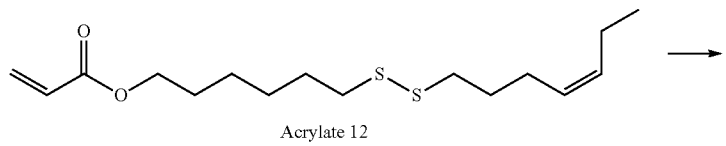
Acrylate 12
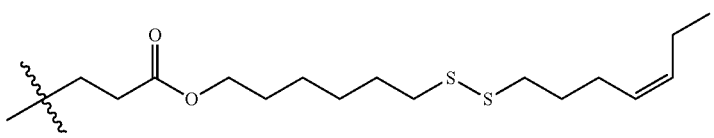
Moiety 12
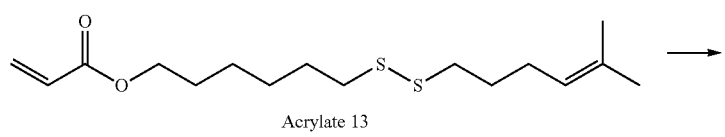
Acrylate 13
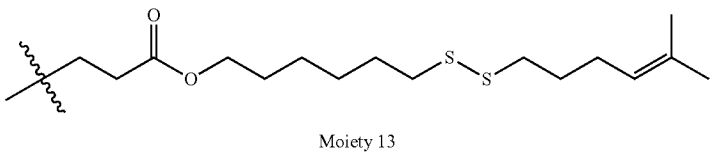
Moiety 13
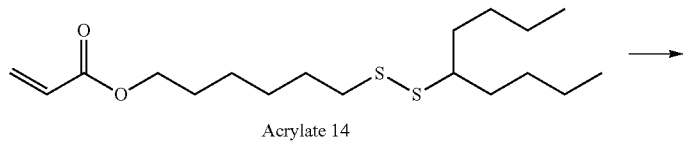
Acrylate 14
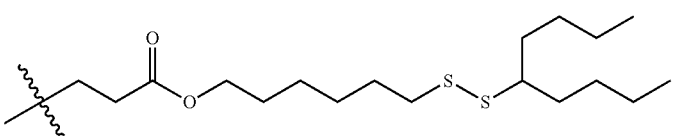
Moiety 14
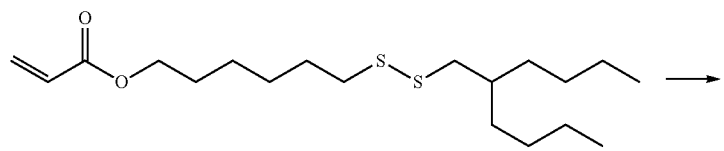
Acrylate 15
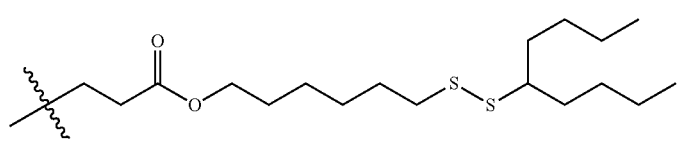
Moiety 15
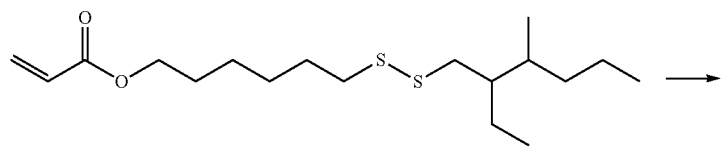
Acrylate 16

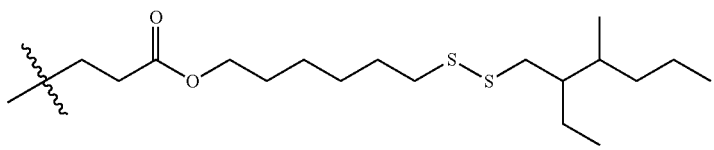
Moiety 16
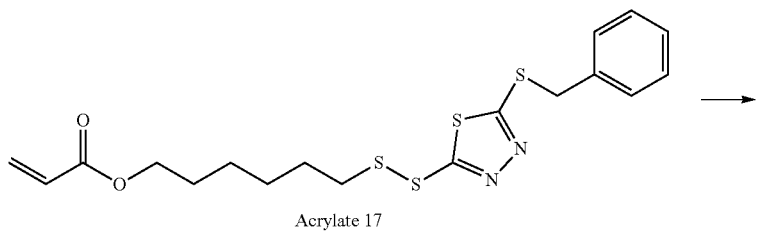
Acrylate 17
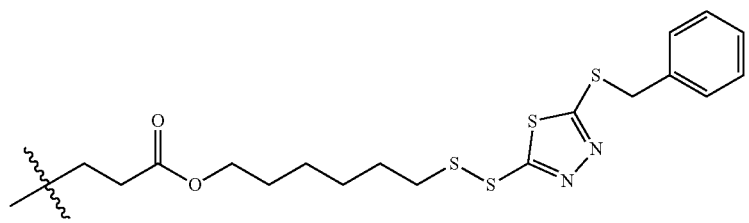
Moiety 17
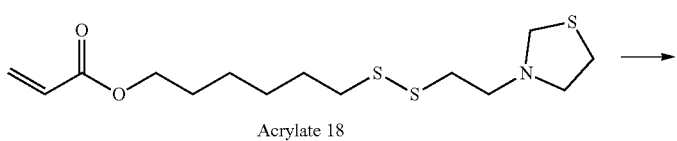
Acrylate 18
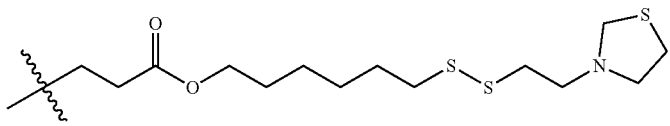
Moiety 18
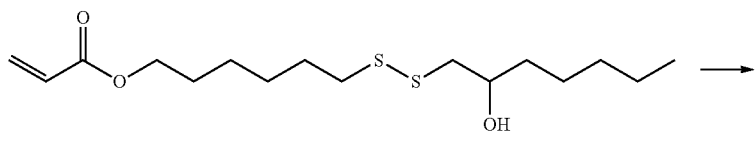
Acrylate 19
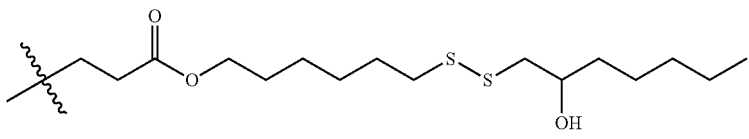
Moiety 19
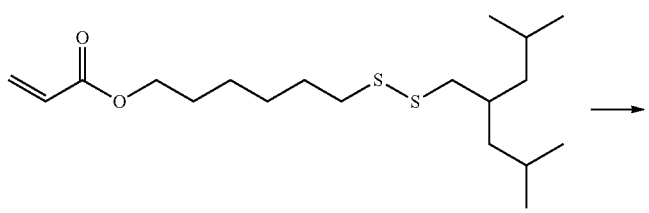
Acrylate 20

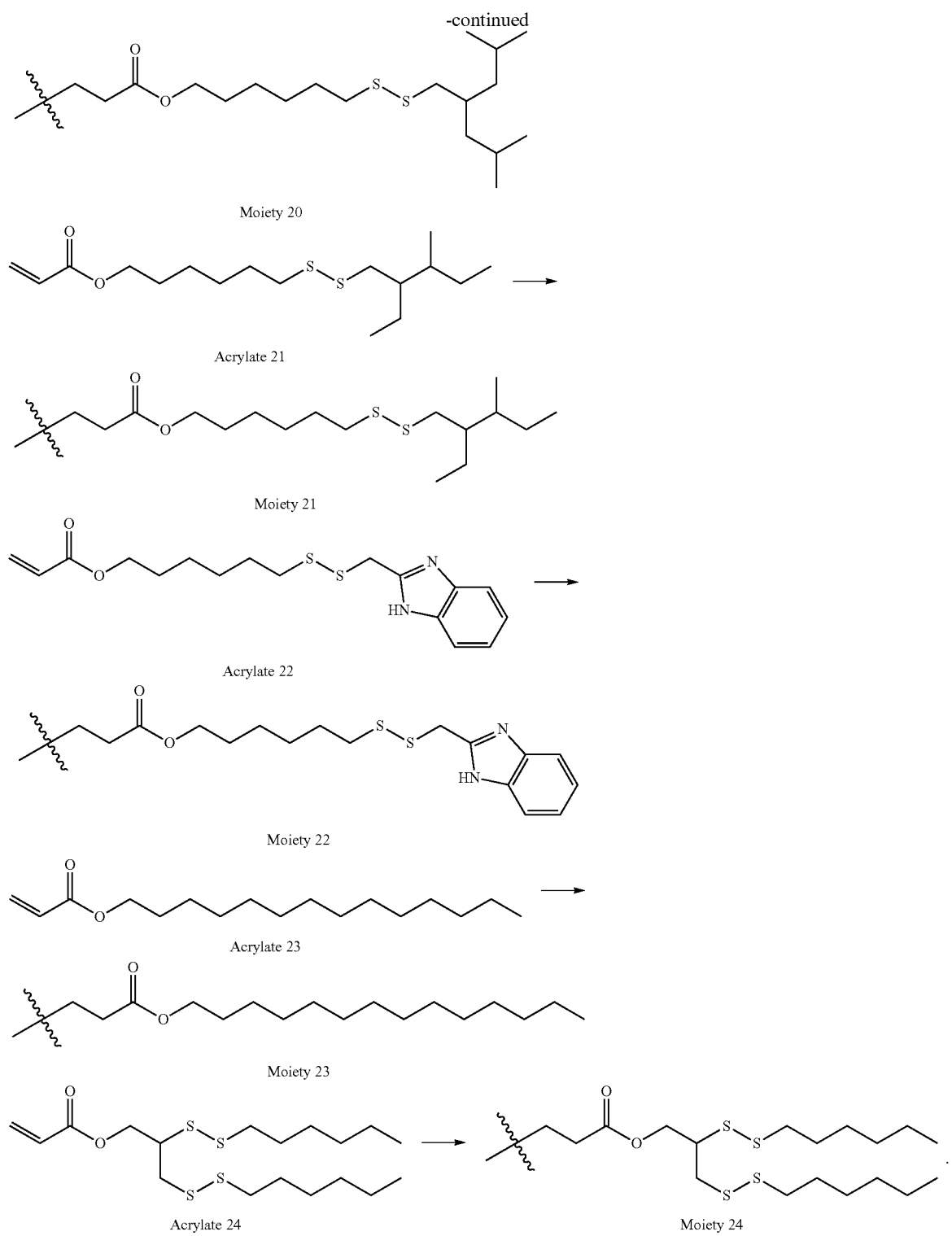

An embodiment comprises a nanoparticle composition comprising any one or more of the nucleic acid carriers described herein. The nanoparticle composition may further comprise an agent; for example, a nucleic acid. A nanoparticle composition herein may be useful to introduce an agent into a cell. The agent may be a nucleic acid. A nanoparticle composition herein may be useful as a transfection agent. A nanoparticle composition herein may be useful in a method of treating or preventing a disease.

In an embodiment, a nanoparticle composition may comprise a mixture of nucleic acid carriers, each one of them comprising different amine and/or side chains and/or sugar. These nucleic acid carriers may be mixed at a fixed ratio. For an example of mixture with three nucleic acid carriers, a ratio of the first nucleic acid carrier to the second nucleic acid carrier and to the third nucleic acid carrier may be i:j:k where i, j, and k are independently selected from 1, 2, 3, 4, 5, 6, 7, 8, 9, 10, 11, 12, 13, 14, 15, 16, 17, 18, 19, or 20, or a value in a range from a first of the foregoing values to a second of the foregoing values, where the first and second values selected are any two of the foregoing values and the first value is less than the second.

In an embodiment, the nanoparticle composition may comprise one or more nucleic acid agents. The nucleic acid agents may be therapeutic or immunogenic. The therapeutic or immunogenic nucleic acid agent may be non-covalently bound or covalently bound to the nucleic acid carrier. The nucleic acid agent may be bound to the charged nucleic acid carrier through electrostatic interaction and Hydrogen bonding.

As used herein, the term "nucleic acid" refers to any natural or synthetic DNA or RNA molecules, RNA/DNA hybrids and polyamide nucleic acids (PNAs) all of which can be in single- or double-stranded form, and unless otherwise mentioned, may include known analogs of natural nucleotides that can function in a similar manner as naturally occurring nucleotides. The nucleic acid agent may also be a mixture of one or more different RNA molecules, DNA molecules, or combination of the two. The term "DNA" or "DNA molecule" or "deoxyribonucleic acid molecule" refers to a polymer of deoxyribonucleotides. The DNA molecule may be a polynucleotide, oligonucleotide, DNA, or cDNA. The DNA molecule may encode wild-type or engineered proteins, peptides or polypeptides. The encoded protein, peptide, or polypeptide may be an antigen. The term "RNA" or "RNA molecule" or "ribonucleic acid molecule" refers to a polymer of ribonucleotides. The polymer may have 2, 3, 4, 5, 10, 15, 20, 25, 30, 35, 40, 45, 50, 55, 60, 65, 70, 75, 80, 85, 90, 95, 100, 200, 300, 400, 500, 600,700, 800, 900, 1000, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000 or more ribonucleotides. The polymer may have 2, 3, 4, 5, 10, 15, 20, 25, 30, 35, 40, 45, 50, 55, 60, 65, 70, 75, 80, 85, 90, 95, 100, 200, 300, 400, 500, 600, 700, 800, 900, 1000, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, or 50000 ribonucleotides, or a number of ribonucleotides in a range from a first of the foregoing values to a second of the foregoing values, where the first and second values selected are any two of the foregoing values and the first value is less than the second. The RNA molecule may be a replicon RNA (repRNA), small interfering RNA (siRNA), miRNA, single strand guide RNA (sgRNA), messenger RNA (mRNA), or transfer RNA (tRNA). Replicon RNA (repRNA) refers to a genome replication-competent, progeny-defective RNA virus genome that is incapable of producing infectious progeny virions. Viral genomes that are typically modified for use as repRNAs include "positive strand" RNA viruses. The modified viral genomes function as both mRNA and templates for replication. Small interfering RNA (siRNA) refers to an RNA (or RNA analog) comprising between about 10-50 nucleotides (or nucleotide analogs) which is capable of directing or mediating RNA interference. MicroRNAs (miRNAs) refers to small (20-24 nt) regulatory non-coding RNAs that are involved in post-transcriptional regulation of gene expression in eukaryotes by affecting either or both the stability and translation of coding mRNAs. Messenger RNAs (mRNAs) are usually single-stranded RNAs and define the amino acid sequence of one or more polypeptide chains. This information is translated during protein synthesis when ribosomes bind to the mRNA. The DNA or RNA molecules may be chemically modified in nucleic acid backbone, the ribose sugar moiety and the nucleobase itself.

The RNA molecule may be a monocistronic or polycistronic mRNA. A monocistronic mRNA refers to an mRNA comprising only one sequence encoding a protein, polypeptide or peptide. A polycistronic mRNA typically refers to two or more sequences encoding two or more proteins, polypeptides or peptides. An mRNA may encode a protein, polypeptide, or peptide that acts as an antigen.

As used herein, "encapsulated" can refer to a nanoparticle that provides an active agent or therapeutic agent, such as a nucleic acid (e.g., a messenger RNA), with full encapsulation, partial encapsulation, or both. In a preferred embodiment, the nucleic acid is fully encapsulated in the nanoparticle. In the context of nucleic acid therapeutic agents, full encapsulation may be determined by a Ribogreen® assay. RiboGreen® is an ultra-sensitive fluorescent nucleic acid stain for quantitating oligonucleotides and single-stranded DNA or RNA in solution (available from Thermo Fisher Scientific—US).

"Antigen" as used herein is defined as a molecule that triggers an immune response. The immune response may involve either antibody production, or the activation of specific immunologically active cells, or both. The antigen may refer to any molecule capable of stimulating an immune response, including macromolecules such as proteins, peptides, or polypeptides. The antigen may be a structural component of a pathogen, or a cancer cell or a derivative thereof. The antigen may be synthesized, produced recombinantly in a host, or may be derived from a biological sample, including but not limited to a tissue sample, cell, or a biological fluid.

The antigen may be but is not limited to a vaccine antigen, parasite antigen, bacterial antigen, tumor antigen, environmental antigen, therapeutic antigen or an allergen. As used herein a nucleotide vaccine is a DNA- or RNA-based prophylactic or therapeutic composition capable of stimulating an adaptive immune response in the body of a subject by delivering antigen(s). The immune response induced by vaccination typically results in development of immunological memory, and the ability of the organism to quickly respond to subsequent encounter with the antigen or infectious agent.

The use of a "nucleic acid carrier" herein as a carrier of nucleic acids is preferred and the name "nucleic acid carrier" is applied for that reason. However, a non-nucleic acid agent may be in an embodiment herein.

In an embodiment, the nanoparticle composition described herein may comprise a lipid conjugate. In an embodiment, the lipid conjugate may be useful in that it may prevent the aggregation of particles. Lipid conjugates that may be in a composition herein include, but are not limited to, polyethylene glycol (PEG)-lipid conjugates. Non-limiting examples of PEG-lipids include, PEG coupled to lipids such as DMG-PEG 2000 or DSG-PEG 2000, PEG coupled to phospholipids such as phosphatidylethanolamine (PEG-PE), PEG conjugated to cholesterol or a derivative thereof, and mixtures thereof. In certain instances, the PEG may be optionally substituted by an alkyl, alkoxy, acyl, or aryl group.

PEGs are classified by their molecular weights; for example, PEG 2000 has an average molecular weight of about 2,000 daltons, and PEG 5000 has an average molecular weight of about 5,000 daltons. PEGs are commercially available from Avanti Polar Lipids. The PEG moiety of the PEG-lipid conjugates described herein may comprise an average molecular weight ranging from 550 daltons to 10,000 daltons.

Phosphatidylethanolamines having a variety of acyl chain groups of varying chain lengths and degrees of saturation can be conjugated to PEG to form the lipid conjugate. Phosphatidylethanolamines are commercially available, or can be isolated or synthesized using conventional techniques. The phosphatidylethanolamines may comprise saturated or unsaturated fatty acids with carbon chain lengths in the range of $C_{10}$ to $C_{20}$. The phosphatidylethanolamines may comprise mono- or polyunsaturated fatty acids and mixtures of saturated and unsaturated fatty acids. The phosphatidylethanolamines contemplated include, but are not limited to, dimyristoylphosphatidylethanolamine (DMPE), dipalmitoyl-phosphatidylethanol amine (DPPE), dioleoylphosphatidylethanolamine (DOPE), and distearoyl-phosphatidylethanolamine (DSPE).

The PEG-lipid may comprise PEG conjugated to cholesterol or cholesterol derivative. Examples of cholesterol derivatives include, but are not limited to, cholestanol, cholestanone, cholestenone, coprostanol, cholesteryl-2'-hydroxyethyl ether, cholesteryl-4'-hydroxybutyl ether, and mixtures thereof.

The nanoparticle composition may contain 10 mol % or less of the PEG-lipid per nanoparticle composition. The nanoparticle composition may comprise 10 mol %, 9 mol %, 8 mol %, 7 mol %, 6 mol %, 5 mol %, 4 mol %, 3 mol %, 2 mol %, or 1 mol %, or 0.1 mol %, or an amount in a range from a first of the foregoing numbers to a second of the foregoing numbers of the PEG-lipid per nanoparticle composition. The nanoparticle composition comprising the PEG-lipid may comprise nanoparticles with a smaller diameter than nanoparticles of the composition lacking the PEG-lipid.

The nanoparticle composition may contain "amphipathic lipid". As used herein, "amphipathic lipid" refers to any material having non-polar hydrophobic units or "tails", and polar "heads." Polar groups may include, but are not limited to, phosphate, carboxylic, sulfato, amino, sulfhydryl, nitro, and hydroxyl. Nonpolar groups may include, but are not limited to, long-chain saturated and unsaturated aliphatic hydrocarbon groups and such groups substituted by one or more cycloalkyl, cycloalkenyl, aryl, heteroaryl, or heterocycle group(s). Examples of amphipathic lipids include, but are not limited to, phospholipids, aminolipids, and sphingolipids. Representative examples of phospholipids include, but are not limited to, phosphatidylcholine, phosphatidylethanolamine, phosphatidylserine, phosphatidylinositol, phosphatidic acid, palmitoyloleoyl phosphatidylcholine, lysophosphatidylcholine, lysophosphatidylethanolamine. Representative examples of the phosphatidylcholine include, but are not limited to, dipalmitoylphosphatidyl choline, dioleoylphos-phatidylcholine, distearoylphosphatidylcholine, 1,2-dioleoyl-sn-glycero-3-phosphocholine (DOPC), and dilinoleoylphosphatidylcholine. Representative examples of the phosphatidylethanolamine include, but are not limited to, 1-palmitoyl-2-oleoyl-sn-glycero-3-phosphoethanolamine (POPE), and 1,2-dioleoyl-sn-glycero-3-phosphoethanolamine or DOPE.

The nanoparticle composition may contain the amphipathic lipid in the amount ranging from 10 mol % to 60 mol % per nanoparticle composition. The amphipathic mol % may be 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 mol % or a value in a range from a first of the foregoing values to a second of the foregoing values, where the first and second values selected are any two of the foregoing values and the first value is less than the second.

In an embodiment, the nanoparticle composition may include cholesterol or cholesterol derivative. Examples of cholesterol derivatives include, but are not limited to, cholestanol, 5,6-epoxy cholestanol, cholestanone, cholestenone, coprostanol, cholesteryl-2'-hydroxyethyl ether, cholesteryl-4'-hydroxybutyl ether, 24-ethyl cholesterol, 24-methyl cholesterol, cholenic Acid, 3-hydroxy-5-cholestenoic Acid, cholesteryl palmitate, cholesteryl arachidonate, cholesteryl arachidate, cholesteryl myristate, cholesteryl palmitoleate, cholesteryl lignocerate, cholesteryl oleate, cholesteryl stearate, cholesteryl erucate, cholesterol α-linolenate, cholesteryl linoleate, cholesteryl homo-7-linolenate, 4-hydroxy cholesterol, 6-hydroxy cholesterol, 7-hydroxy cholesterol, 19-hydroxy cholesterol, 20-hydroxy cholesterol, 22-hydroxy cholesterol, 24-hydroxy cholesterol, 25-hydroxy cholesterol, 27-hydroxy cholesterol, 27-alkyne cholesterol, 7-keto cholesterol, 7-dehydro cholesterol, 8-dehydro cholesterol, 24-dehydro cholesterol, 5α-hydroxy-6-keto cholesterol, 20,22-dihydroxy cholesterol, 7,25-dihydroxy cholesterol, 7,27-dihydroxy cholesterol, 7-keto-25-hydroxy cholesterol, fucosterol, phytosterol, cholesteryl 11,14-eicosadienoate, dimethyl hydroxyethyl aminopropane carbamoyl cholesterol iodide and mixtures thereof. The cholesterol derivative may comprise a sugar moiety and/or one or more amino acids. Exemplary, non-limiting sugars for a cholesterol derivative include glucose, mannose, galactose, fructose, sucrose, lactose, trehalose. Exemplary, non-limiting, amino acids for a cholesterol derivative include serine, threonine, lysine, histidine, arginine. The nanoparticle composition may include the cholesterol or cholesterol derivative in an amount ranging from 20 mol % to 75 mol % per nanoparticle composition. The cholesterol or cholesterol derivative mol % may be 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 mol % or a value in a range from a first of the foregoing values to a second of the foregoing values, where the first and second values selected are any two of the foregoing values and the first value is less than the second.

In an embodiment, a nanoparticle composition; e.g., a pharmaceutical composition herein, may be sterilized by conventional, well-known sterilization techniques. Aqueous solutions may be packaged for use or lyophilized. The lyophilized preparation may be combined with a sterile aqueous solution prior to administration. In an embodiment, a nanoparticle composition may include a pharmaceutically acceptable carrier. As used herein, the term "pharmaceutically-acceptable carrier" means a pharmaceutically acceptable material, composition or vehicle, for example a liquid or solid filler, diluent, excipient, manufacturing aid (e.g., lubricant, talc magnesium, calcium or zinc stearate, or steric acid), or solvent encapsulating material, involved in carrying or transporting the subject compound from one organ, or portion of the body, to another organ, or portion of the body.

Each carrier is "pharmaceutically acceptable" in the sense of being compatible with the other ingredients of the formulation and not injurious to the subject. Some examples of materials which may serve as pharmaceutically-acceptable carriers include: (1) sugars, for example lactose, glucose, mannose and/or sucrose; (2) starches, for example corn starch and/or potato starch; (3) cellulose, and its derivatives, for example sodium carboxymethyl cellulose, methylcellulose, ethyl cellulose, microcrystalline cellulose and/or cellulose acetate; (4) powdered tragacanth; (5) malt; (6) gelatin; (7) lubricating agents, for example magnesium stearate, sodium lauryl sulfate and/or talc; (S) excipients, for example cocoa butter and/or suppository waxes; (9) oils, for example peanut oil, cottonseed oil, safflower oil, sesame oil, olive oil, corn oil and/or soybean oil; (10) glycols, for example propylene glycol; (11) polyols, for example glycerin, sorbitol, and/or mannitol; (12) esters, for example glycerides, ethyl oleate and/or ethyl laurate; (13) agar; (14) buffering agents, for example magnesium hydroxide and/or aluminum hydroxide; (15) alginic acid; (16) pyrogen-free water; (17) diluents, for example isotonic saline, and/or PEG400; (18) Ringer's solution; (19) C2-C12 alcohols, for example ethanol; (20) fatty acids; (21) pH buffered solutions; (22) bulking agents, for example polypeptides and/or amino acids (23) serum component, for example serum albumin, HDL and LDL; (24) surfactants, for example polysorbates (Tween 80) and/or poloxamers; (25) vitamin molecules (26) amino acid molecules (27) hormone molecules (28) neurotransmitter molecules (29) antioxidants and/or (30) other non-toxic compatible substances employed in pharmaceutical formulations: for example, fillers, binders, wetting agents, coloring agents, release agents, coating agents, sweetening agents, flavoring agents, perfuming agents, preservatives and/or antioxidants. The terms "excipient," "pharmaceutically acceptable carrier." or the like are used interchangeably herein.

An embodiment comprises a method for treating or preventing a disease or condition in a subject. The method may comprise providing any one of the nanoparticle compositions or pharmaceutical compositions described herein. The method may comprise administering a therapeutically effective amount of the nanoparticle composition to a subject.

An embodiment comprises a method for delivering a nucleic acid to a subject. The method may involve providing any one of the nanoparticle compositions disclosed herein. The method may comprise administering any one or more of the nanoparticle compositions herein to a subject. The method may comprise administering a delivery effective amount of any one or more of the nanoparticle compositions herein to a subject. As used herein, a "delivery effective amount" is an amount sufficient to result in a detectable level of expressed product. The delivery effective amount may be a therapeutically effective amount.

As used herein, the term "therapeutically effective amount" refers to the amount of nanoparticle composition which is effective for producing a desired therapeutic effect. The therapeutic effect may be achieved at a reasonable benefit/risk ratio applicable to medical treatment. A "therapeutically effective amount" may refer to an amount sufficient to generate appearance of antigen-specific antibodies in serum. A "therapeutically effective amount" may refer to an amount sufficient to cause a decrease in disease symptoms. A "therapeutically effective amount" may refer to an amount sufficient to cause a disappearance of disease symptoms. When treating viral infection, a decrease of disease symptoms may be assessed by decrease of virus in faeces, in bodily fluids, or in secreted products. The nanoparticle compositions may be administered using an amount and by a route of administration effective for generating an immune response.

Therapeutic efficacy may depend on effective amounts of active agents and time of administration necessary to achieve a desired result. Administering a nanoparticle composition may be a preventive measure. Administering of a nanoparticle composition may be a therapeutic measure to promote immunity to the infectious agent, to minimize complications associated with the slow development of immunity especially in patients with a weak immune system, the elderly, or infants.

The exact dosage may be chosen by the clinician based on a variety of factors and in view of individual patients. Dosage and administration may be adjusted to provide sufficient levels of the active agent or agents or to maintain the desired effect. For example, factors which may be taken into account may include the type and severity of a disease; age and gender of the patient; drug combinations; and an individual response to therapy.

Therapeutic efficacy and toxicity of active pharmaceutical agents in a nanoparticle composition may be determined by standard pharmaceutical procedures, for example, by determining the therapeutically effective dose in 50% of the population (ED50) and the lethal dose to 50% of the population (LD50) in cells cultured in vitro or experimental animals. Nanoparticle compositions may be evaluated based on the dose ratio of toxic to therapeutic effects (LD50/ED50), called the therapeutic index, the large value of which may be used for assessment. The data obtained from cell and animal studies may be used in formulating a dosage for human use.

The therapeutically effective dose may be estimated initially from cell culture assays. A therapeutically effective dose may be formulated in animal models to achieve a circulating plasma concentration range that includes the IC50 (i.e., the concentration of the therapeutic which achieves a half-maximal inhibition of symptoms) as determined in cell culture. Levels in plasma may be measured, for example, by high performance liquid chromatography. The effects of any particular dosage may be monitored by a suitable bioassay.

The amount of particles administered will depend upon the particular therapeutic agent (e.g., nucleic acid) used, the disease or disorder being treated, the age, weight, and condition of the patient, and the judgment of the clinician. A therapeutically effective amount may be a dose from 0.001 ng to 50 mg of the therapeutic or immunogenic nucleic acid per kilogram of body weight of the subject. A therapeutically effective amount may be a dose of 0.001 ng, 0.002 ng, 0.003 ng, 0.004 ng, 0.005 ng, 0.006 ng, 0.007 ng, 0.008 ng, 0.009 ng, 0.01 ng, 0.02 ng, 0.03 ng, 0.04 ng, 0.05 ng, 0.06 ng, 0.07 ng, 0.08 ng, 0.09 ng, 0.1 ng, 0.2 ng, 0.3 ng, 0.4 ng, 0.5 ng, 0.6 ng, 0.7 ng, 0.8 ng, 0.9 ng, 0.001 g, 0.002 kg, 0.003 g, 0.004 kg, 0.005 g, 0.006 kg, 0.007 kg, 0.008 g, 0.009 g, 0.01 kg, 0.02 g, 0.03 g, 0.04 g, 0.05 kg, 0.06 g, 0.07 g, 0.08 g, 0.09 g, 0.1 g, 0.2 g, 0.3 g, 0.4 g, 0.5 g, 0.6 g, 0.7 g, 0.8 g, 0.9 g, 1 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, 20 mg, 21 mg, 22 mg, 23 mg, 24 mg, 25 mg, 26 mg, 27 mg, 28 mg, 29 mg, 30 mg, 31 mg, 32 mg, 33 mg, 34 mg, 35 mg, 36 mg, 37 mg, 38 mg, 39 mg, 40 mg, 41 mg, 42 mg, 43 mg, 44 mg, 45 mg, 46 mg, 47 mg, 48 mg, 49 mg, or 50 mg of the therapeutic or immunogenic nucleic acid per kilogram of body weight of the subject, or a value in a range from a first of the foregoing values to a second of the foregoing values, where the first and second values selected are any two of the foregoing values and the first value is less than the second. The therapeutic and immunogenic nucleic acid may be a combination of different nucleic acids used per treatment dose. The terms "subject" means a human or animal. Preferably, the animal is a vertebrate such as a primate, rodent, domestic animal or game animal. Primates include chimpanzees, cynomolgus monkeys, spider monkeys, and macaques, e.g., Rhesus. The rodent may be selected from mice, rats, guinea pigs, woodchucks, ferrets, rabbits and hamsters. The domestic or game animals may be selected from cows, horses, pigs, deer, bison, buffalo, feline species, e.g., domestic cat, canine species, e.g., dog, fox, wolf, avian species, e.g., chicken, emu, ostrich, and fish, e.g., trout, catfish and salmon. A patient or subject may be selected from the foregoing or a subset of the foregoing. A patient or subject may be selected from all of the above, but excluding one or more groups or species such as humans, primates or rodents. In an embodiment, the patient or subject may be a mammal, e.g., a primate, e.g., a human. The terms, "patient" and "subject" are used interchangeably herein. Preferably, the subject is a mammal. The mammal may be a human, non-human primate, mouse, rat, dog, cat, horse, cow, or swine but is not limited to these examples. Mammals other than humans may be subjects that represent animal models of a disease or disorder. In addition, the methods described herein may be directed to treating domesticated animals and/or pets. A subject may be male or female.

As used herein, the terms "administer," "administering," "administration," or the like refer to the placement of a composition into a subject. The administration may be by a method or route which results in at least partial localization of the composition at a desired site. Placement at a desired site may lead to a production of a desired effect. A nanoparticle composition described herein may be administered by any appropriate route known in the art including, but not limited to, oral or parenteral routes, including intravenous, intramuscular, subcutaneous, transdermal, airway (aerosol), pulmonary, nasal, rectal, topical, buccal, or sublingual administration.

Exemplary modes of administration include, but are not limited to, injection, infusion, instillation, inhalation, or ingestion. "Injection" includes without limitation, intravenous, intramuscular, intraarterial, intrathecal, intraventricular, intracapsular, intraorbital, intracardiac, intradermal, intraperitoneal, trans tracheal, subcutaneous, subcuticular, intraarticular, sub capsular, subarachnoid, intraspinal, intracerebral, and intrasternal injection and infusion. In an embodiment, the compositions may be administered by intravenous infusion or injection.

The nanoparticle compositions may be used for delivery of therapeutic or immunogenic nucleic acids for gene targeting or modulating gene expression. The therapeutic or immunogenic nucleic acid may be an antisense oligonucleotide (AON) or a double-stranded small interfering RNA (siRNA). Typically, siRNAs are between 21 and 23 nucleotides in length. The siRNAs may comprise a sequence complementary to a sequence contained in an mRNA transcript of a target gene when expressed within the host cell. The antisense oligonucleotide may be a morpholino antisense oligonucleotide. The antisense oligonucleotide may include a sequence complementary to a sequence contained in an mRNA transcript of a target gene. The therapeutic or immunogenic nucleic acid may be an interfering RNA (iRNA) against a specific target gene within a specific target organism. The iRNA may induce sequence-specific silencing of the expression or translation of the target polynucleotide, thereby down-regulating or preventing gene expression. The iRNA may completely inhibit expression of the target gene. The iRNA may reduce the level of expression of the target gene compared to that of an untreated control. The therapeutic or immunogenic nucleic acid may be a microRNA (miRNA). The miRNA may be a short RNA, e.g., a hairpin RNA (hpRNA). The miRNA may be cleaved into biologically active dsRNA within the target cell by the activity of the endogenous cellular enzymes. The RNA may be a double stranded RNA (dsRNA). The ds RNA may be at least 25 nucleotides in length or may be longer. The dsRNA may contain a sequence that is complementary to the sequence of the target gene or genes. An embodiment comprises use of a nanoparticle composition for gene targeting in a subject. An embodiment comprises a method of gene targeting comprising administering a nanoparticle composition herein to a subject.

In an embodiment, the therapeutic or immunogenic nucleic acid may be or may encode an agent that totally or partially reduces, inhibits, interferes with, or modulates the activity or synthesis of, one or more genes encoding target proteins. The target genes may be any genes included in the genome of a host organism. The sequence of the therapeutic or immunogenic nucleic acid may not be 100% complementary to the nucleic acid sequence of the target gene.

In an embodiment, the nanoparticle composition may be used for targeted, specific alteration of the genetic information in a subject. An embodiment comprises targeted, specific alteration of the genetic information in a subject comprising administration of a nanoparticle composition herein. As used herein, the term "alteration" refers to any change in the genome in the cells of a subject. The alteration may be insertion or deletion of nucleotides in the sequence of a target gene. "Insertion" refers to addition of one or more nucleotides to a sequence of a target gene. The term "deletion" refers to a loss or removal of one or more nucleotides in the sequence of a target gene. The alteration may be correction of the sequence of a target gene. "Correction" refers to alteration of one or more nucleotides in the sequence of a target gene, e.g., by insertion, deletion or substitution, which may result in a more favorable expression of the gene manifested by improvements in genotype and/or phenotype of the host organism. An embodiment comprises use of a nanoparticle composition herein for targeted, specific alteration of the genetic information in a subject. An embodiment comprises a method of targeted, specific alteration of the genetic information in a subject comprising administering a nanoparticle composition herein to the subject. An embodiment comprises use of a nanoparticle composition herein for the alteration of the genetic information in the cells of a subject ex vivo by administration of the nanoparticle composition directly to the solution in which the subject's cells are cultured or suspended.

The alteration of the genetic information may be achieved via the genome editing techniques. As used herein, "genome editing" refers to the process of modifying the nucleotide sequence in the genome in a precise or controlled manner.

An exemplary genome editing system is a Clustered Regularly Interspaced Short Palindromic Repeats (CRISPR) system as described, for example, in WO 2018/154387, which published Aug. 30, 2018 and is incorporated herein by reference as if fully set forth. In general, "CRISPR system" refers to transcripts and other elements involved in the expression of CRISPR-associated (Cas) genes, including sequences encoding a Cas gene, a tracr (trans-activating CRISPR) sequence, a tracr-mate sequence, a guide sequence, or other sequences and transcripts from a CRISPR locus. One or more tracr mate sequences may be operably linked to a guide sequence before processing or crRNA after processing by a nuclease. The tracrRNA and crRNA may be linked and may form a chimeric crRNA-tracrRNA hybrid where a mature crRNA is fused to a partial tracrRNA via a synthetic stem loop to mimic the natural crRNA:tracrRNA duplex as described in Cong et al., Science, 15:339(6121): 819-823 (2013) and Jinek et al., Science, 337(6096):816-21 (2012), which are incorporated herein by reference as if fully set forth. A single fused crRNA-tracrRNA construct is also referred herein as a guide RNA or gRNA, or single-guide RNA (sgRNA). Within an sgRNA, the crRNA portion is identified as the "target sequence" and the tracrRNA is often referred to as the "scaffold." In an embodiment, the nanoparticle compositions described herein may be used to deliver an sgRNA.

In an embodiment, the nanoparticle compositions may be used to apply other exemplary genome editing systems including meganucleases, homing endonucleases, TALEN-based systems, or Zinc Finger Nucleases. The nanoparticle compositions may be used to deliver the nucleic acid (RNA and/or DNA) that encodes the sequences for these gene editing tools, and the actual gene products, proteins, or other molecules.

An embodiment comprises use of a nanoparticle composition herein for genome editing in a subject. An embodiment comprises a method of genome editing in a subject comprising administering a nanoparticle composition herein to the subject. The nucleic acid in these embodiments may be a sgRNA. The nucleic acid in these embodiments may be one for genome editing via meganucleases, homing endonucleases, TALEN-based systems, or Zinc Finger Nucleases.

In an embodiment, the nanoparticle composition may be used for gene targeting in a subject in vivo or ex vivo, e.g., by isolating cells from the subject, editing genes, and implanting the edited cells back into the subject. An embodiment comprises a method comprising administering a nanoparticle composition herein to isolated cells from a subject. The method may include gene targeting. The method may comprise implanting the edited cells back into the subject (or into another subject).

An embodiment comprises a method for introducing an agent into a cell. The method may comprise exposing the cell to a nanoparticle composition herein. The method may be a method of transfection when the agent is a nucleic acid. The agent may be introduced into cells by mixing a solution of nanoparticles composed as described herein with the liquid medium in which the cells are cultured.

EXAMPLES

The following non-limiting examples are provided to illustrate particular embodiments. The embodiments throughout may be supplemented with one or more details from one or more examples below, and/or one or more elements from an embodiment may be substituted with one or more details from one or more examples below.

Example 1. Nanoparticle Compositions Containing Nucleic Acid Carriers of Formula 1b Scheme 1 is a schematic drawing of the synthesis of a nucleic acid carrier with disulfide-based hydrophobic chains that can be used for helping with self-assembly as well as biodegradability of the carrier.

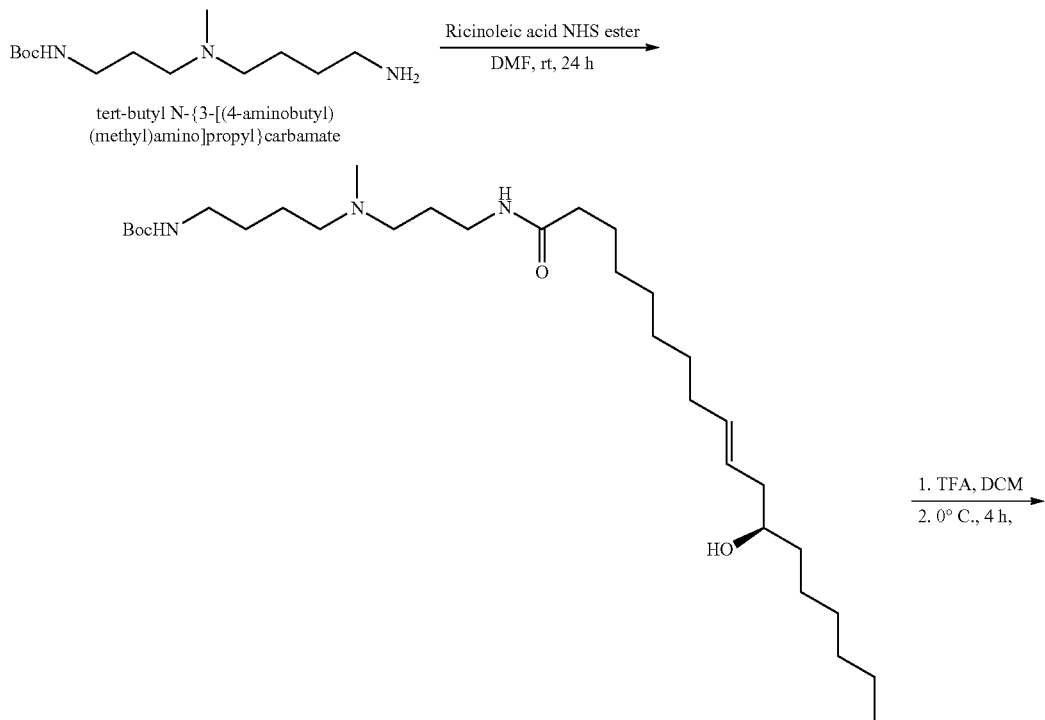

Compound 1

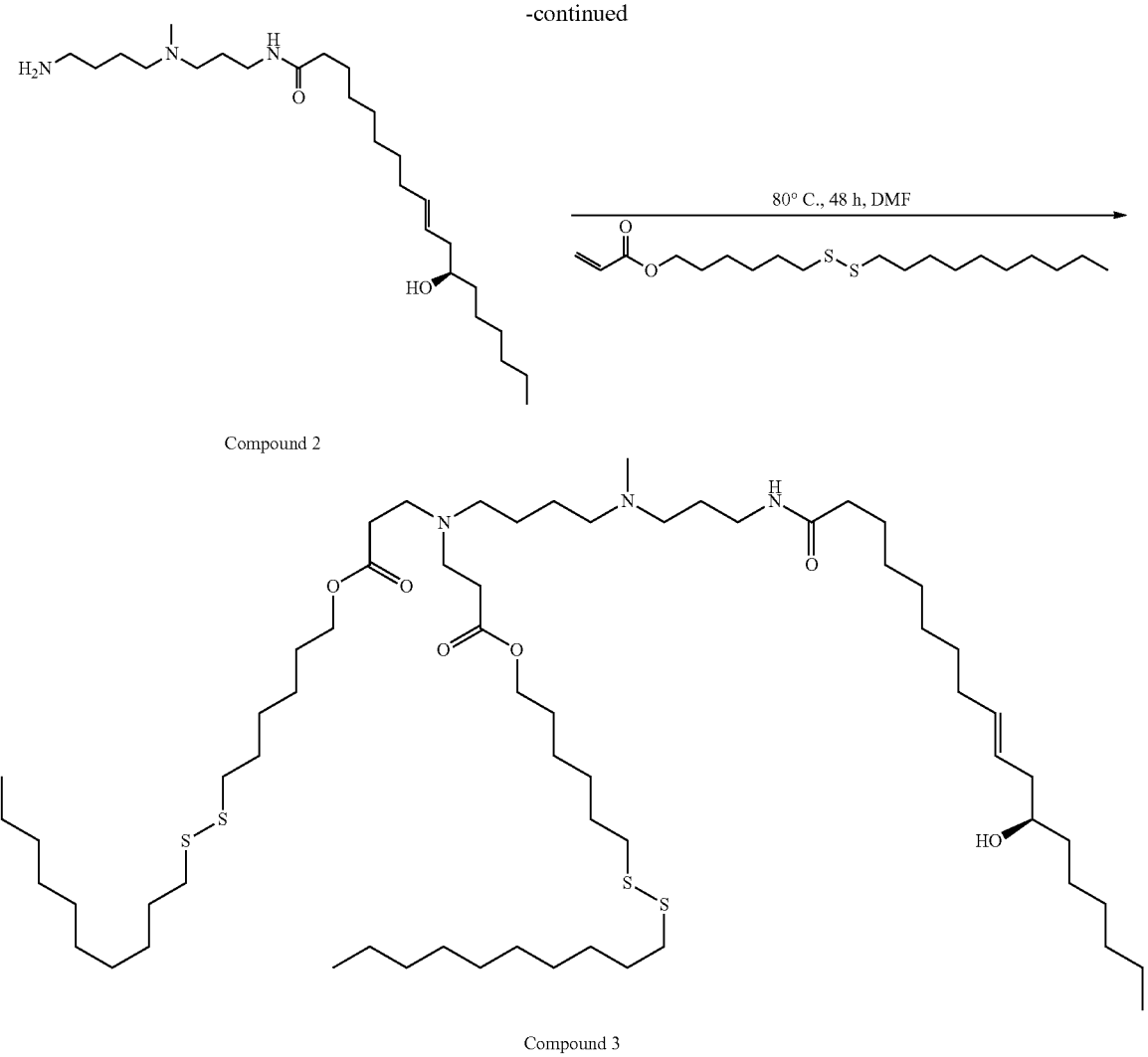

Compound 2

Compound 3

Compound 1: 100 mg of N-{3-{(4-aminobutyl)(methyl)amino]propyl}-carbamate (0.39 mmol, MW: 259.49) was dissolved in 1.5 ml dry DMF, added 0.16 ml Et$_3$N (1.15 mmol, 3 eq) followed by dropwise addition of 304 mg of Ricinoleic-NHS (0.77 mmol) (as synthesized following published procedure: Talukder et al., Publication Number WO/2020/132196, which is incorporated herein by reference as if fully set forth) dissolved in 1.5 ml DMF. The reaction mixture was stirred at 23° C. for 24 h under Argon atmosphere. The reaction mixture was purified via flash chromatography on silica column (24 g) with gradient elution from 100% CH$_2$Cl$_2$ (mobile phase a) to 75:22:3 CH$_2$Cl$_2$/MeOH/NH$_4$OHaq (by volume, mobile phase b). The desired product eluted at 30% mobile phase b. (R$_f$=0.3 in 75:22:3 CH$_2$Cl$_2$/MeOH/NH$_4$OH(aq)) to yield the desired product as clear oil (150 mg, 72%). MS (ESI) calcd for C31H61N3O4 [M+H]$^+$ m/z 540.47, found 540.4.

Compound 2: 125 mg (0.23 mmol) of Compound 1 (MW=540 g/mol) was dissolved in 5.5 mL dry CH$_2$Cl$_2$ and was transferred to a 25 mL round bottom flask, which was then cooled to 0° C. Then 0.6 mL of TFA (7.84 mmol, 34 eq) was added and the reaction proceeded to completion in 5 hours. The solvent was evaporated, TFA was removed by co-evaporation with methanol and dichloromethane. The reaction mixture was purified via flash column chromatography on 12 g silica column with gradient elution from 100% CH$_2$Cl$_2$ (mobile phase a) to 75:22:3 CH$_2$Cl$_2$/MeOH/NH$_4$OH (aq) (by volume, mobile phase b). The intermediate compound eluted at 65% mobile phase b (R$_f$=0.2 in mobile phase b) as a clear wax (60 mg, 59%). MS (ESI) calcd for C26H53N3O2 [M+H]$^+$ m/z 440.42, found 440.4.

Compound 3: Compound 2 (60 mg, 0.14 mmol) was added to a 4 mL glass vial along with 2.3 equivalents of disulfide acrylate (124 mg, 0.35 mmol; synthesis was adapted from published procedure: Ryu et al. 2010 Langmuir. 26(10):7086-92, which is incorporated herein by reference as if fully set forth), 0.5 mL dry DMF was added. The vial was flushed with argon and tightly capped. The reaction mixture was stirred at 80° C. for 48 hours. After 48 hours, TLC confirmed the reaction was completed. The reaction mixture was purified via flash chromatography on 12 g silica column with gradient elution from 100% CH$_2$Cl$_2$ (mobile phase a) to 75:22:3 CH$_2$Cl$_2$/MeOH/NH4OHaq (by volume, mobile phase b). The desired product eluted at 20% mobile phase b (R$_f$=0.4 in 2:1 mobile phase a/mobile phase b) to yield the desired product as yellow wax (121 mg, 10%). MS (MALDI) calcd for C64H125N3O6S4 [M]$^+$ 1159.85, found 1160.0.

Nanoparticle Formulation

Nanoparticles containing compound 3:DOPE:cholesterol: DMG-PEG2k at molar ratios of 1:0.25:0.9625:0.0375 and RNA at two different weight ratios were formulated using NanoAssemblr Benchtop (Precision NanoSystems Inc, Vancouver, BC, Canada)). RNA was diluted with DNase/RNase-Free, endotoxin free distilled water and sterile acetate buffer to a final desired pH. Total flow rate was maintained at 8 mL per min at a 3:1 ratio of aqueous to organic phase for formulating on the Benchtop. Using glassware depyrogenated by heating at 250° C. for 24 h, nanoparticles were dialyzed against sterile, endotoxin-free PBS using 20,000 molecular weight cutoff dialysis. Dialyzed nanoparticles were sterile filtered using 0.2 micron poly(ether sulfone) filters and characterized with a Zetasizer NanoZS machine (Malvern). The size distributions were characterized by a single peak with a low polydispersity index. Encapsulation efficiency was measured to be 95% for the nanoparticle composition containing compound 3 and SEAP mRNA or SEAP replicon RNA (formulated at pH 5) using Ribogreen® assay (Geall et al. 10.1073/pnas.1209367109 which is incorporated herein by reference as if fully set forth).

Hydrodynamic Size Measurement

Table 1 illustrates distribution of the nanoparticle composition measured as the intensity (Z average) based on size (d.nm; diameter in nm) of the nanoparticles. Referring to Table 1, the "Z average" of the nanoparticle composition containing compound 3 and SEAP replicon RNA and SEAP mRNA as a function of size was determined by dynamic light scattering (DLS). The size distributions were characterized by a single peak with a low polydispersity index, indicating a relatively monodisperse size.

TABLE 1

| Nanoparticle | Z-Ave(d · nm) | PDI |
|---|---|---|
| NP1 | 96.8 | 0.15 |
| NP2 | 91.7 | 0.17 |
| NP3 | 91.3 | 0.15 |
| NP4 | 92.91 | 0.13 |

NP1: SEAP Replicon RNA-Compound 3 (mass ratio 15:1)
NP2: SEAP Replicon RNA-Compound 3 (mass ratio 10:1)
NP3: SEAP mRNA-Compound 3 (mass ratio 15:1)
NP4: SEAP mRNA-Compound 3 (mass ratio 10:1)

In Vivo SEAP Production Results

Now referring to FIG. 1, to test the ability of the nanoparticles formulated with compound 3 to express SEAP in vivo, mice were injected with nanoparticles at a dose of 2 µg of SEAP mRNA or SEAP replicon RNA, and 16 hrs later, serum was collected from the mice. The amount of SEAP was quantified using the Invitrogen NovaBright™ PhosphaLight™ EXP Assay kits for SEAP detection according to the manufacturer's protocol. The amount of SEAP in the mouse serum samples are reported in Arbitrary Units (A.U.) as measured in a BioTek Synergy HTX microplate reader where error bars are ±S.E.M. Referring to FIG. 1, illustrates the SEAP expression of nanoparticle formulations with 10:1 compound 3:RNA had higher expression than the formulation containing 15:1 compound 3:RNA. SEAP expression is a common and widely-accepted reporter gene system across all mammals. This recent protocol highlights the use of SEAP, including in human cells: Wang M, Wang X, Ye H. Measurement of Secreted Embryonic Alkaline Phosphatase. Bio Protoc. 2023 Feb. 5; 13(3):e4600, which is incorporated by reference herein as if fully set forth. Furthermore, approved human mRNA vaccines were preclinically tested in mice, proving that mice are a valid model for human physiology in terms of expressing transgenes from RNA transcripts, generally (See Vogel, A. B., Kanevsky, I., Che, Y. et al. BNT162b vaccines protect rhesus macaques from SARS-CoV-2. Nature 592, 283-289 (2021), which is incorporated by reference herein as if fully set forth.

Example 2. Nanoparticle Compositions Containing Nucleic Acid Carriers of Formula 1c Scheme 2 is a schematic drawing of the synthesis of a triazole-based phospholipid nucleic acid carrier with fatty acid side chains that can be used for helping with self-assembly. Fatty acid side chain can be selected from any one of $C_4$-$C_{28}$ fatty acids. An example of the synthesis of as follows.

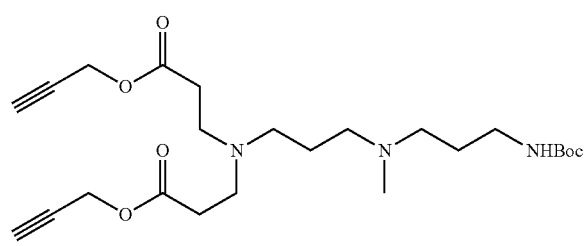 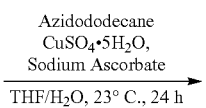

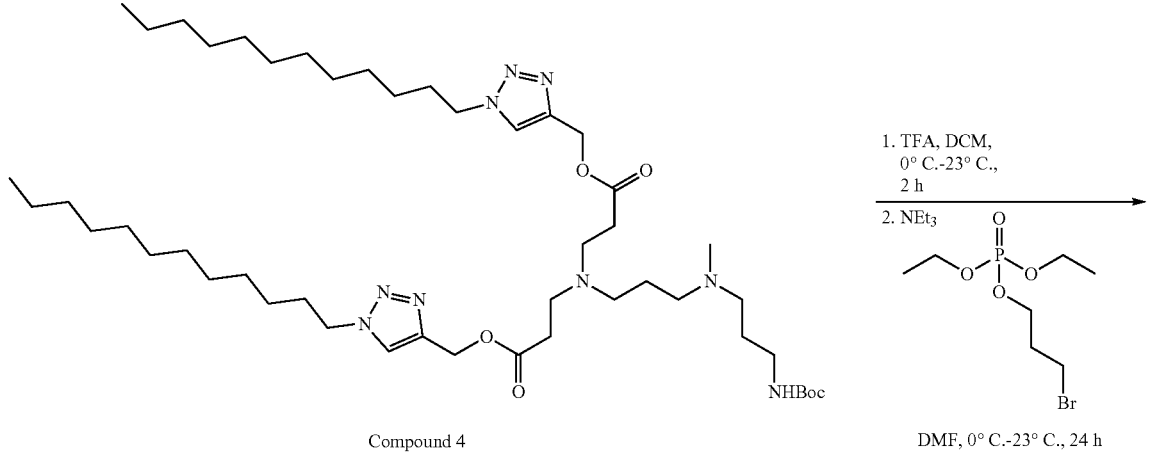

Compound 4

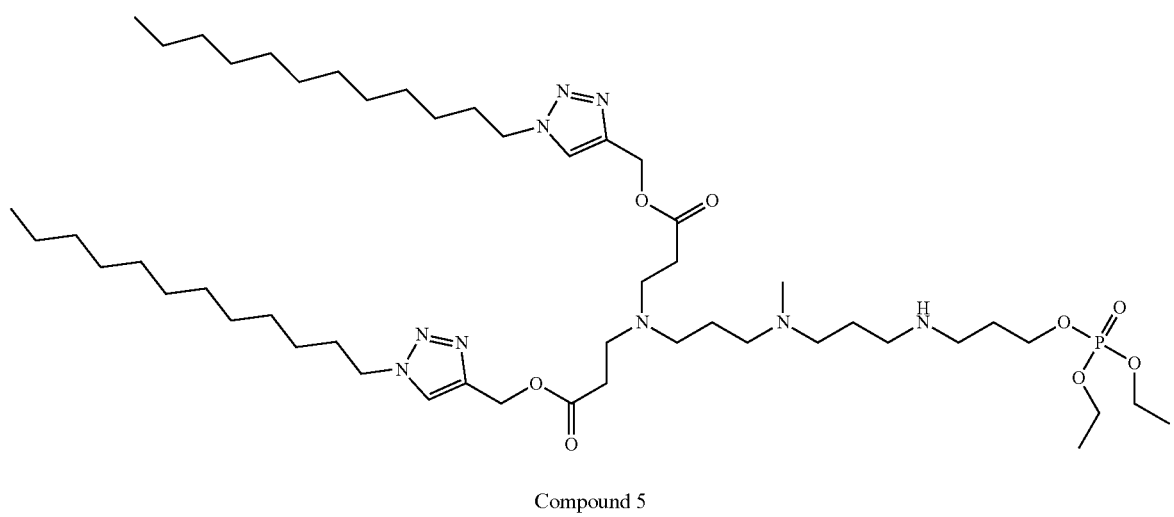

Compound 5

Compound 4: In a 25 ml RBF, CuSO$_4$·5H$_2$O (16 mg, 0.06 mmol, 20 mol %, MW 249.69) and sodium ascorbate (25.5 mg, 0.15 mmol, 40 mol %, MW 198.11) were taken. Dodecyl Azide (MW: 211.35 g/mol, 258 mg, 0.97 mol) dissolved in 2 mL dry THF and prop-2-yn-1-yl 2,2,9-trimethyl-4-oxo-13-(3-oxo-3-(prop-2-yn-1-yloxy)propyl)-3-oxa-5,9,13-triazahexadecan-16-oate (MW: 494 g/mol, 150 mg, 0.32 mmol, synthesis wasadapted following published procedure: Alabi et al 2013. Proc Natl Acad Sci USA. 110(32):12881-6 which is incorporated herein by reference as if fully set forth) dissolved in THF (2 mL) was added. Then degassed THF:H$_2$O (2 mL, 1:1) was added and the reaction mixture was stirred at 23° C. for 16 h. Next day TLC confirmed the reaction was completed. The reaction mixture was purified via flash chromatography on 24 g silica column with gradient elution from 100% CH2Cl2 (mobile phase a) to 75:22:3 $CH_2Cl_2$/MeOH/$NH_4$OHaq (by volume, mobile phase b). The desired product eluted at 12% mobile phase b ($R_f$=0.43 in 1:2 mobile phase a:b) to yield the desired product as a bright yellow solid (207 mg, 63%). MS (ESI) calcd for $C_{48}H_{89}N_9O_6$ $[M+H]^+$ m/z 888.7, found 888.6.

Compound 5: 488 mg (0.55 mmol) of Compound 4 (MW=888.3 g/mol) was dissolved in 14 mL DCM and was transferred to a 25 mL round bottom flask, which was then cooled to 0° C. Then 1.4 mL of TFA (18.2 mmol, 33 eq) was added and the reaction proceeded to completion in 2 hours. The solvent was evaporated, TFA was removed by co-evaporation with methanol and the product was purified by column chromatography on 40 g silica column with gradient elution from 100% CH2Cl2 (mobile phase a) to 75:22:3 $CH_2Cl_2$/MeOH/$NH_4$OHaq (by volume, mobile phase b). The intermediate compound eluted at 56% mobile phase b ($R_f$=0.46 in 1:2 mobile phase a:b) as pale-yellow solid (294 mg, 68%). 71 mg (0.09 mmol) of intermediate compound was added to the round bottom flask, dissolved in 2.2 mL DMF and the reaction was cooled to 0° C. Then, 120 mg (0.439 mmol, 4.8 eq) of 3-bromopropyl diethyl phosphate was dissolved in 0.75 mL DMF and added dropwise to the reaction flask followed by 150 µL of triethyl amine (0.9 mmol, 10 eq). The reaction was stirred for 2 hours, after which the compound was purified by flash column chromatography on 12 g silica column with gradient elution from 100% CH2Cl2 (mobile phase a) to 75:22:3 $CH_2Cl_2$/MeOH/$NH_4$OHaq (by volume, mobile phase b). Compound eluted at 51% mobile phase b ($R_f$=0.48 in 1:1 mobile phase a:b) as white solid (15 mg, 17%). MS (ESI) calcd for $C_{50}H_{96}N_9O_7P$ $[M+3H]^+$ m/z 968.7, found 968.7.

Scheme 3 is a schematic drawing of the synthesis of a triazole based glycolipid nucleic acid carrier with fatty acid side chains that can be used for helping with self-assembly. Fatty acid side chain can be selected from any one of $C_4$-$C_{28}$ fatty acids. An example of the synthesis of as follows.

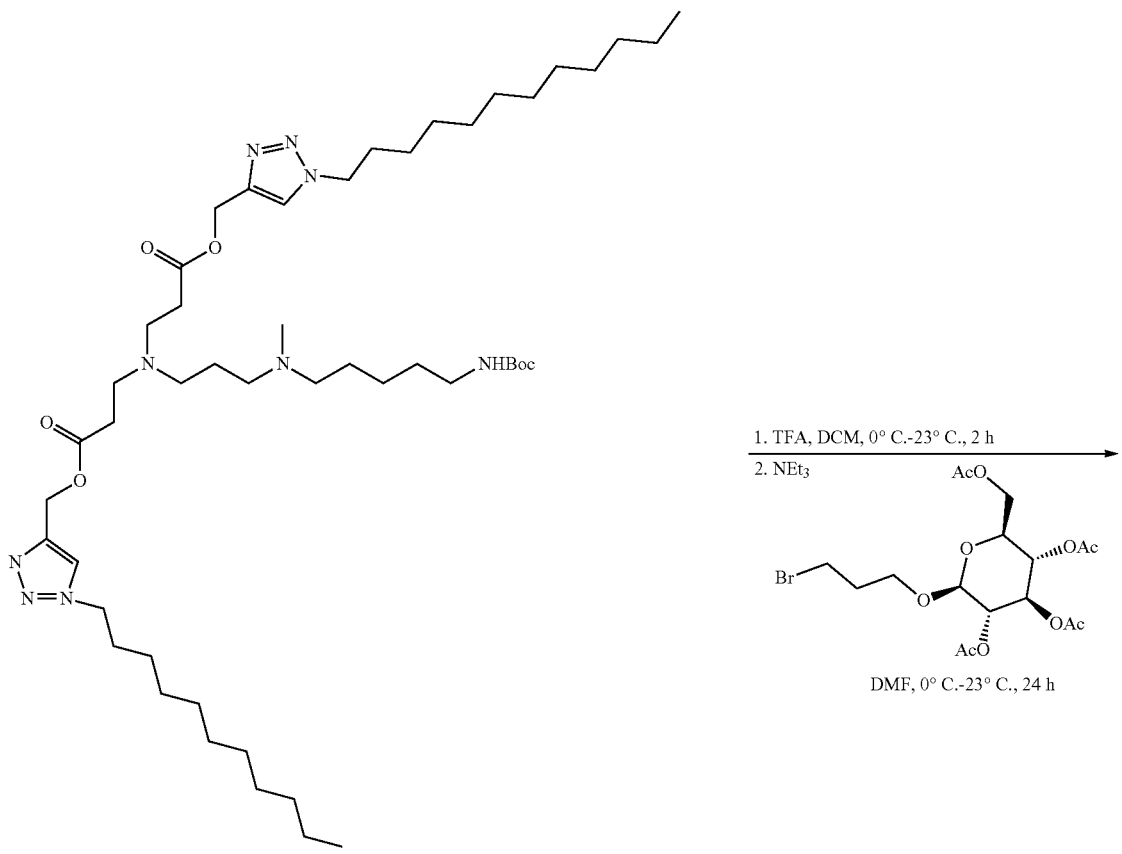

Compound 4

-continued

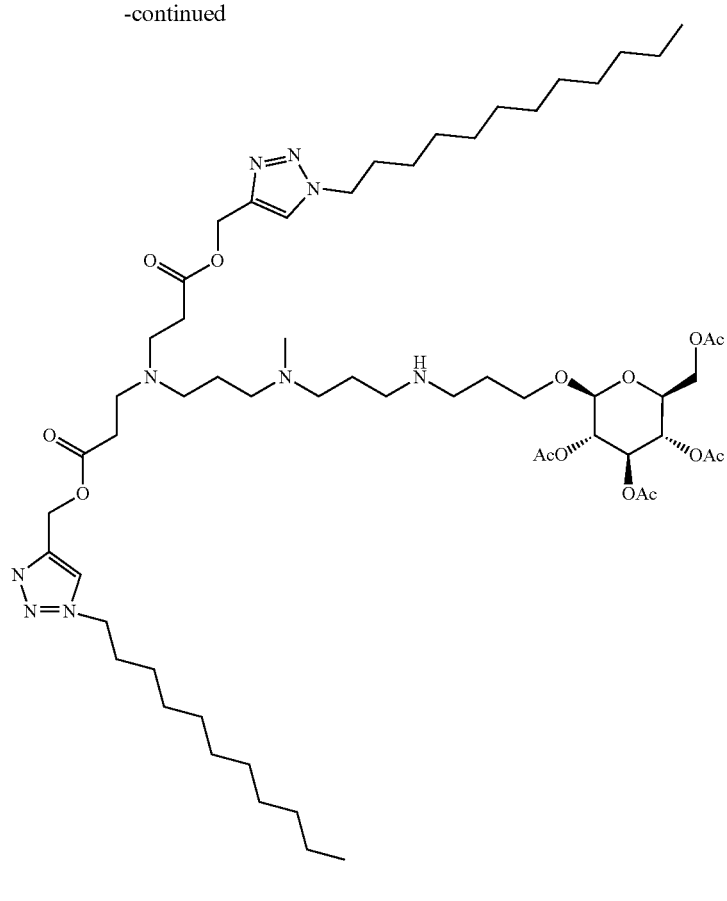

Compound 6

Compound 6: Intermediate compound was prepared starting from compound 4 as described above. 85.8 mg (MW=788.18, 0.1089 mmol) of intermediate compound was added to the round bottom flask, dissolved in 1.5 mL DMF and the reaction was cooled to 0 C. Then, 50 mg (0.1089 mmol, 1 eq) of 3-bromopropyl mannose tetra acetate was dissolved in 0.75 mL DMF and added dropwise to the reaction flask. Then, 150 μL of triethyl amine (1.089 mmol, 10 eq) was added to the reaction mixture. The reaction was stirred for 24 hours, after which the compound was purified on 12 g silica column with gradient elution from 100% CH2Cl2 (mobile phase a) to 75:22:3 $CH_2Cl_2$/MeOH/$NH_4OH$aq (by volume, mobile phase b). Compound eluted at 20% of mobile phase b ($R_f$=0.63 in 1:2 mobile phase a:b) as white solid (17.5 mg, 14%). MS (ESI) calcd for $C_{60}H_{106}N_9O_{14}$ $[M+H]^+$ m/z 1176.5, found 1176.8.

Nanoparticle Formulation

Figure 2:
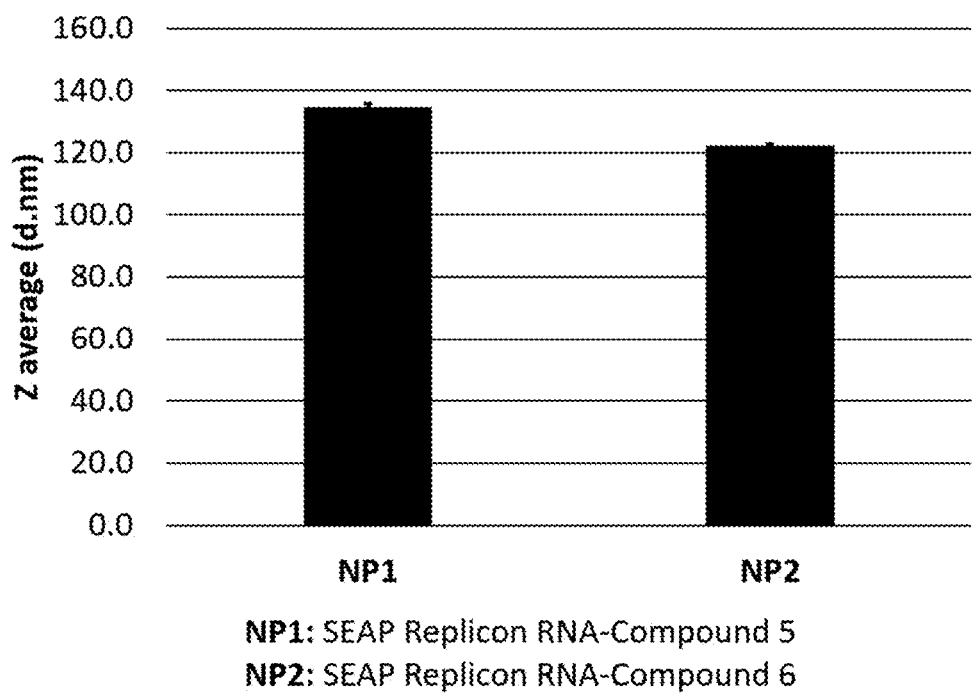
FIG. 2 illustrates the size distribution of the nanoparticle composition containing SEAP replicon RNA and compound 5 or 6, formulated by hand mixing.

Additionally, with reference to FIG. 2, nanoparticles were formulated by mixing 21 μl of an ethanol phase containing compound 5 or compound 6, cholesterol, DOPE, and DMG PEG 2000 (PEG-lipid, Avanti Polar Lipids) at molar ratio of 1:2:1.5:0.0375 with 63 μl of SEAP Replicon RNA encoding secreted embryonic alkaline phosphatase (diluted with UltraPure, DNase/RNase-free, endotoxin-free distilled water (Invitrogen) and sterile 100 mM (pH 5) citrate buffer to a final citrate concentration of 10 mM. The resulting nanoparticles contained 4:1 mass ratio of compound 5 or compound 6 to RNA. Formulations were diluted 100-fold for analysis of particle size distribution, Z-average, and derived count rate using a Zetasizer Nano ZS (Malvern Panalytical).

Hydrodynamic Size Measurement

The "Z average" of the nanoparticle composition containing compound 5 or compound 6, cholesterol, DOPE, DMG-PEG 2000 and SEAP Replicon RNA as function of size was determined by dynamic light scattering (DLS). Referring to FIG. 2, the Z average was observed for the nanoparticles of 134.3 d.nm in size and 122.0 d.nm in size respectively. Referring to FIG. 2, the size distributions were characterized with a low polydispersity index, indicating a relatively monodisperse size.

In Vitro SEAP Production Results

Figure 3:
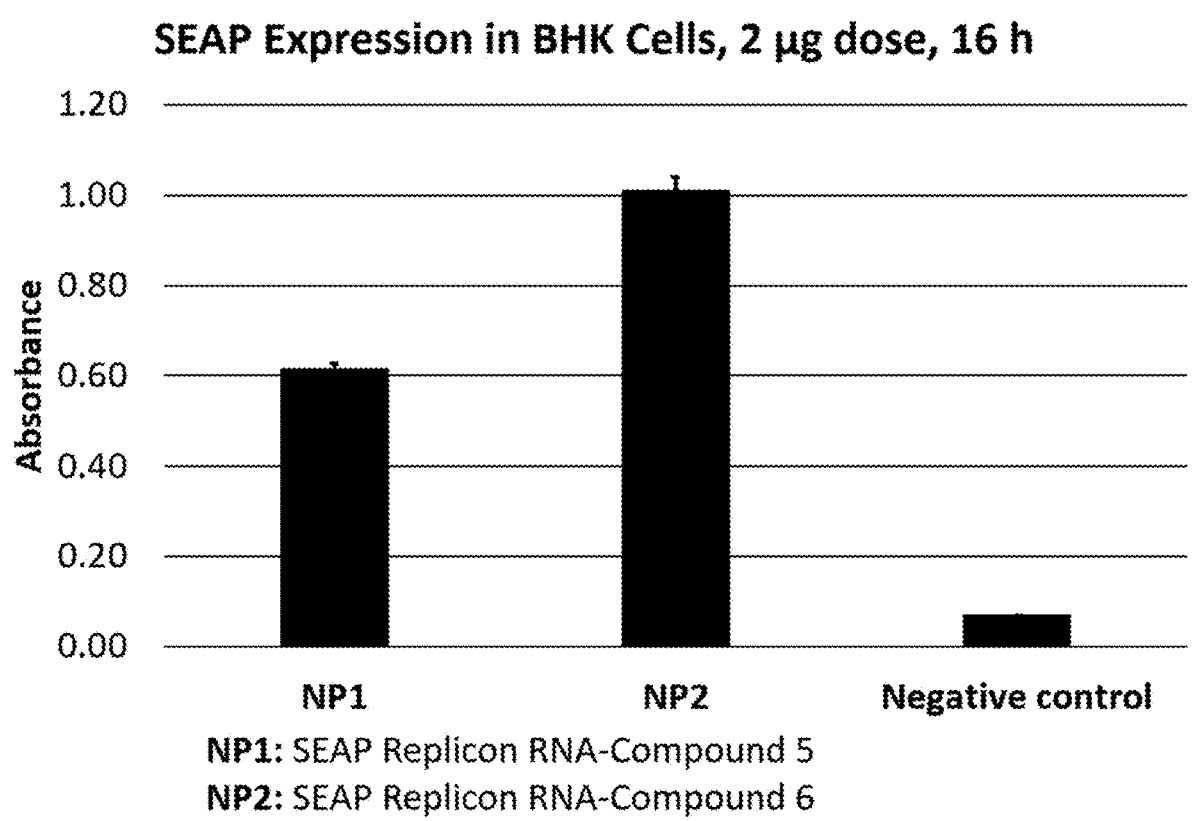
FIG. 3 illustrates quantification in vitro of SEAP expression after administration of nanoparticles containing SEAP replicon RNA and compound 5 or 6.

Now referring to FIG. 3, optical density measurements showing the expression of secreted alkaline phosphatase (SEAP) with nanoparticle formulations using compound 5 or compound 6 are shown. To test the ability of the nanoparticles formulated with compound 5 or compound 6 carrier to express SEAP in vitro, BHK cells were treated with nanoparticles. Each well of a 12 well dish of BHKs was treated with 20 μL (approximately 2 μg) of each formulation product diluted into a final volume of 600 μL with a 1:1 OptiMEM:PBS mix. After the treatment, BHK cells were incubated at 37° C. and 5% $CO_2$. After 24 hours, cell culture medium was collected and assayed for SEAP using the InvivoGen QUANTI-Blue™ detection system (San Diego, CA, USA), according to the manufacturer's protocol. Briefly, 50 μL of the cell culture medium was added to 150 μL of the QUANTI-Blue™ solution and incubated at 37° C. for 10 minutes. The Optical Density (OD) was measured at 620-655 nm using a microplate reader. FIG. 3 illustrates the SEAP expression of nanoparticle formulations using compound 5 and compound 6 based on optical density compared to the negative control.

Example 3. Nanoparticle Compositions Containing Nucleic Acid Carriers of Formula 1d Scheme 4 is a schematic drawing of the synthesis of a phospholipid nucleic acid carrier with fatty acid side chains that can be used for helping with self-assembly. Fatty acid side chain can be selected from any one of $C_4$-$C_{28}$ fatty acids. An example of the synthesis of as follows.

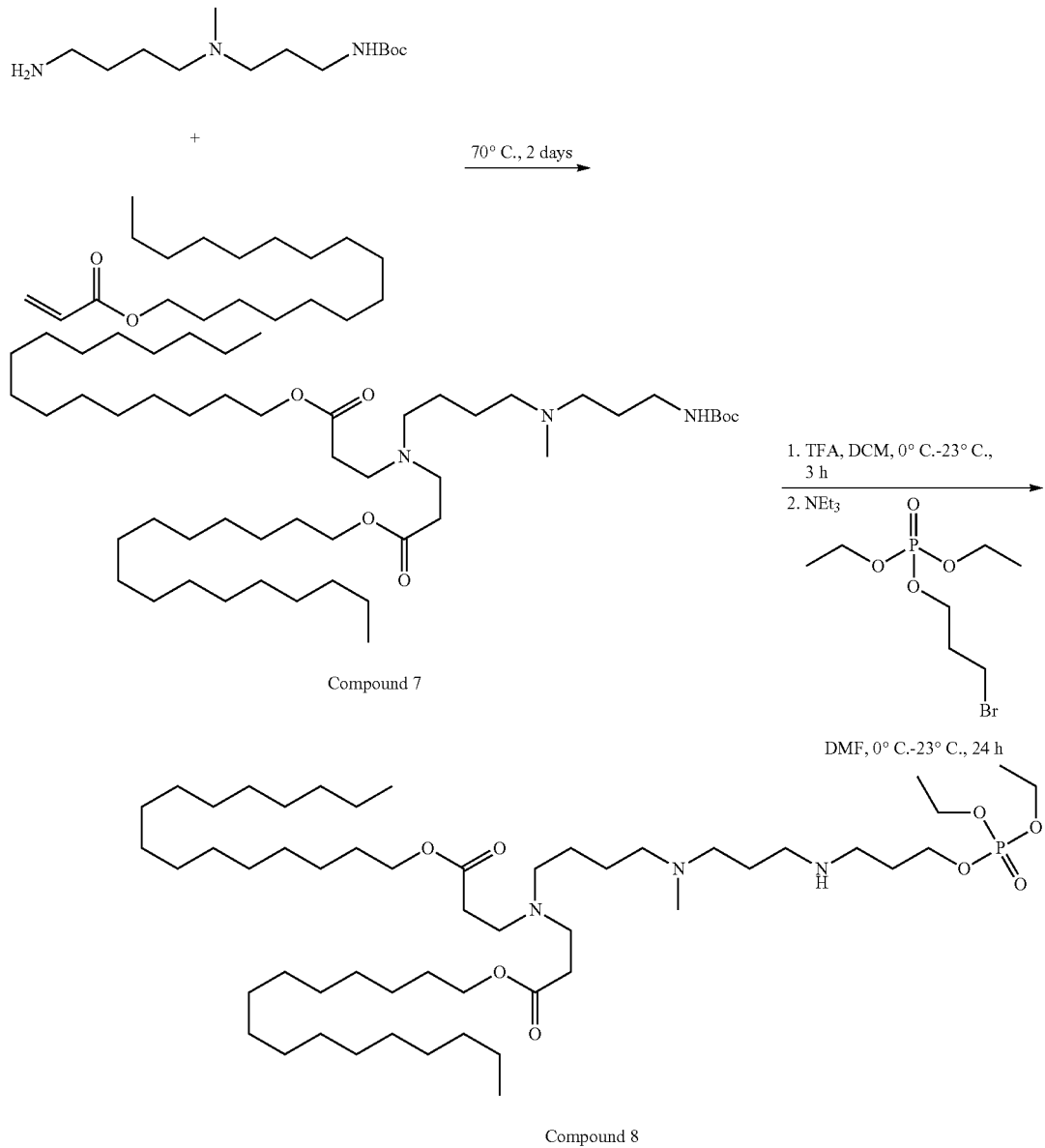

Compound 7: A mixture of (tert-butyl (3-((4-aminobutyl)(methyl)amino)-propyl)carbamate (MW=259.45 g/mol, 300 mg, 1.16 mmol) with 2 equivalents of hexadecyl acrylate (MW=296.5 g/mol, 1.6 mL, 4.64 mmol, 5 eq) at 70° C. for 48 hours. After 48 h, TLC confirmed the reaction was completed. The reaction mixture was purified via flash chromatography on 24 g silica column with gradient elution from 100% CH2Cl2 (mobile phase a) to 75:22:3 CH$_2$Cl$_2$/MeOH/NH$_4$OHaq (by volume, mobile phase b). The desired product eluted at 8% mobile phase b ($R_f$=0.58 in 1:1 mobile phase a:b) to yield the desired product as clear oil (758 mg, 87%). MS (MALDI) calcd for C51H102N3O6 [M+H]$^+$ m/z 852.8, found 852.6.

Compound 8: 250 mg (0.29 mmol) of Compound 7 (MW=851.7 g/mol) was dissolved in 7.4 mL DCM and was transferred to a 25 mL round bottom flask, which was then cooled to 0° C. Then 0.74 mL of TFA (9.6 mmol, 33 eq) was added and the reaction proceeded to completion in 3 hours. The solvent was evaporated, TFA was removed by co-evaporation with methanol and the product was purified by column chromatography on 12 g silica column with gradient elution from 100% CH2Cl2 (mobile phase a) to 75:22:3 CH$_2$Cl$_2$/MeOH/NH$_4$OHaq (by volume, mobile phase b). The intermediate compound eluted at 34% mobile phase b (R$_f$=0.25 in 1:1 mobile phase a:b) as pale-yellow (182.1 mg, 82%). 182 mg (0.242 mmol) of intermediate compound was added to the round bottom flask, dissolved in 1 mL DMF and the reaction was cooled to 0° C. Then, 66 mg (0.242 mmol, 1 eq) of 3-bromopropyl diethyl phosphate was dissolved in 1 mL DMF and added dropwise to the reaction flask followed by 340 µL of triethyl amine (2.42 mmol, 10 eq). The reaction was then stirred at room temperature for 24 hours, after which the compound was purified by flash column chromatography on 12 g silica column with gradient elution from 100% CH$_2$Cl$_2$ (mobile phase a) to 75:22:3 CH$_2$Cl$_2$/MeOH/NH$_4$OHaq (by volume, mobile phase b). Compound eluted at 20% mobile phase b (R$_f$=0.30 in 1:1 mobile phase a:b) as clear wax (35 mg, 16%). MS (MALDI) calcd for C53H110N3O8P [M+2H]$^+$ m/z 947.8, found 947.7.

Scheme 5 is a schematic drawing of the synthesis of a glycolipid nucleic acid carrier with fatty acid side chains that can be used for helping with self-assembly. Fatty acid side chain can be selected from any one of C$_4$-C$_{28}$ fatty acids. An example of the synthesis of as follows.

hours, after which the compound was purified on 12 g silica column with gradient elution from 100% CH2Cl2 (mobile phase a) to 77:22:1 CH$_2$Cl$_2$/MeOH/NH$_4$OHaq (by volume, mobile phase b). Compound eluted at 79% of mobile phase b (R$_f$=0.44 in 1:1 mobile phase a:b) as yellow wax (12.4 mg, 12%). MS (ESI) calcd for C63H118N3O14 [M+H]$^+$ m/z 1140.8, found 1140.8.

Nanoparticle Formulation by Hand Mixing

Figure 4:
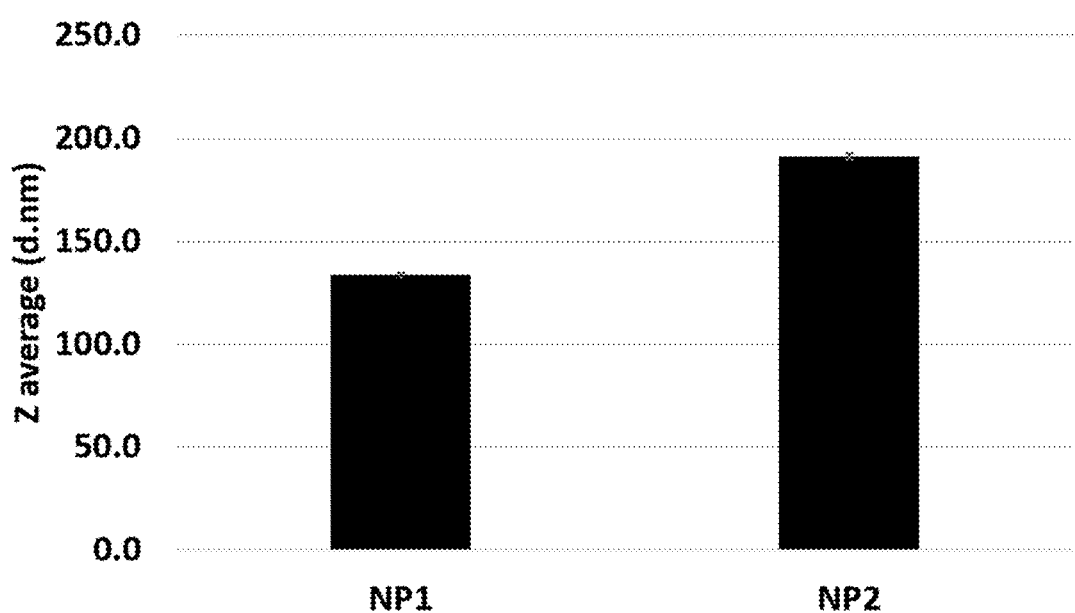
FIG. 4 illustrates the size distribution of the nanoparticle composition containing SEAP replicon RNA and compound 8, formulated by hand mixing at different pH.

Reference to FIG. 4, nanoparticles were formulated by mixing 21 µl of an ethanol phase containing Compound 8, cholesterol, DOPE, and DMG PEG 2000 (PEG-lipid, Avanti Polar Lipids) at molar ratio of 1:2:1.5:0.0375 with 63 µl of Replicon RNA encoding secreted embryonic alkaline phosphatase (SEAP) diluted with UltraPure, DNase/RNase-free, endotoxin-free distilled water (Invitrogen) and sterile 100 mM (pH 5 or pH3) citrate buffer to a final citrate concentration of 10 mM. The derived NPs were characterized with a Zetasizer NanoZS machine (Malvern). The size distributions were characterized by a single peak with a low polydispersity index.

Hydrodynamic Size Measurement

FIG. 4 illustrates distribution of the nanoparticle composition measured as the intensity (Z average) based on size (d.nm; diameter in nm) of the nanoparticles. Referring to

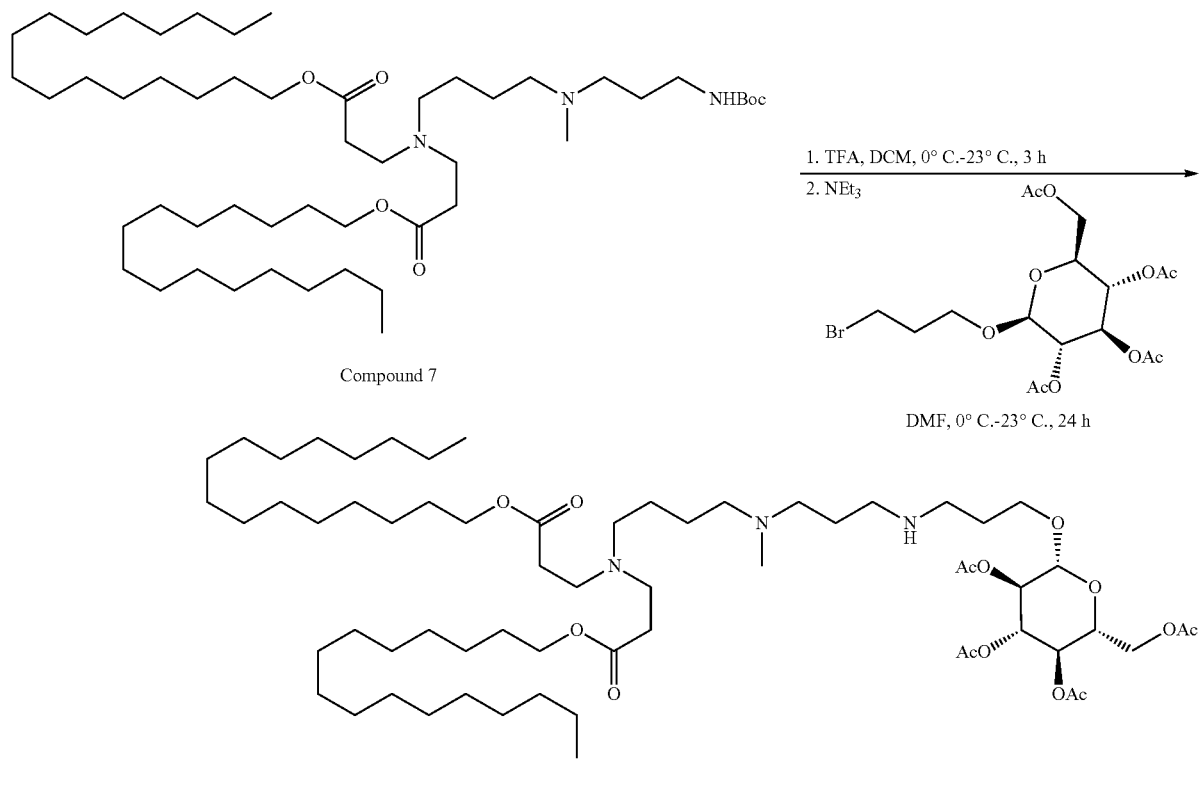

Compound 7

Compound 9

Compound 9: Intermediate compound was prepared starting from compound 7 as described above. 86.8 mg (MW=751.7, 0.115 mmol) of intermediate compound was added to the round bottom flask, dissolved in 1 mL DMF and the reaction was cooled to 0 C. Then, 59 mg (0.127 mmol, 1.1 eq) of 3-bromopropyl mannose tetra acetate was dissolved in 1 mL DMF and added dropwise to the reaction flask. Then, 160 µL of triethyl amine (1.15 mmol, 10 eq) was added to the reaction mixture. The reaction was stirred for 24

FIG. 4, the "Z average" of the nanoparticle composition containing compound 8 and SEAP RNA as function of size was determined by dynamic light scattering (DLS). The strongest intensity was observed for the nanoparticles of 133.7 d.nm and 191.3 d.nm in size at buffer pH of 3 and 5, respectively. The polydispersity index of nanoparticles formulated with buffer pH 3 and pH 5 is 0.13 and 0.11, respectively, indicating a relatively monodisperse size.

In Vitro SEAP Production Results

Figure 5:
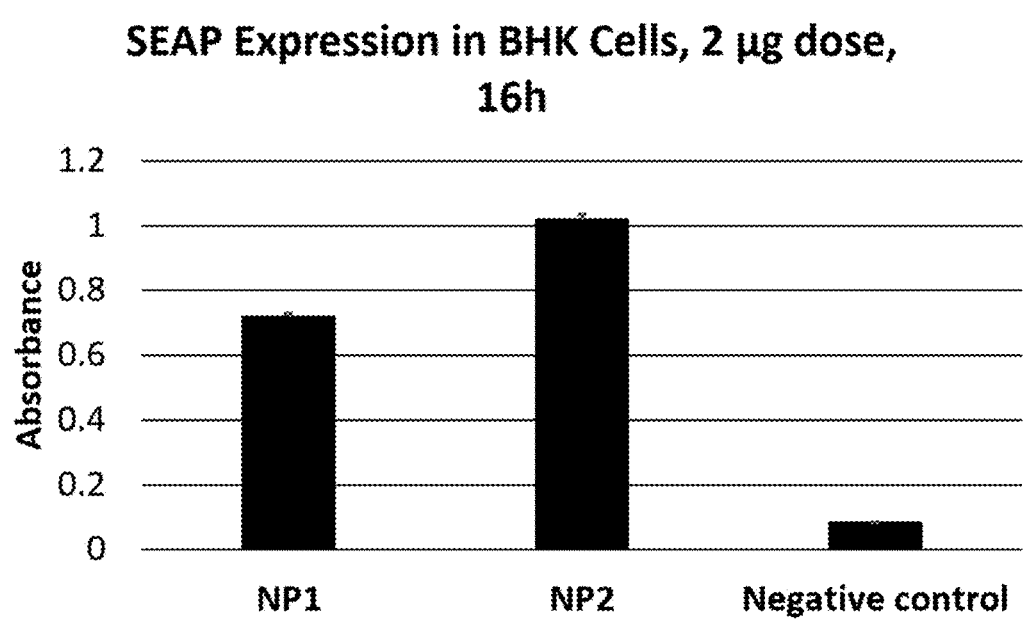
FIG. 5 illustrates quantification in vitro of SEAP expression after administration of nanoparticles containing SEAP replicon RNA and compound 8, formulated by hand mixing at different pH.

Now referring to FIG. 5, optical density measurements showing the expression of secreted alkaline phosphatase (SEAP) with nanoparticle formulations using compound 8 formulated at pH 3 and pH 5 are shown. To test the ability of the nanoparticles formulated with compound 8 formulated at pH 3 and pH 5 carrier to express SEAP in vitro, BHK cells were treated with nanoparticles. Each well of a 12 well dish of BHKs was treated with 20 μL (approximately 2 μg) of each formulation product diluted into a final volume of 600 μL with a 1:1 OptiMEM:PBS mix. After the treatment, BHK cells were incubated at 37° C. and 5% $CO_2$. After 12, hours, cell culture medium was collected and assayed for SEAP using the InvivoGen QUANTI-Blue™ detection system (San Diego, CA, USA), according to the manufacturer's protocol. Briefly, 50 μL of the cell culture medium was added to 150 μL of the QUANTI-Blue™ solution and incubated at 37° C. for 10 minutes. The Optical Density (OD) was measured at 620-655 nm using a microplate reader. FIG. 5 illustrates the SEAP expression of nanoparticle formulations using compound 8 formulated at pH 3 and pH 5 based on optical density compared to the negative control.

Nanoparticle Formulation by Microfluidic Mixing

Nanoparticles containing the compound 8:cholesterol:DOPE:DMG-PEG2k at molar ratios of 1:2:1.5:0.0375 were formulated using NanoAssemblr Benchtop (Precision NanoSystems Inc, Vancouver, BC, Canada)). RNA was diluted with Dnase/Rnase-Free, endotoxin free distilled water and sterile citrate buffer to a final desired pH. Total flow rate was maintained at 8 mL per min at a 3:1 ratio of aqueous to organic phase for formulating on the Benchtop. Using glassware depyrogenated by heating at 250° C. for 24 hours, nanoparticles were dialyzed against sterile, endotoxin-free PBS using 20,000 molecular weight cutoff dialysis. Dialyzed nanoparticles were sterile filtered using 0.2 micron poly(ether sulfone) filters and characterized with a Zetasizer NanoZS machine (Malvern). The size distributions were characterized by a single peak with a low polydispersity index. Encapsulation efficiency was measured to be 89% for the nanoparticle composition containing compound 8 and Replicon SEAP RNA (formulated at pH 5) using Ribogreen® assay.

Hydrodynamic Size Measurement

The "Z average" of the nanoparticle composition containing compound 8, cholesterol, DOPE, DMG-PEG 2000 and SEAP Replicon RNA as function of size was determined by dynamic light scattering (DLS). Referring to Table 2, the Z average was observed for the nanoparticles of 78.2 d.nm in size. Referring to Table 2, the size distributions were characterized with a low polydispersity index, indicating a relatively monodisperse size.

TABLE 2

| Nanoparticle | Z-Ave(d · nm) | PDI |
|---|---|---|
| NP1 | 78.2 | 0.08 |

In Vivo SEAP Production Results

Figure 6:
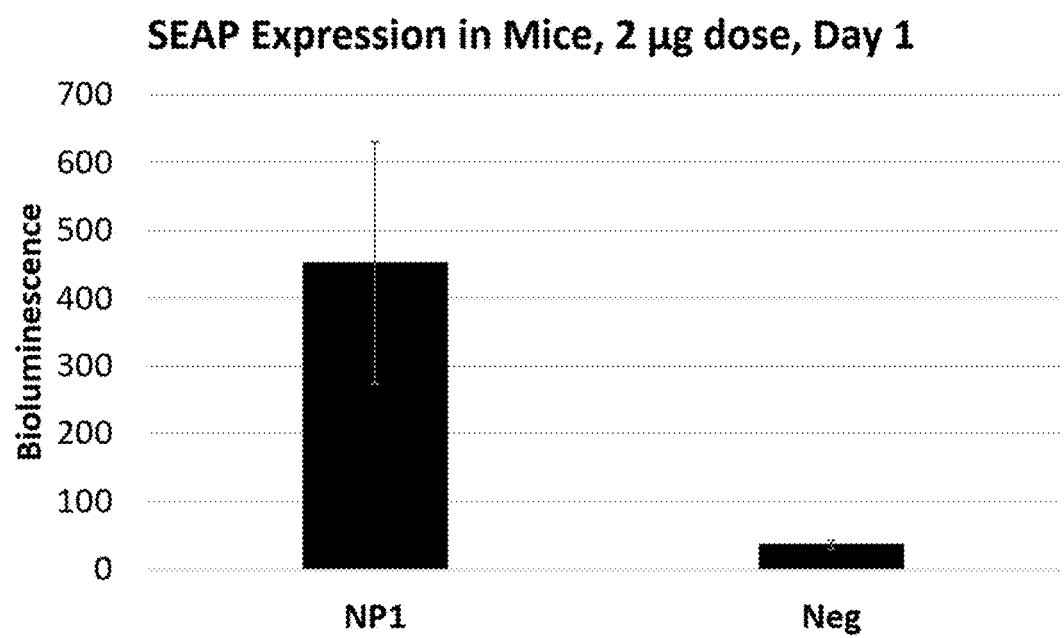
FIG. 6 illustrates quantification in vivo of SEAP expression after administration of nanoparticles containing SEAP replicon RNA and compound 8, formulated by microfluidic mixing.

Now referring to FIG. 6, PhosphaLight measurements showing the expression of secreted alkaline phosphatase (SEAP) with nanoparticle formulations using compound 8 formulated at pH 5 are shown. To test the ability of the nanoparticles formulated with compound 8 formulated at pH 5 carrier to express SEAP in vivo, Balb/c mice were treated with nanoparticles. Each mice was treated with approximately 2 μg of each formulation product diluted into a final volume of 200 μL. After the treatment, the phosphalight assay was used to quantify the SEAP expression in mice serum. FIG. 6 illustrates the SEAP expression of nanoparticle formulations using compound 8 formulated at pH 5 based on PhosphaLight assay compared to the negative control.

Nanoparticle Formulation for Biodistribution Study

Nanoparticles containing the compound 8 or compound 9:cholesterol:DOPE DMG-PEG2k at molar ratios of 1:2:1.5:0.0375 were formulated using NanoAssemblr Benchtop (Precision NanoSystems Inc, Vancouver, BC, Canada)). RNA was diluted with Dnase/Rnase-Free, endotoxin free distilled water and sterile citrate buffer to a final desired pH. Total flow rate was maintained at 8 mL per min at a 3:1 ratio of aqueous to organic phase for formulating on the Benchtop. Using glassware depyrogenated by heating at 250° C. for 24 hours, nanoparticles were dialyzed against sterile, endotoxin-free PBS using 7,000 molecular weight cutoff dialysis. Dialyzed nanoparticles were sterile filtered using 0.2 micron poly(ether sulfone) filters and characterized with a Zetasizer NanoZS machine (Malvern). The size distributions were characterized by a single peak with a low polydispersity index. Encapsulation efficiency was measured to be 81% for the nanoparticle composition containing compound 8 and Luciferase $\Psi$ mRNA (formulated at pH 5) using Ribogreen® assay. Encapsulation efficiency was measured to be 82% for the nanoparticle composition containing compound 9 and Luciferase $\Psi$ mRNA (formulated at pH 5).

Hydrodynamic Size Measurement

The "Z average" of the nanoparticle composition containing compound 8 or compound 9, cholesterol, DOPE, DMG-PEG 2000 and Luciferase $\Psi$ mRNA as function of size was determined by dynamic light scattering (DLS). Referring to Table 3, the Z average for the nanoparticles (NP1) formulated with compound 9 was observed 80.9 d.nm in size. Referring Table 3, the Z average for the nanoparticles formulated with compound 8 (NP2) was observed 76.5 d.nm in size. Referring to Table 3, the size distributions were characterized with a low polydispersity index, indicating a relatively monodisperse size.

TABLE 3

| DLS results | | |
|---|---|---|
| Nanoparticle | Z-Ave(d · nm) | PDI |
| NP1 | 80.9 | 0.13 |
| NP2 | 76.5 | 0.10 |

Biodistribution Study

The nanoparticle composition containing compound 8 or compound 9, cholesterol, DOPE, DMG-PEG 2000, and Luciferase $\Psi$ mRNA were given to mice by i.v. injection at the dose of 10 μg per mouse. At 6-hour post injection, the D-luciferin reagent was injected into mice by subcutaneous injection. The mice were imaged using an IVIS live-animal imaging system (Perkin Elmer) ~10 min after injection. Referring to Table 4, the biodistribution of Luciferase $\Psi$ mRNA nanoparticles (NP1) formulated with compound 9 showed, 67% of total flux is found in liver, 25% of total flux is found in spleen and 8% of the total flux is found in lung. Referring to Table 4, the biodistribution of Luciferase $\Psi$ mRNA nanoparticles (NP2) formulated with compound 8 was showed, 78% of total flux is found in liver, 18% of total flux is found in spleen and 4% of the total flux is found in lung.

TABLE 4
In vivo biodistribution results post administration of nanoparticles
| Nanoparticle | Heart(%) | Liver(%) | Spleen(%) | Lung(%) |
|---|---|---|---|---|
| NP1 | 0 | 25 | 67 | 8 |
| NP2 | 0 | 18 | 78 | 4 |
Example 4. Nanoparticle Compositions Containing Nucleic Acid Carriers of Formula 1f
Scheme 5 is a schematic drawing of the synthesis of nucleic acid carrier with disulfide tails. An example of the synthesis of as follows.
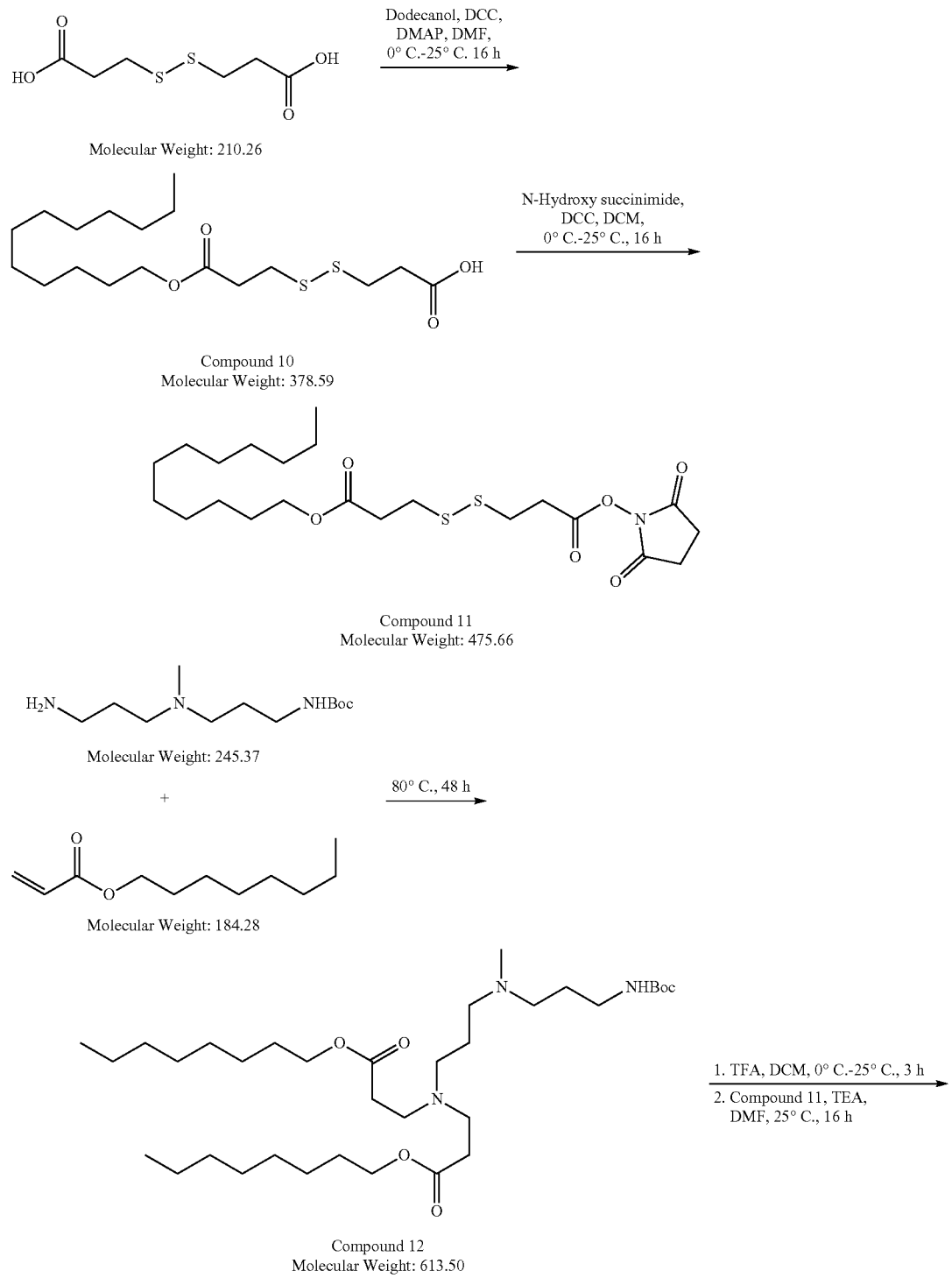

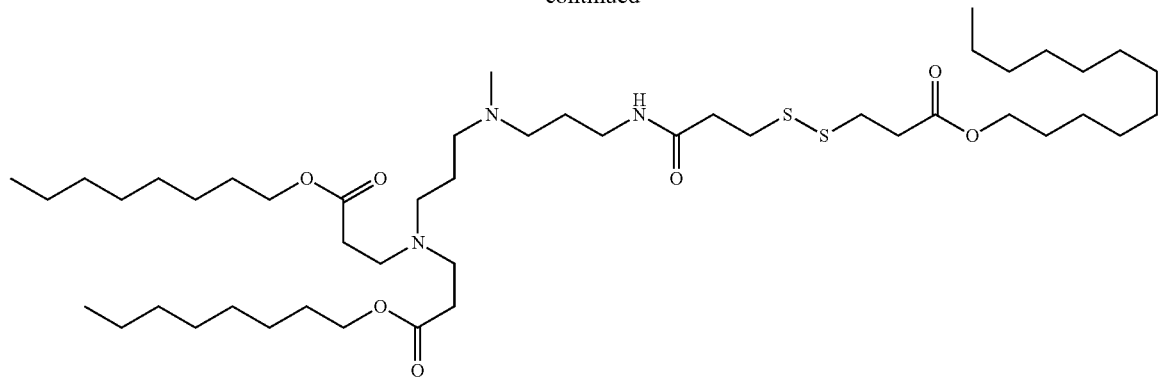

Compound 13
Molecular Weight: 873.63

Compound 10: Synthetic procedure of Compound 10 was adapted from literature.[8] 1.05 g (5 mmol) of 3,3-dithiodipropionic acid (MW=210 g/mol) was dissolved in 10 mL DMF and the reaction mixture was cooled to 0° C. Then, 1.15 g (5.5 mmol, 1.1 eq) of DCC was added and the mixture was stirred at 0 C for 20 mins under Argon atmosphere. Then, 0.06 g (0.5 mmol, 0.1 eq) of DMAP and 1.12 mL (5 mmol, 1 eq) of dodecanol (MW=186.34 g/mol) were added and the mixture was stirred at 0° C.-5° C. for 1 h, followed by stirring at rt for 24 hours. After the completion of reaction, the mixture was filtered to remove DCU. 40 mL DI water was then added to the filtrate and the aqueous layer was extracted with 10 mL ethyl acetate (5 times). Ethyl acetate layer was concentrated under reduced pressure and the crude product was purified via flash chromatography on 40 g silica column with gradient elution from 100% cyclohexane (mobile phase a) to 100% ethyl acetate (by volume, mobile phase b). The desired product eluted at 8% mobile phase b ($R_f$=0.33 in 4:1 mobile phase a:b) to as white solid (360.5 mg, 19%). MS (MALDI) calcd for C18H34O4S2Na [M+Na]+ m/z 401.2, found 401.1.

Compound 11: Synthetic procedure of compound 11 was adapted from literature.[9] Compound 10 (MW=378.59 g/mol, 100 mg, 0.26 mmol) was dissolved in 1 mL DCM and then DCC (59.4 mg, 0.288 mmol, 1.1 eq) and NHS (33 mg, 0.288 mmol, 1.1 eq) were added. The mixture was stirred at room temperature for 3 hours, followed by filtration to remove DCU and concentration of the filtrate. The crude product was then purified by flash column chromatography on 12 g column with gradient elution from 100% Cyclohexane (mobile phase a) to 100% ethyl acetate (by volume, mobile phase b). The desired product eluted at 14% mobile phase b ($R_f$=0.43 in 4:1 mobile phase a:b) as white solid (86 mg, 69%). 1H NMR (400 MHz, CHLOROFORM-D) δ 4.07 (td, J=6.8, 2.0 Hz, 2H, CH2-OCO-CH2-CH2-SS—CH2), 3.09-2.87 (m, 6H, CH2-COO-CH2-CH2-SS—CH2), 2.88-2.80 (m, 4H, NHS CH2s), 2.75-2.68 (m, 2H, CH2-COO-CH2-CH2-SS-CH2-CH2-CO—NHS), 1.64-1.58 (m, 2H, —CH2-COO-CH2-CH2), 1.24 (m, 20H, dodecyl CH2s), 0.86 (t, J=6.7 Hz, 3H, CH2-CH3). MS (MALDI) calcd for C22H37NO6S2Na [M+Na]+ m/z 498.2, found 497.8

Compound 12: tert-butyl (3-((3-aminopropyl)(methyl)amino)propyl)-carbamate, MW=245.37 g/mol, 100 mg, 0.4075 mmol) with 5 equivalents of octyl acrylate (MW=184.28 g/mol, 426 μL, 2.03 mmol) at 80° C. overnight. After 48 hours, TLC confirmed the reaction was completed. The reaction mixture was purified via flash chromatography on 12 g silica column with gradient elution from 100% CH$_2$Cl$_2$ (mobile phase a) to 75:22:3 CH2Cl2/MeOH/NH4OHaq (by volume, mobile phase b). The desired product eluted at 10% mobile phase b ($R_f$=0.55 in 1:1 mobile phase a:b) to yield the desired product as yellow oil (142.4 mg, 57%). MS (MALDI) calcd for C34H68N3O6 [M+H]+ m/z 614.5, found 614.4.

Compound 13: 100 mg (0.163 mmol) of compound 12 was treated with 33 eq of TFA (0.4 ml, 5.4 mmol) after dissolving the compound in 4 ml DCM, the reaction was stirred at 0° C. to 25° C. for 3 h, evaporated to dryness and dissolved in 0.5 ml DMF. 0.23 ml TEA (1.63 mmol, MW 101.19 g/mol, 10 eq) was added to the solution. Then, compound 11 dissolved in 0.5 ml DMF was added to the reaction mixture. The reaction mixture was flushed with argon and stirred at 23° C. for 24 h. Then, 4 mL of H2O was added to the reaction mixture, the aqueous layer was extracted with ethyl acetate (4 times) and the ethyl acetate was evaporated. The crude reaction mixture was purified via flash chromatography on silica column (12 g) with gradient elution from 100% CH$_2$Cl$_2$ (mobile phase a) to 75:22:3 CH$_2$Cl$_2$/MeOH/NH$_4$OHaq (by volume, mobile phase b). The desired product eluted at 10% mobile phase b. ($R_f$=0.55 in 1:1 mobile phase a:b) to yield the desired product as yellow oil (46 mg, 32%). MS (ESI) calcd for C47H92N3O7S2 [M+H]+ m/z 874.6, found 874.6.

Example 5. Nanoparticle Compositions Containing Nucleic Acid Carriers of Formula 1g Scheme 6 is a schematic drawing of the synthesis of nucleic acid carrier with disulfide tails. An example of the synthesis of as follows.

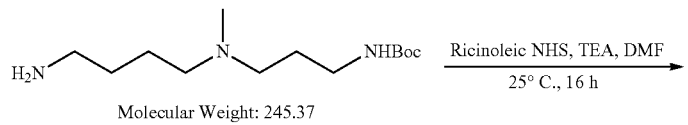

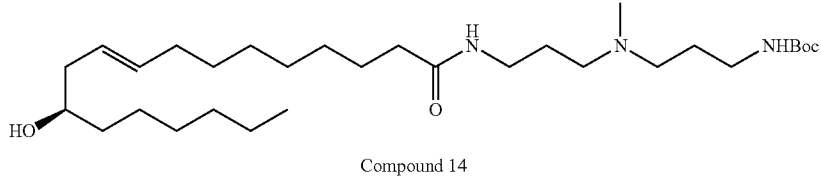

Compound 14

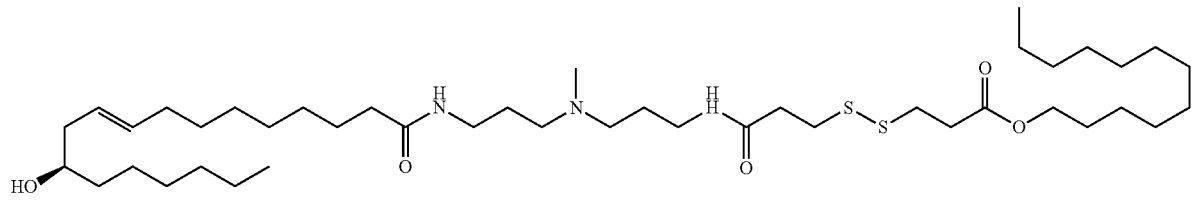

Compound 15

Compound 14: 150 mg (0.612 mmol) of tert-butyl (3-((3-aminopropyl)(methyl)amino)propyl)carbamate was dissolved in 1.5 ml DMF. 0.25 ml TEA (1.84 mmol, MW 101.19 g/mol, 3 eq) was added to the solution. Then, Ricinoleic NHS (483.6 mg, 1.22 mmol, 2 eq) dissolved in 1.5 ml DMF was added to the reaction mixture. The reaction mixture was flushed with argon and stirred at 25° C. for 24 h. Then, 15 mL of H2O was added to the reaction mixture, the aqueous layer was extracted with ethyl acetate (4 times) and the ethyl acetate was evaporated. The crude reaction mixture was purified via flash chromatography on silica column (12 g) with gradient elution from 100% CH2Cl2 (mobile phase a) to 75:22:3 $CH_2Cl_2$/MeOH/$NH_4OH$aq (by volume, mobile phase b). The desired product eluted at 13% mobile phase b. ($R_f$=0.41 in 1:1 mobile phase a:b) to yield the desired product as yellow oil (294 mg, 92%). MS (ESI) calcd. for C30H60N3O4 [M+H]+ m/z 526.4, found 526.4.

Compound 15: 294 mg (0.56 mmol) of compound 14 was treated with 33 eq of TFA (1.5 ml, 18.4 mmol) after dissolving the compound in 15.3 ml DCM, the reaction was stirred at 0° C. to 25° C. for 3 h, evaporated to dryness and via flash chromatography on silica column (12 g) with gradient elution from 100% CH2Cl2 (mobile phase a) to 75:22:3 $CH_2Cl_2$/MeOH/$NH_4OH$aq (by volume, mobile phase b). The intermediate product eluted at 42% mobile phase b (214 mg, 90%). Then, 34.2 mg (0.08 mmol) of intermediate compound was dissolved in 0.5 ml DMF. 0.110 ml TEA (0.8 mmol, MW 101.19 g/mol, 10 eq) was added to the solution. Then, compound 11 (57 mg, 0.12 mmol, 1.5 eq) dissolved in 0.5 ml DMF was added to the reaction mixture. The reaction mixture was flushed with argon and stirred at 25° C. for 24 h. Then, 4 mL of H2O was added to the reaction mixture, the aqueous layer was extracted with ethyl acetate (4 times) and the ethyl acetate was evaporated. The crude reaction mixture was purified via flash chromatography on silica column (12 g) with gradient elution from 100% CH2Cl2 (mobile phase a) to 75:22:3 $CH_2Cl_2$/MeOH/$NH_4OH$aq (by volume, mobile phase b). The desired product eluted at 24% mobile phase b. ($R_f$=0.45 in 1:1 mobile phase a:b) as yellow wax (27 mg, 53%). MS (ESI) calcd. for C43H84N3O5S2 [M+H]+ m/z 786.6, found 786.5.

Example 6. Nanoparticle Compositions Containing Nucleic Acid Carriers of Formula 1f Scheme 7 is a schematic drawing of the synthesis of nucleic acid carrier with carbon tails. An example of the synthesis of as follows.

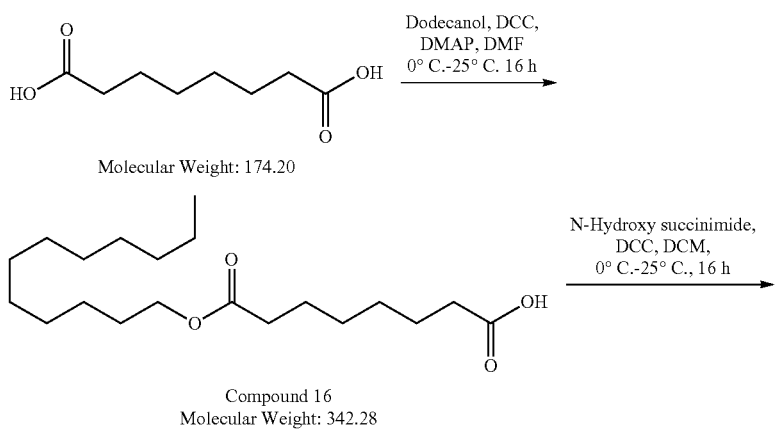

Compound 16
Molecular Weight: 342.28

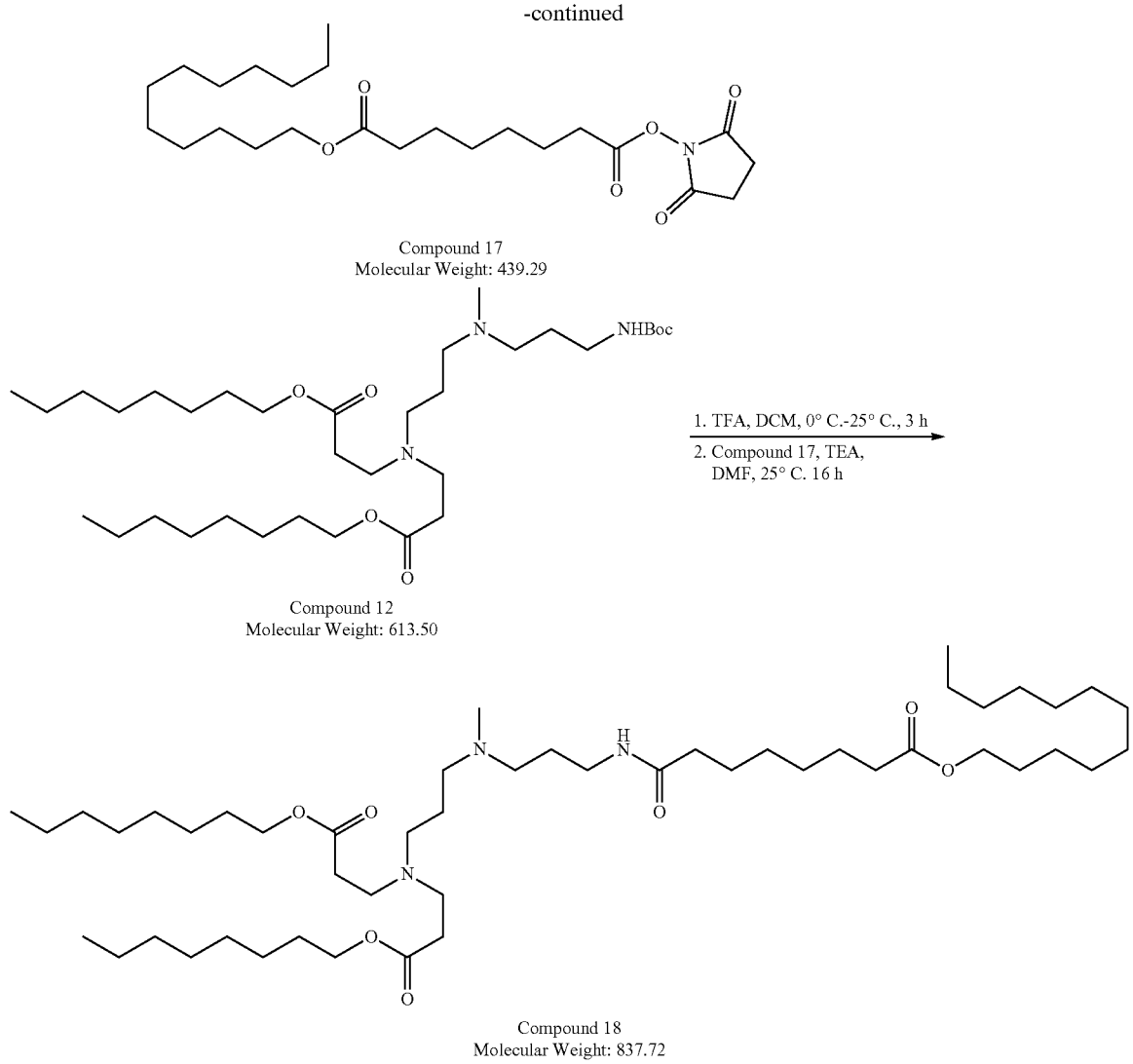

Compound 17
Molecular Weight: 439.29

Compound 12
Molecular Weight: 613.50

Compound 18
Molecular Weight: 837.72

Compound 16: Synthetic procedure of Compound 16 was similar to Compound 10.[8] 350 mg (2 mmol) of suberic acid (MW=174 g/mol) was dissolved in 6 mL DMF and the reaction mixture was cooled to 0 C. Then, 454 mg (2.2 mmol, 1.1 eq) of DCC was added and the mixture was stirred at 0° C. for 20 mins under Argon atmosphere. Then, 24.5 mg (0.2 mmol, 0.1 eq) of DMAP and 0.45 mL (2 mmol, 1 eq) of dodecanol (MW=186.34 g/mol) were added and the mixture was stirred at 0-5° C. for 1 h, followed by stirring at rt for 24 hours. After the completion of reaction, the mixture was filtered to remove DCU. 10 mL DI water was then added to the filtrate and the aqueous layer was extracted with 10 mL ethyl acetate (5 times). Ethyl acetate layer was concentrated under reduced pressure and the crude product was purified via flash chromatography on 24 g silica column with gradient elution from 100% cyclohexane (mobile phase a) to 100% ethyl acetate (by volume, mobile phase b). The desired product eluted at 8% mobile phase b ($R_f$=0.5 in 1:1 mobile phase a:b) as white solid (219.4 mg, 32%). 1H NMR (400 MHz, CHLOROFORM-D) δ 4.03 (t, J=6.8 Hz, 2H, C$\underline{H}$2-O—CO—(CH2)6-COOH), 2.33 (t, J=7.5 Hz, 2H, C$\underline{H}$2-O—CO-CH2-(CH2)5-COOH), 2.28 (t, J=7.5 Hz, 2H, CH2-O—CO—C$\underline{H}$2)5-CH2-COOH), 1.61 (m, 6H, CH2-CH2-O—CO-CH2-(C$\underline{H}$2)4-CH2-COOH), 1.24 (m, 18H, CH3-(C$\underline{H}$2)9-(CH2)2-$\overline{O}$—CO—), 0.86 (t, J=6.8 Hz, 3H, CO—O$\overline{=}$(CH2)11-C$\underline{H}$3).

Compound 17: Synthetic procedure of compound 17 is similar to compound 11 and was adapted from literature.[9] Compound 16 (MW=342.28 g/mol, 200 mg, 0.58 mmol) was dissolved in 2 mL DCM and then DCC (133 mg, 0.643 mmol, 1.1 eq) and NHS (74 mg, 0.643 mmol, 1.1 eq) were added. The mixture was stirred at room temperature for 3 hours, followed by filtration to remove DCU and concentration of the filtrate. The crude product was then purified by flash column chromatography on 12 g column with gradient elution from 100% Cyclohexane (mobile phase a) to 100% ethyl acetate (by volume, mobile phase b). The desired product eluted at 14% mobile phase b ($R_f$=0.31 in 1:1 mobile phase a:b) as white solid (171 mg, 67%).

1H NMR (400 MHz, CHLOROFORM-D) δ 4.03 (t, J=6.8 Hz, 2H, C$\underline{H}$2-O—CO—(CH2)6-CO—NHS), 2.82 (broad m, 4H, NHS protons), 2.59 (t, J=7.4 Hz, 2H, CH2-O—CO-C$\underline{H}$2-(CH2)5-CO—NHS), 2.28 (t, J=7.5 Hz, 2H, CH2-O—C$\overline{O}$—CH2)5-CH2-CO—NHS), 1.73-1.53 (m, 6H, C$\underline{H}$2-CH2-O—CO-C$\overline{H}$2-(C$\underline{H}$2)4-CH2-COOH), 1.24 (m, 18H, CH3-(C$\underline{H}$2)9-(CH2)2-$\overline{O}$—CO—), 0.86 (t, J=6.7 Hz, 3H, CO—O$\overline{=}$(CH2)11-C$\underline{H}$3).

Compound 18: 100 mg (0.163 mmol) of compound 12 was treated with 33 eq of TFA (0.4 ml, 5.4 mmol) after dissolving the compound in 4 ml DCM, the reaction was stirred at 0° C. to 25° C. for 2.5 h, evaporated to dryness and purified via flash chromatography on silica column (12 g) with gradient elution from 100% CH2Cl2 (mobile phase a) to 75.75:22:2.25 $CH_2Cl_2$/MeOH/$NH_4$OHaq (by volume, mobile phase b). The intermediate product eluted at 39% mobile phase b (85 mg, 84%). Then, the intermediate compound was dissolved in 0.5 ml DMF. 0.115 ml TEA (0.8 mmol, MW 101.19 g/mol, 10 eq) was added to the solution. Then, compound 17 (143 mg, 0.326 mmol, 2 eq) dissolved in 1.5 ml DMF was added to the reaction mixture. The reaction mixture was flushed with argon and stirred at 25° C. for 24 h. Then, 4 mL of H2O was added to the reaction mixture, the aqueous layer was extracted with ethyl acetate (4 times) and the ethyl acetate was evaporated. The crude reaction mixture was purified via flash chromatography on silica column (12 g) with gradient elution from 100% $CH_2Cl_2$ (mobile phase a) to 75.75:22:2.25 $CH_2Cl_2$/MeOH/$NH_4$OHaq (by volume, mobile phase b). The desired product eluted at 8% mobile phase b. ($R_f$=0.66 in 1:1 mobile phase a:b) as white wax (46 mg, 32%). MS (ESI) calcd. for $C_{49}H_{96}N_3O_7$ [M+H]+ m/z 838.7, found 838.6.

Nanoparticle Formulation Containing Nucleic Acid Carriers of Formula 1f:

Nanoparticles containing the compound 13 or compound 18:cholesterol:DSPC:DMG-PEG2k at molar ratios of 50:38.5:10:1.5 were formulated using NanoAssemblr Benchtop (Precision NanoSystems Inc, Vancouver, BC, Canada)). RNA was diluted with DNase/RNase-Free, endotoxin free distilled water and sterile acetate buffer to a final desired pH. Total flow rate was maintained at 8 mL per min at a 3:1 ratio of aqueous to organic phase for formulating on the Benchtop. Using glassware depyrogenated by heating at 250° C. for 24 hours, nanoparticles were dialyzed against sterile, endotoxin-free PBS using 7,000 molecular weight cutoff dialysis. Dialyzed nanoparticles were sterile filtered using 0.2-micron poly(ether sulfone) filters and characterized with a Zetasizer NanoZS machine (Malvern). Encapsulation efficiency was measured to be 89% for the nanoparticle composition containing compound 13 and SEAP Ψ mRNA (formulated at pH 5) using Ribogreen® assay. Encapsulation efficiency was measured to be 84% for the nanoparticle composition containing compound 18 and SEAP Ψ mRNA (formulated at pH 5).

Hydrodynamic Size Measurement

Figure 7:
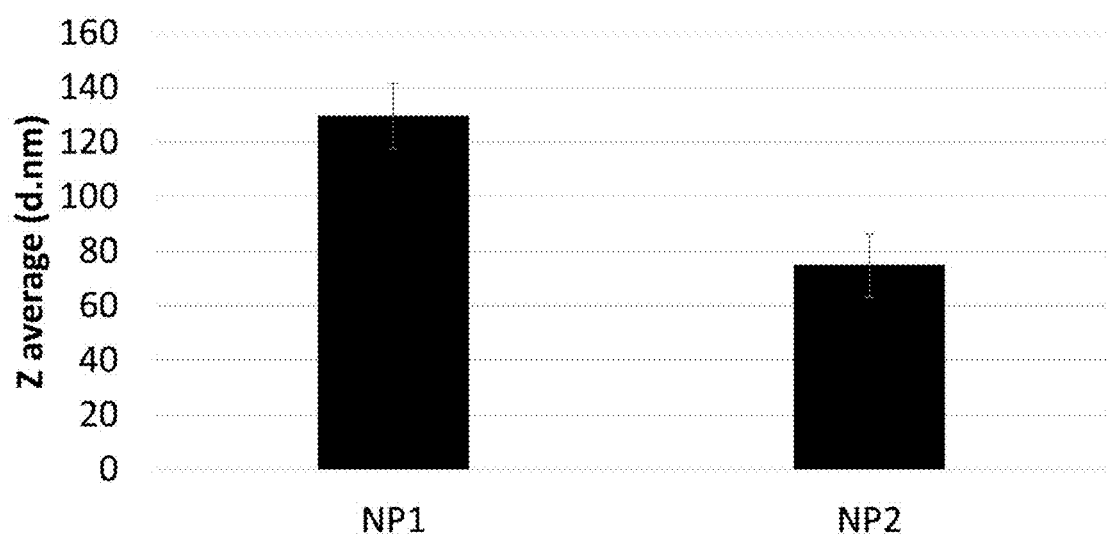
FIG. 7 illustrates the distribution of the nanoparticle compositions containing SEAP Ψ mRNA and compound 13 or 18.

The "Z average" of the nanoparticle composition containing compound 13 or compound 18, cholesterol, DSPC, DMG-PEG 2000 and SEAP Ψ mRNA as function of size was determined by dynamic light scattering (DLS). Referring to FIG. 7, the Z average for the nanoparticles formulated with compound 13 was 129.5 d.nm in size and the Z average for the nanoparticles formulated with compound 18 was 74.8 d.nm.

In Vivo SEAP Production Results.

Figure 8:
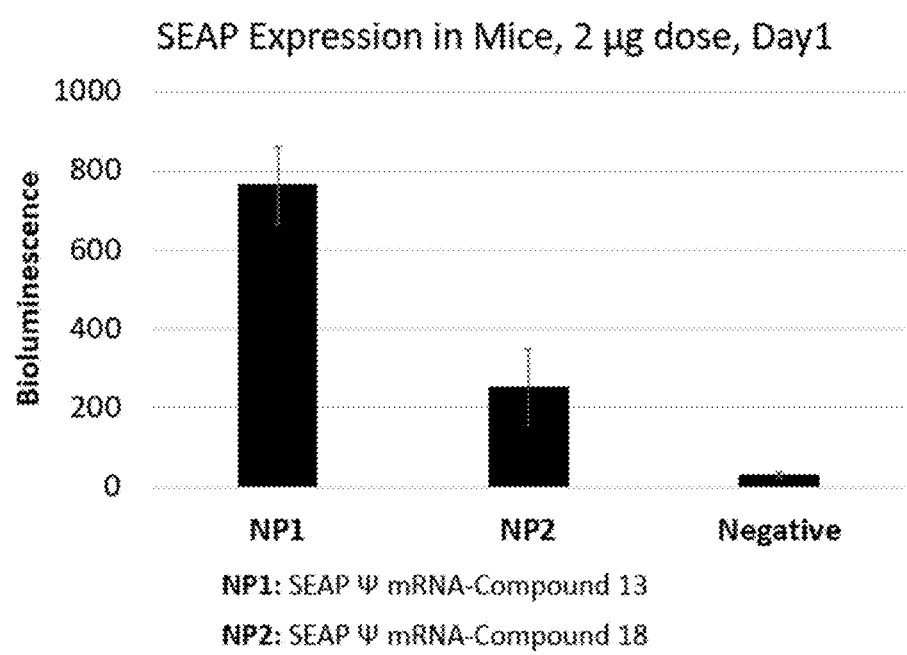
FIG. 8 illustrates the quantification in vivo of SEAP expression after administration of nanoparticles containing SEAP Ψ mRNA and compound 13 or 18.

Now referring to FIG. 8, PhoshpaLight measurements showing the expression of secreted alkaline phosphatase (SEAP) with nanoparticle formulations using compound 13 or compound 18 formulated at pH 5 are shown. To test the ability of the nanoparticles formulated with compound 13 or compound 18 formulated at pH 5 carrier to express SEAP in vivo, BALB/c mice were treated with nanoparticles. Each mouse was treated with approximately 2 µg of each formulation product diluted into a final volume of 200 µL. After the treatment, the Phosphalight assay was used to quantify the SEAP expression in mice serum. FIG. 8 illustrates the SEAP expression of nanoparticle formulations using compound 13 or compound 18 formulated at pH 5 based on PhosphaLight assay compared to the negative control. The nanoparticles formulated with disulfide bond containing compound 13 shows better SEAP expression when compared to the nanoparticles formulated with non-disulfide bond containing compound 18.

Example 7. Synthesis of Nucleic Acid Carriers of Formula I

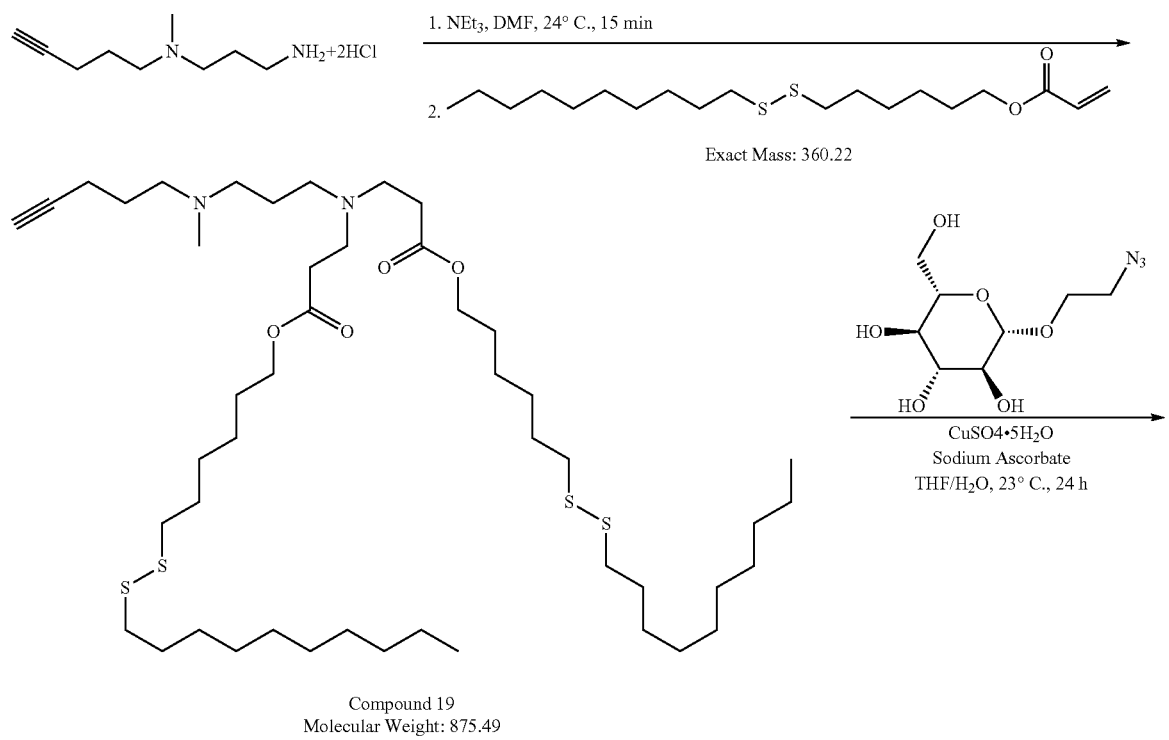

Compound 19
Molecular Weight: 875.49

-continued

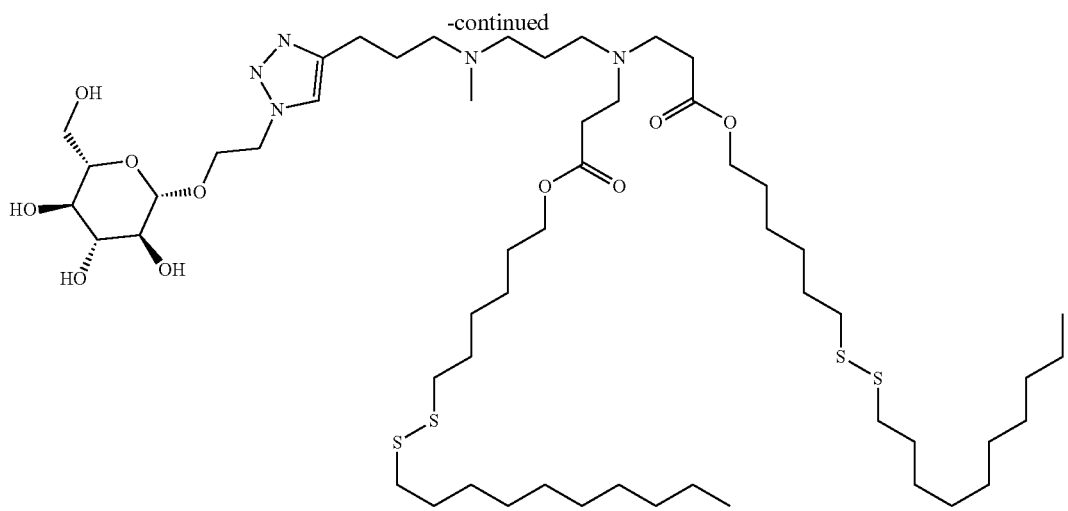

Compound 20
Molecular Weight: 1124.71

Compound 19: 75 mg (MW=226, 0.442 mmol) of intermediate compound was added to the round bottom flask, dissolved in 0.5 mL DMF and 240 μL of triethyl amine (4.42 mmol, 10 eq) was added to the reaction mixture. The reaction was stirred at room temperature for 15 minutes, after which disulfide acrylate (MW=360.22, 262 mg, 2.2 eq) was added to the reaction. The reaction was then heated to 80 C and stirred for 48 hours, after which the compound was purified on 12 g silica column with gradient elution from 100% $CH_2Cl_2$ (mobile phase a) to 77:22:1 $CH_2Cl_2$/MeOH/$NH_4OH$aq (by volume, mobile phase b). Compound eluted at 10% of mobile phase b ($R_f$=0.52 in 1:1 mobile phase a:b) as yellow oil (121 mg, 41%). MS (ESI) calcd for $C_{47}H_{90}N_2O_4S_4$ $[M]^+$ m/z 874.6, found 874.9.

Compound 20: In a 25 ml RBF, $CuSO_4 \cdot 5H_2O$ (6.8 mg, 0.03 mmol, 20 mol %, MW 249.69), sodium ascorbate (10.8 mg, 0.0548 mmol, 40 mol %, MW 198.11) and 1-(2-azidoethoxy)-alpha-D-mannopyranose (MW: 249.2 g/mol, 68 mg, 0.274 mol) were taken. Compound 19 (MW: 875.5 g/mol, 120 mg, 0.32 mmol dissolved in THF (2 mL) was added. Then degassed $H_2O$ (2 mL) was added and the reaction mixture was stirred at 23° C. for 24 hours. Next day TLC confirmed the reaction was complete. The reaction mixture was purified via flash chromatography on 24 g silica column with gradient elution from 100% $CH_2Cl_2$ (mobile phase a) to 75:22:3 $CH_2Cl_2$/MeOH/$NH_4OH$aq (by volume, mobile phase b). The desired product eluted at 34% mobile phase b ($R_f$=0.43 in 1:2 mobile phase a:b) to yield the desired product as bright yellow solid (24 mg, 7.8%). MS (ESI) calcd for $C_{55}H_{105}N_5O_{10}S_4$ $[M]^+$ m/z 1124.7, found 1124.6

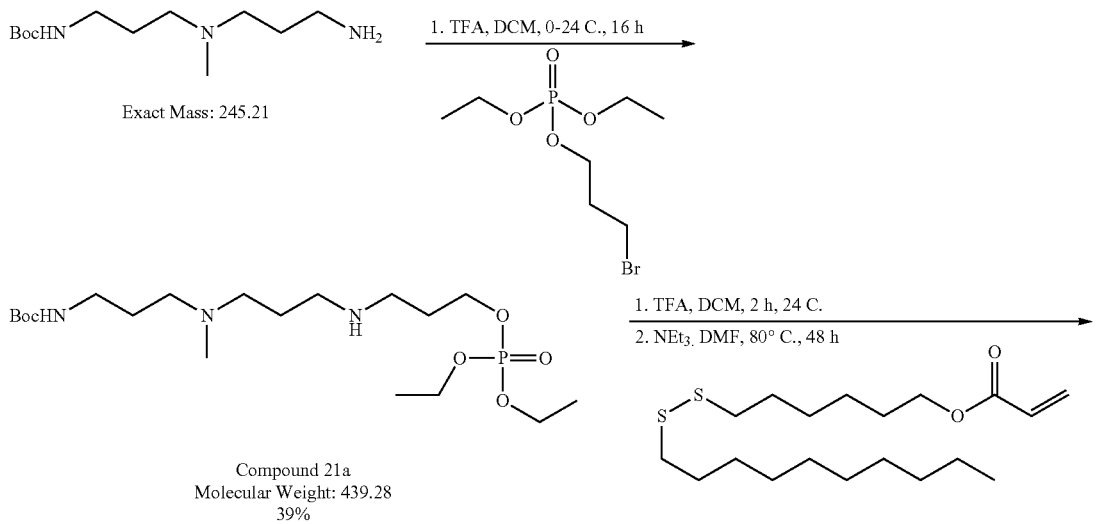

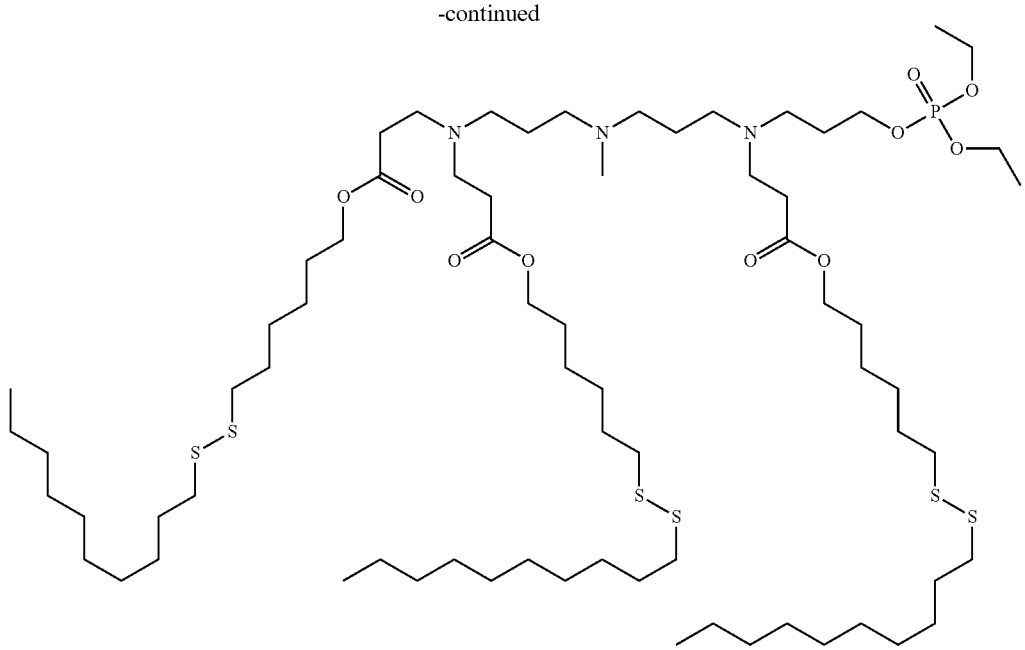

Molecular Weight: 1419.88
Compound 21

Compound 21a: 500 mg (2.04 mmol) of tert-butyl (3-((3-aminopropyl)(methyl)-amino)propyl)carbamate, (MW=245.37 g/mol), was added to the round bottom flask, dissolved in 3 mL DMF and the reaction was cooled to 0° C. Then, 557 mg (2.04 mmol, 1 eq) of 3-bromopropyl diethyl phosphate was dissolved in 1.5 mL DMF and added dropwise to the reaction flask followed by 570 μL of triethyl amine (4.08 mmol, 2 eq). The reaction was then stirred at room temperature for 24 hours, after the crude product was purified by flash column chromatography on 40 g silica column with gradient elution from 100% $CH_2Cl_2$ (mobile phase a) to 75:22:3 $CH_2Cl_2$/MeOH/$NH_4$OHaq (by volume, mobile phase b). Compound eluted at 30% mobile phase b ($R_f$=0.30 in 1:1 mobile phase a:b) as yellow wax (350 mg, 39%). MS (ESI) calcd for C19H44N3O6P [M+2H]$^{2+}$ m/z 439.3, found 441.0.

Compound 21: 72 mg (0.165 mmol) of compound 21a was treated with 33 eq of TFA (0.41 ml, 5.4 mmol) after dissolving the compound in 4.1 mL DCM, the reaction was stirred at 0° C. to 25° C. for 2.5 hours, evaporated to dryness and used for next reaction without further purification. The crude product was dissolved in 0.5 mL DMF and 110 μL of TEA (0.79 mmol, 5 eq) and 196 mg (0.544 mmol, 3.3 eq) of disulfide acrylate were added. The reaction mixture was heated at 80 C and stirred for 48 hours. Then the compound was purified by flash column chromatography on 12 g silica column with gradient elution from 100% $CH_2Cl_2$ (mobile phase a) to 75:22:3 $CH_2Cl_2$/MeOH/$NH_4$OHaq (by volume, mobile phase b). Compound eluted at 14% mobile phase b ($R_f$=0.55 in 1:1 mobile phase a:b) as yellow oil (45 mg, 7%). MS (ESI) calcd for C71H143N3O10PS6 [M+H]$^+$ m/z 1420.9, found 1420.8. $^1$H NMR (400 MHz, CHLOROFORM-D) δ 4.13-3.99 (m, 12H), 2.99 (s, 2H), 2.76-2.68 (m, 7H), 2.65 (m, 13H), 2.49 (m, 6H), 2.39 (m, 6H), 1.98 (s, 3H), 1.83-1.73 (m, 2H), 1.73-1.54 (m, 19H), 1.46-1.17 (m, 63H), 0.92-0.77 (m, 9H).

Following compounds are non-limiting examples that can be synthesized using similar procedure as Compound 21 with commercially available reagents: Compound 27, Compound 28, Compound 30, Compound 31, Compound 42, and Compound 43.

Example 8. Synthesis of Nucleic Acid Carriers of Formula 1j

Preparation of Compound 22

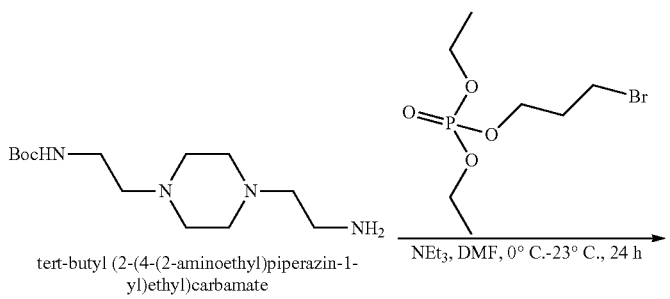

tert-butyl (2-(4-(2-aminoethyl)piperazin-1-yl)ethyl)carbamate $NEt_3$, DMF, 0° C.-23° C., 24 h

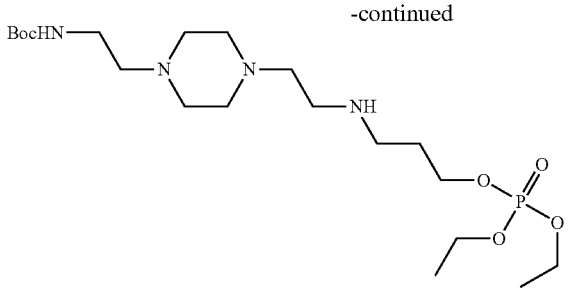

Compound 22a

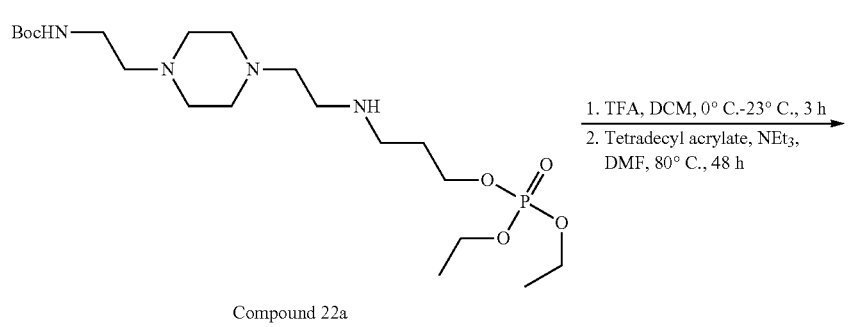

Compound 22a

1. TFA, DCM, 0° C.-23° C., 3 h
2. Tetradecyl acrylate, NEt₃, DMF, 80° C., 48 h

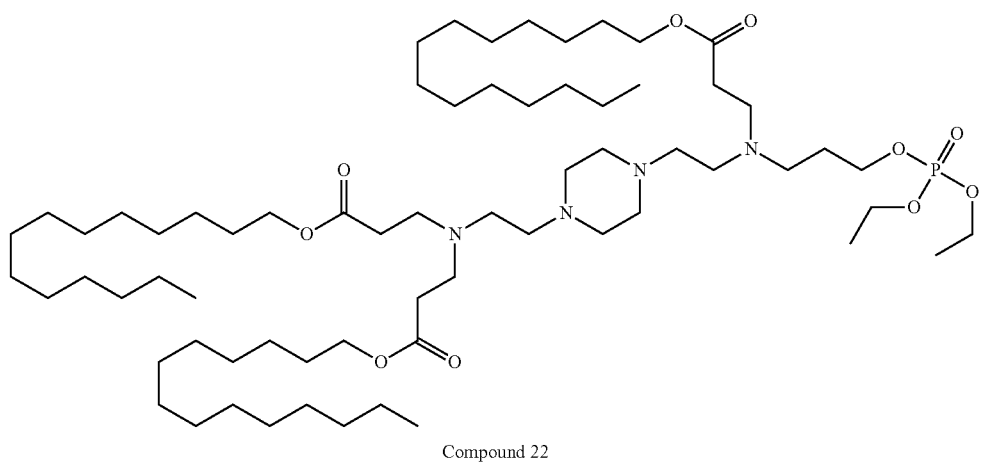

Compound 22

Compound 22a: 150 mg (0.551 mmol) of tert-butyl (2-(4-(2-aminoethyl)-piperazin-1-yl)ethyl)carbamate was added to the round bottom flask, dissolved in 1 mL DMF and the reaction was cooled to 0° C. Then, 180 mg (0.661 mmol, 1.2 eq) of 3-bromopropyl diethyl phosphate was dissolved in 1.5 mL DMF and added dropwise to the reaction flask followed by 460 µL of triethyl amine (3.3 mmol, 5 eq). The reaction was then stirred at room temperature for 24 hours, after which 10 mL DI water was added and aqueous layer was washed with 2 mL EtOAc (5 times). The organic layer was evaporated and the crude product was purified by flash column chromatography on 12 g silica column with gradient elution from 100% $CH_2Cl_2$ (mobile phase a) to 75:22:3 $CH_2Cl_2$/MeOH/$NH_4OH$aq (by volume, mobile phase b). Compound eluted at 24% mobile phase b ($R_f$=0.30 in 1:1 mobile phase a:b) as yellow wax (48 mg, 19%). MS (ESI) calcd for C20H46N4O6P [M+3H]³⁺ m/z 469.3, found 469.0.

Compound 22: 49.3 mg (0.106 mmol) of compound 22a was treated with 33 eq of TFA (0.26 ml, 3.5 mmol) after dissolving the compound in 2.6 mL DCM, the reaction was stirred at 0° C. to 25° C. for 2.5 hours, evaporated to dryness and the crude product was used for next reaction without further purification. The crude product was dissolved in 0.5 mL DMF and 74 µL of TEA and 163 uL (0.53 mmol, 5 eq) of tetradecyl acrylate were added. The reaction mixture was heated at 80 C and stirred for 48 hours. Then the compound was purified by flash column chromatography on 12 g silica column with gradient elution from 100% $CH_2Cl_2$ (mobile phase a) to 75:22:3 $CH_2Cl_2$/MeOH/$NH_4OH$aq (by volume, mobile phase b). Compound eluted at 14% mobile phase b ($R_f$=0.30 in 1:1 mobile phase a:b) as yellow oil (43 mg, 35%). MS (ESI) calcd for C66H131N4O10P [M+2H]²⁺ m/z 1173, found 1172.9.

Compound 29 can be synthesized following a similar procedure as Compound 22 with commercially available reagents.

Preparation of Compound 25
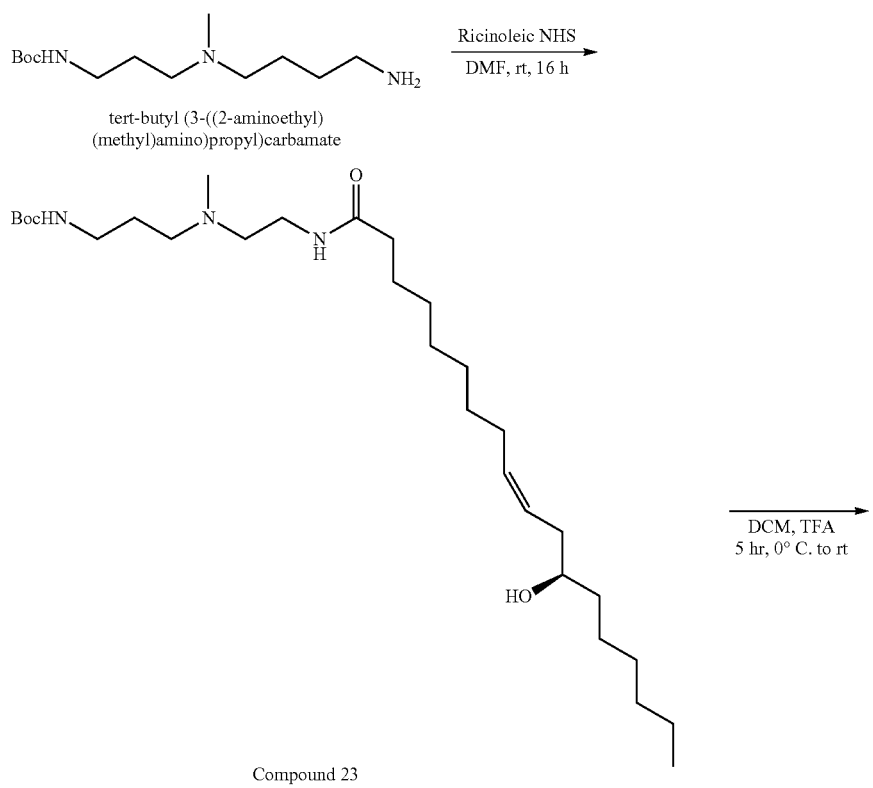
Compound 23
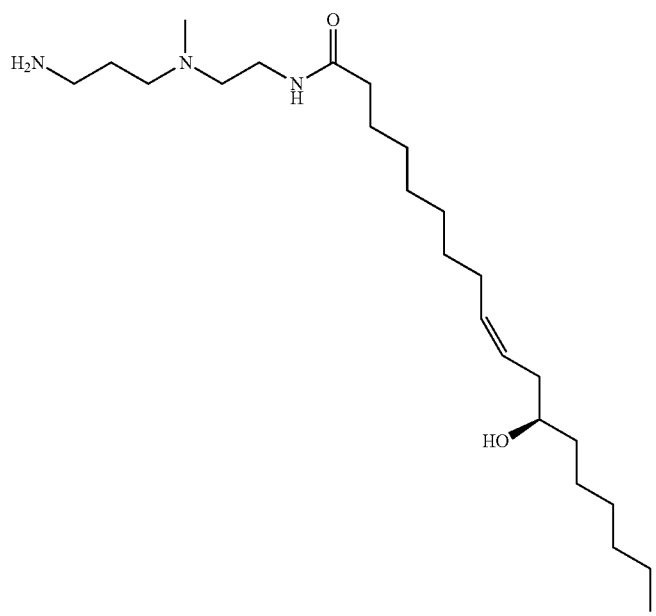
Compound 24

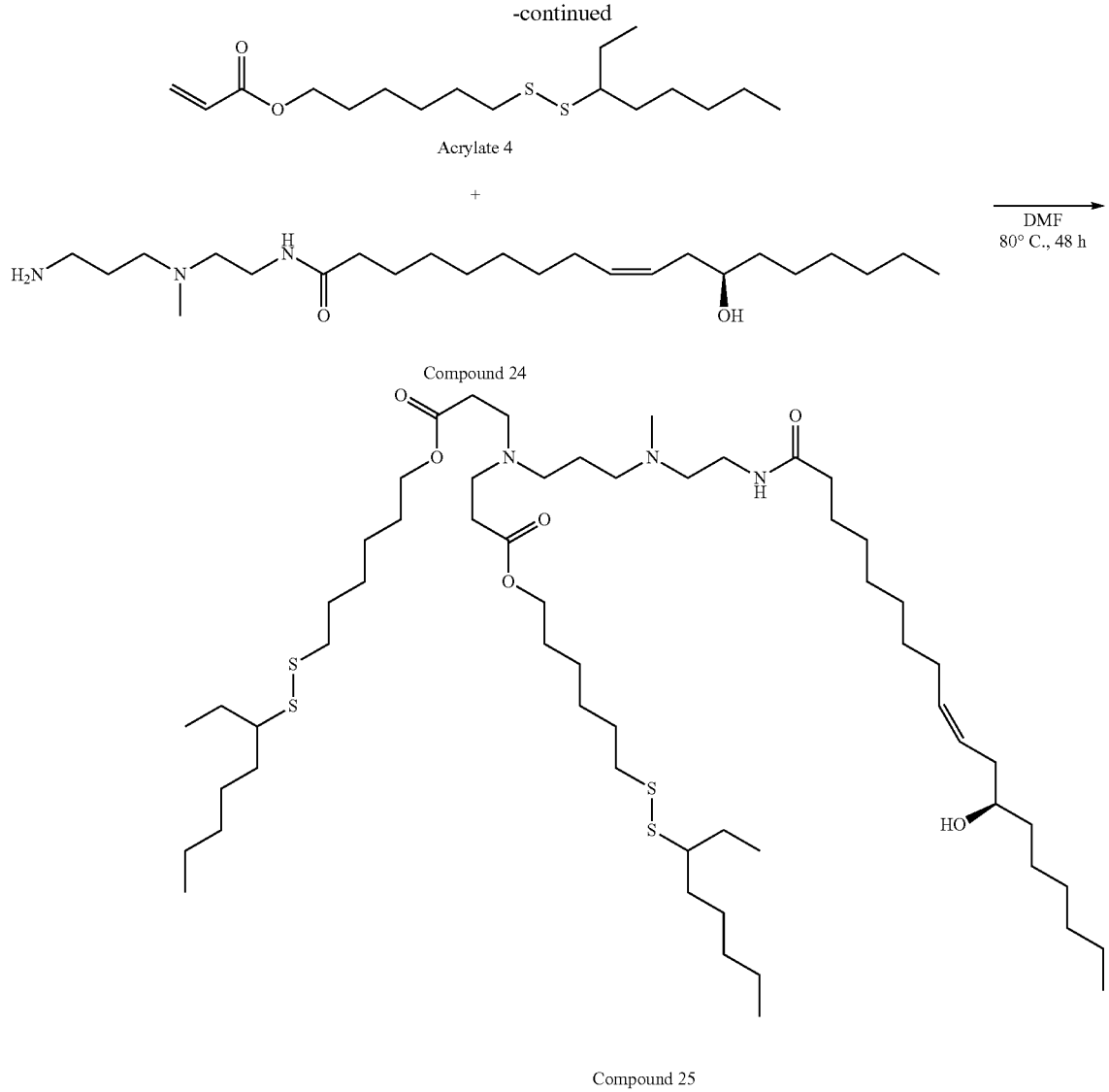

Compound 23: 500 mg of tert-butyl (3-((2-aminoethyl)(methyl)amino)propyl)-carbamate (2.16 mmol, 1 eq, MW:231.34) was added to a dry 50 mL RBF. 4 mL dry DMF was added, followed by 0.90 mL Et$_3$N (6.5 mmol, 3 eq), and then dropwise addition of 1.11 g of Ricinoleic-NHS (2.8 mmol, 1.3 eq) (as synthesized following published procedure: Talukder et al., Publication Number WO/2020/132196, which is incorporated herein by reference as if fully set forth) dissolved in 4 mL dry DMF. The reaction mixture was stirred at 23° C. for 16 h under Argon atmosphere. The reaction mixture was washed with water (1×100 mL) and extracted twice with EtOAc. The organic layer was collected and dried over Na$_2$SO$_4$, filtering Na$_2$SO$_4$, and concentrating the organic layer with rotary evaporator. The crude product was purified via flash chromatography on 80 g silica column with gradient elution from 100% CH$_2$Cl$_2$ (mobile phase a) to 75:22:3 CH$_2$Cl$_2$/MeOH/NH$_4$OHaq (by volume, mobile phase b). The desired product eluted at 20% mobile phase b (R$_f$=0.45 in 2:1 mobile phase a:mobile phase b) to yield the desired product as yellow oil (1.032 g, 93%). LRMS (ESI) calcd for C29H57N3O4 [M+H]$^+$ m/z 512.44, found 513.

Compound 24: 1.032 g of compound 23 (2.016 mmol, 1 eq, MW:512.80) was dissolved in 50.4 mL of dry DCM and added to a dry 100 mL RBF. The reaction was cooled to 0° C. Then 5.04 mL of TFA was added dropwise and the ice bath removed after 30 minutes, the reaction was stopped at 5 hours. The solvent was evaporated, TFA was removed by co-evaporation with methanol and dichloromethane. The reaction mixture was purified via flash chromatography on 80 g silica column with gradient elution from 100% CH$_2$Cl$_2$ (mobile phase a) to 75:22:3 CH$_2$Cl$_2$/MeOH/NH$_4$OH (aq) (by volume, mobile phase b). The intermediate compound eluted at 60% mobile phase b (R$_f$=0.06 in 1:2 mobile phase a:mobile phase b) as a clear oil (728 mg, 88%). MS (ESI) calcd for C24H49N3O2 [M+H]$^+$ m/z 411.38, found 412.3.

Compound 25: 100 mg of compound 24 (0.24 mmol, 1 eq, MW:411.68) was added to a 4 mL glass vial along with 186 mg of acrylate 4 (0.56 mmol, 2.3 eq; synthesis was adapted from published procedure: Ryu et al. 2010 Langmuir. 26(10):7086-92, which is incorporated herein by reference as if fully set forth). 0.25 mL of dry DMF was added. The vial was flushed with argon and tightly capped. The reaction mixture was stirred at 80° C. for 48 hours. The reaction mixture was purified via flash chromatography on 24 g silica column with gradient elution from 100% CH$_2$Cl$_2$ (mobile phase a) to 75:22:3 CH$_2$Cl$_2$/MeOH/NH$_4$OHaq (by volume, mobile phase b). The desired product eluted at 10% mobile phase b (R$_f$=0.65 in 2:1 mobile phase a:mobile phase b) as a yellow oil (193 mg, 74%). MS calcd for C$_{58}$H$_{113}$N$_3$O$_6$S$_4$ [M+H]$^+$ m/z 1076.76, observed 1076.7. 1H NMR (400 MHz, CHLOROFORM-D) δ 5.57-5.47 (m, 1H), 5.43-5.33 (m, 1H), 4.02 (t, J=6.7 Hz, 4H), 3.61-3.55 (m, 1H), 3.48 (s, 2H), 2.91-2.74 (m, 2H), 2.74-2.60 (m, 12H), 2.51 (s, 5H), 2.46 (t, J=6.4 Hz, 2H), 2.39 (t, J=6.8 Hz, 4H), 2.29-2.12 (m, 4H), 2.01 (q, J=7.0 Hz, 2H), 1.80 (s, 2H), 1.72-1.52 (m, 12H), 1.47-1.32 (m, 11H), 1.32-1.19 (m, 21H), 0.89-0.83 (m, 21H). 13C NMR (101 MHz, CHLOROFORM-D) δ 174.02, 172.62, 133.38, 125.34, 77.32, 71.57, 64.60, 57.03, 55.90, 51.21, 48.99, 44.37, 41.13, 39.12, 38.71, 36.93, 36.58, 35.48, 35.17, 32.51, 32.12, 31.93, 29.62, 29.44, 29.27, 29.22, 29.13, 29.06, 28.84, 28.61, 28.18, 27.42, 25.81, 25.69, 25.66, 25.50, 25.33, 23.03, 22.71, 14.18, 10.82.

was stirred at 80° C. for 120 hours. The reaction mixture was purified via flash chromatography on 24 g silica column with gradient elution from 100% CH$_2$Cl$_2$ (mobile phase a) to 75:22:3 CH$_2$Cl$_2$/MeOH/NH$_4$OHaq (by volume, mobile phase b). The desired product eluted at 10% mobile phase b (R$_f$=0.65 in 2:1 mobile phase a:mobile phase b) as a yellow oil (260 mg, 64%). MS calcd for C$_{56}$H$_{109}$N$_3$O$_6$S$_4$ [M+H]$^+$ m/z 1048.73, observed 1048.7. 1H NMR (400 MHz, CHLOROFORM-D) δ 5.57-5.47 (m, 1H), 5.43-5.33 (m, 1H), 4.02 (t, J=6.7 Hz, 4H), 3.61-3.55 (m, 1H), 3.48 (s, 2H), 2.91-2.74 (m, 2H), 2.74-2.60 (m, 12H), 2.51 (s, 5H), 2.46 (t, J=6.4 Hz, 2H), 2.39 (t, J=6.8 Hz, 4H), 2.29-2.12 (m, 4H), 2.01 (q, J=7.0 Hz, 2H), 1.80 (s, 2H), 1.72-1.52 (m, 12H), 1.47-1.32 (m, 11H), 1.32-1.19 (m, 21H), 0.89-0.83 (m, 21H). 13C NMR (101 MHz, CHLOROFORM-D) δ 173.89, 172.64, 133.37, 125.35, 77.32, 71.57, 64.58, 56.90, 55.85, 51.28, 49.05, 43.05, 41.23, 40.15, 38.94, 36.93, 36.61, 35.48, 32.55, 31.93, 30.45, 29.62, 29.44, 29.28, 29.23, 29.14, 29.11, 28.61, 28.18, 27.42, 25.81, 25.69, 24.62, 22.70, 14.18.

Preparation of Compound 26

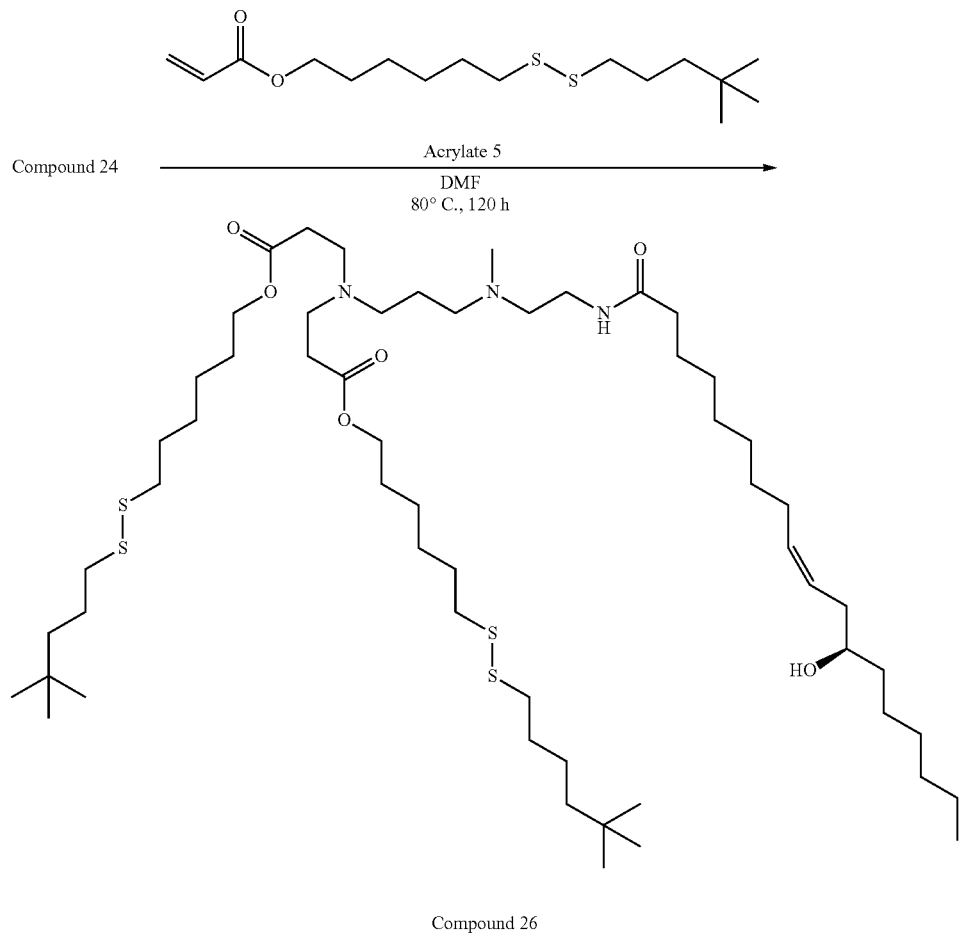

Compound 26

Compound 26: 160 mg of compound 24 (0.39 mmol, 1 eq, MW: 411.68) was added to a 20 mL vial along with 285 mg of acrylate 5 (0.89 mmol, 2.3 eq: synthesis was adapted from published procedure: Ryu et al. 2010 Langmuir. 26(10): 7086-92, which is incorporated herein by reference as if fully set forth). 1 mL of dry DMF was added. The vial was flushed with argon and tightly capped. The reaction mixture Compounds 32-41 can be synthesized using a similar procedure as Compound 26 with commercially available reagents.

The references cited throughout this application, are incorporated for all purposes apparent herein and in the references themselves as if each reference was fully set forth. For the sake of presentation, specific ones of these references are cited at particular locations herein. A citation of a reference at a particular location indicates a manner(s) in which the teachings of the reference are incorporated. However, a citation of a reference at a particular location does not limit the manner in which all of the teachings of the cited reference are incorporated for all purposes.

It is understood, therefore, that this invention is not limited to the particular embodiments disclosed but is intended to cover all modifications which are within the spirit and scope of the invention as defined by the appended claims; the above description; and/or shown in the attached drawings.

What is claimed is:
1. A compound of Formula I:

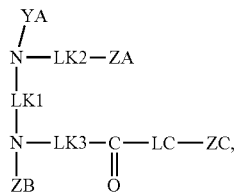

in which
YA is H or $C_1$-$C_4$ alkyl;
ZA is $C_1$-$C_{30}$ amino, $C_1$-$C_{30}$ amido, $C_1$-$C_{30}$ carbonyl, $C_1$-$C_{30}$ carboxylate, or triazolyl;
ZB is

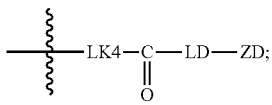

each of LC or LD is O;
ZC is ZC2-XC-XC-ZC3, in which XC is S, ZC2 is $C_4$-$C_{10}$ alkylene, and ZC3 is $C_6$-$C_{12}$ alkyl or alkenyl;
ZD is $C_4$-$C_{10}$ alkylene substituted with $C_6$-$C_{12}$ disulfanyl, in which disulfanyl contains $C_6$-$C_{12}$ alkyl or alkenyl;
LK1 is

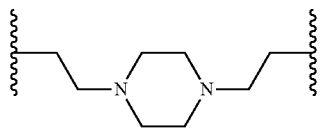

or $C_3$-$C_8$ alkylene;
LK2 is a bond or $C_1$-$C_8$ alkylene;
each of LK3 and LK4 is —(CH$_2$)$_2$—; and
wherein the compound has 40 to 100 carbon atoms.

2. The compound of claim 1, wherein each of alkyl, alkylene, alkenyl, amino, amido, carbonyl, and carboxylate is unsubstituted or substituted with one or more of halo, hydroxyl, $C_1$-$C_6$ amino, $C_2$-$C_6$ carbamate, $C_2$-$C_{20}$ carboxylate, $C_2$-$C_{20}$ carbonyl, aryl, $C_1$-$C_{10}$ phosphate, ethylene glycol, $C_4$-$C_{30}$ polyethylene glycol, $C_1$-$C_{30}$ disulfanyl, diazolyl, triazolyl, or sugar; and each of diazolyl, triazolyl, phosphate and sugar is unsubstituted or substituted with halo, hydroxyl, alkyl, alkenyl, alkynyl, $C_1$-$C_6$ amino, $C_2$-$C_6$ carbamate, $C_2$-$C_{20}$ carboxylate, $C_2$-$C_{20}$ carbonyl, aryl, $C_1$-$C_{10}$ phosphate, ethylene glycol, $C_4$-$C_{30}$ polyethylene glycol, $C_1$-$C_{30}$ disulfanyl, diazolyl, triazolyl, nucleobase or sugar.

3. The compound of claim 2, wherein disulfanyl is unsubstituted or substituted with one or more of halo, hydroxyl, aryl, and $C_1$-$C_{20}$ carboxylate.

4. The compound of claim 1, wherein YA is H or $C_1$-$C_4$ alkyl, and alkyl is unsubstituted or substituted with one or more groups selected from hydroxyl, halo, sugar, $C_1$-$C_6$ amino, $C_1$-$C_6$ carbamate, $C_4$-$C_{30}$ polyethylene glycol, ethylene glycol, phosphate, nucleobase, imidazole, morpholine, pyrrolidine, piperidine and piperazine, acetyl, methylsulfonyl, methylformamido, dimethylformamido, methylthioforamido, dimethylthioformamido, (E)-N'-cyano-N-methylformimidamido, (E)-N'-cyano-N,N-dimethylformimidamideo (E)-N'-nitroformimidamido, (E)-N,N-dimethyl-N'-nitroformimidamido, (E)-N'-methoxyformimidamido, (E)-N'-sulfamoylformimidamido, thiazoyl, 2-(methylamino)-3,4-dioxocyclobut-1-en-1-yl, 2-(dimethylamino)-3,4-dioxocyclobut-1-en-1-yl, 2-(methylcarbamoyl)acetyl, and malonamido.

5. The compound of claim 4, wherein YA is H, —CH$_3$, —C$_2$H$_5$, —C$_3$H$_7$, —C$_2$H$_4$OH, —C$_3$H$_6$OH, -C$_2$H$_4$N(CH$_3$)$_2$, -C$_3$H$_6$N(CH$_3$)$_2$, —C$_2$H$_4$O(CO)NHCH$_3$, C$_3$H$_6$OC$_{14}$H$_{19}$O$_9$, —C$_3$H$_6$O(CO)NHCH$_3$, or —C$_3$H$_6$OP(O)(OC$_2$H$_5$)$_2$.

6. The compound of claim 1, wherein LK1 is —(CH$_2$)$_2$—, —(CH$_2$)$_3$—, or —(CH$_2$)$_4$.

7. The compound of claim 1, wherein, ZA is $C_2$-$C_{20}$ amino- or $C_2$-$C_{20}$ amido, and each of amino; and amido; is unsubstituted or substituted with one or more groups selected from halo, hydroxyl, disulfanyl, carboxylate, sugar, phosphate, ethylene glycol, and $C_4$-$C_{30}$ polyethylene glycol.

8. The compound of claim 1, wherein ZA is $C_2$-$C_{20}$ amino substituted with one or more of —C(O)—O-ZA2-XA-XA-ZA3, —C(O)—O-ZA2-(XA-XA-ZA3)$_2$, —C(O)—O-ZA2-(XA-XA-ZA3)$_3$, —C(O)—O-ZA2-diazolyl-ZA4, —C(O)—O-ZA2-triazolyl-ZA4, —C(O)—O-ZA4, in which XA is CH$_2$ or S; ZA2 is $C_4$-$C_{10}$ alkylene, $C_4$-$C_{10}$ alkenylene, or $C_4$-$C_{10}$ alkynylene; and each of ZA3 and ZA4, independently, is $C_1$-$C_{30}$ alkyl, N(CH$_3$)$_2$, or NHCH$_3$.

9. The compound of claim 1, wherein ZA contains one or more groups selected from hydroxyl, sugar, phosphate, ethylene glycol, and $C_4$-$C_{10}$ polyethylene glycol; each of LK3 and LK4 is —(CH$_2$)$_2$—; ZC is —(CH$_2$)$_{nc2}$-XC-XC-ZC3; XC is S; nc2 is 5-8; and ZC3 is $C_6$-$C_{12}$ alkyl.

10. The compound of claim 1, wherein the compound is one of Compounds 3, 20, 21, 25, 26, 28-42, and 44 as shown below.

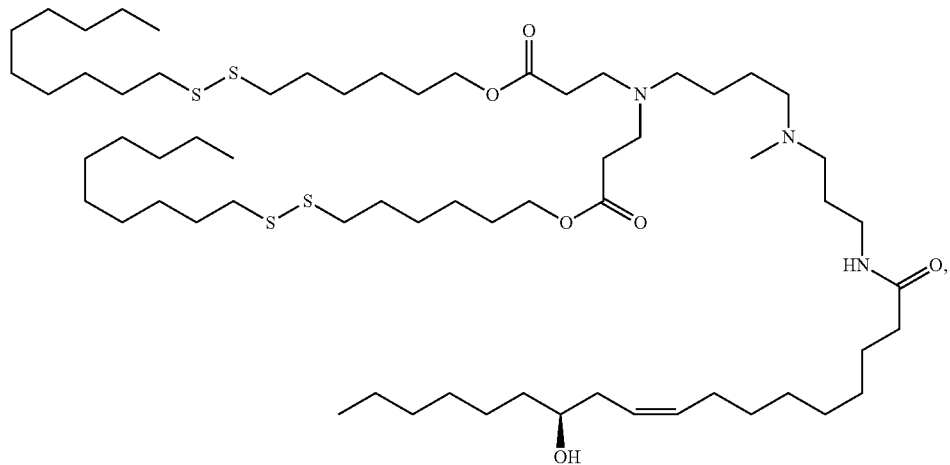
Compound 3
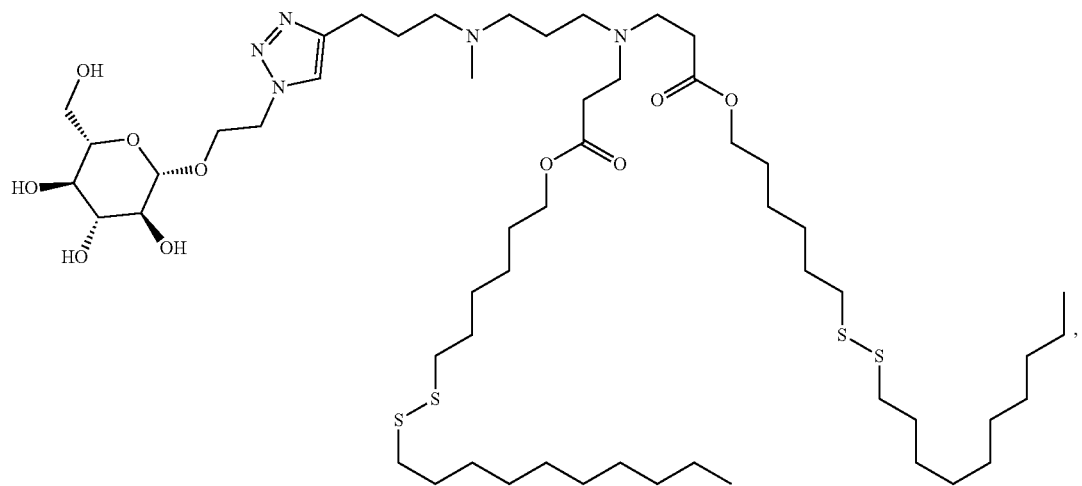
Compound 20
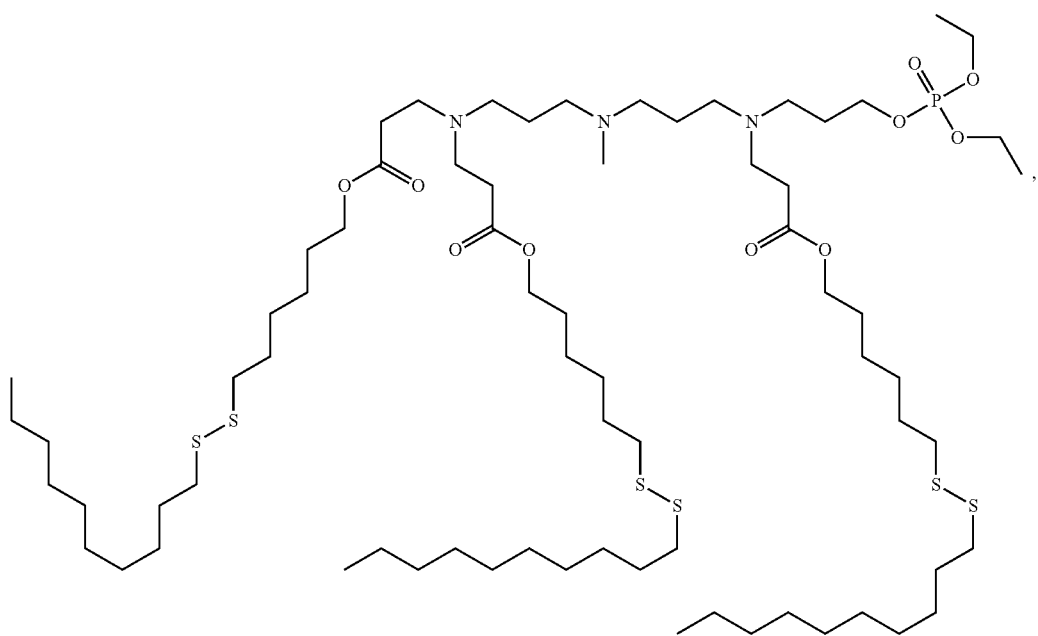
Compound 21

-continued
Compound 25
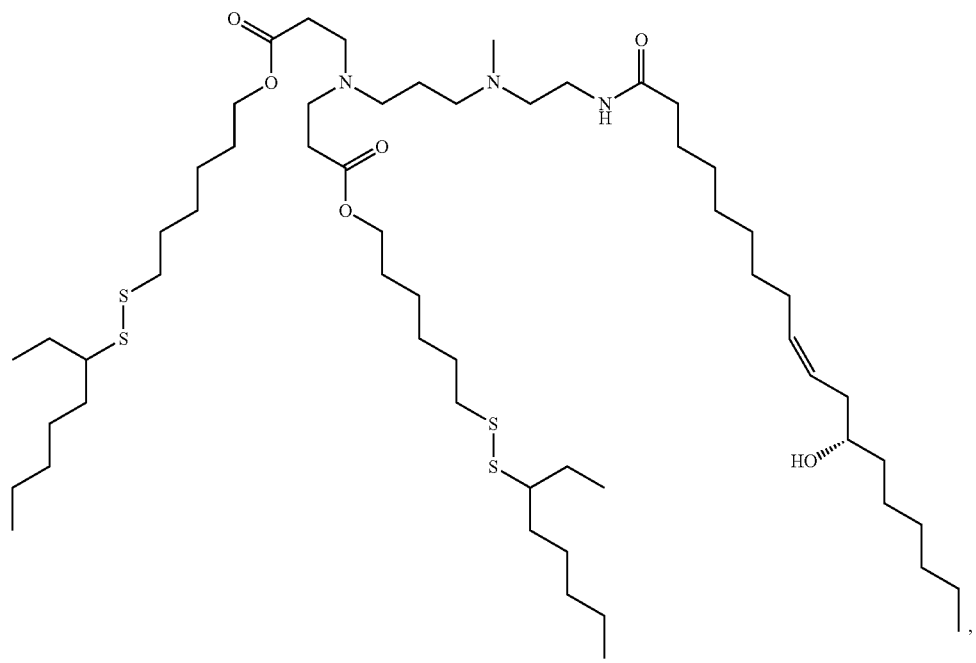
Compound 26
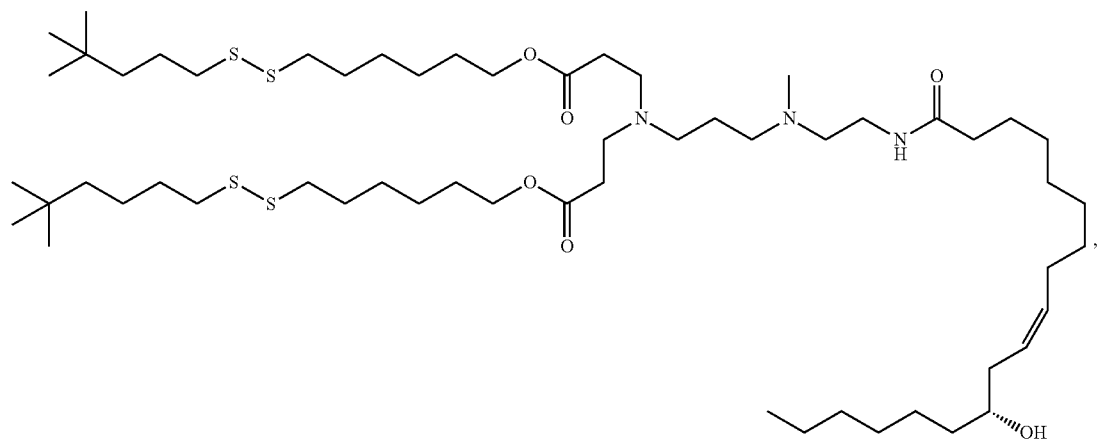
Compound 28
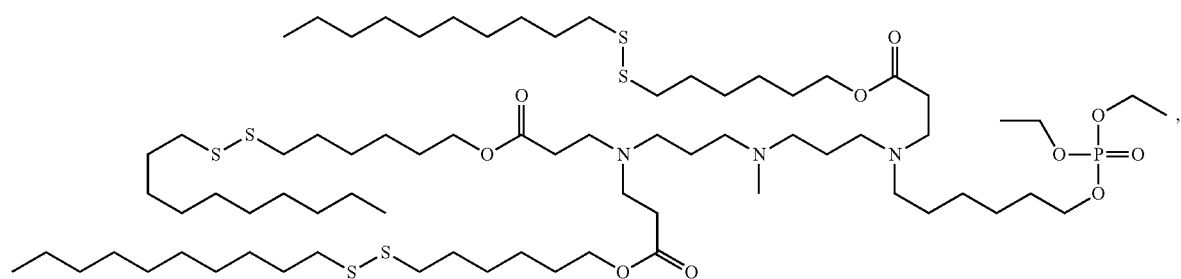

-continued
Compound 29
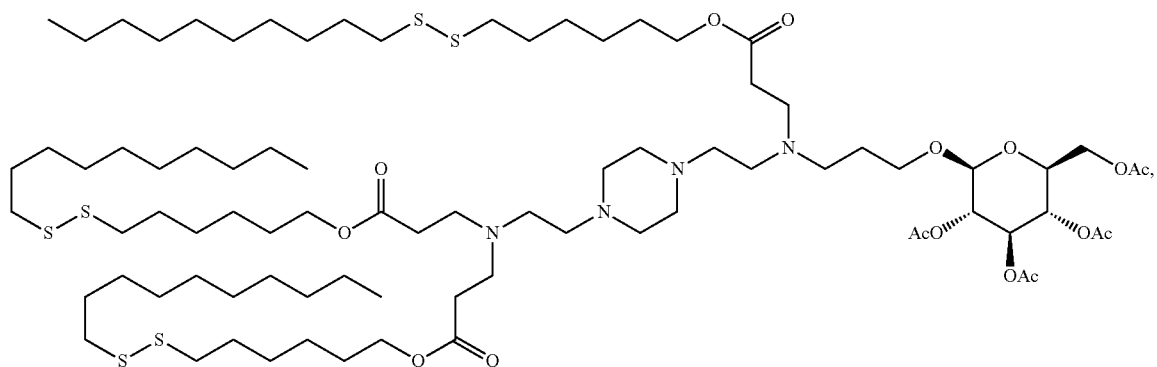
Compound 30
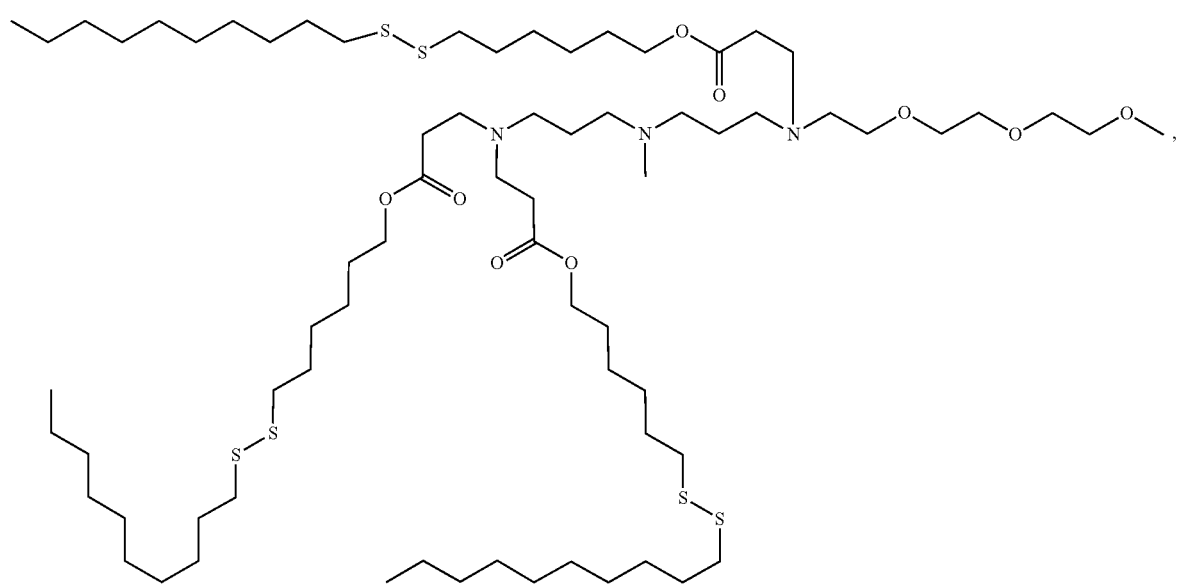
Compound 31
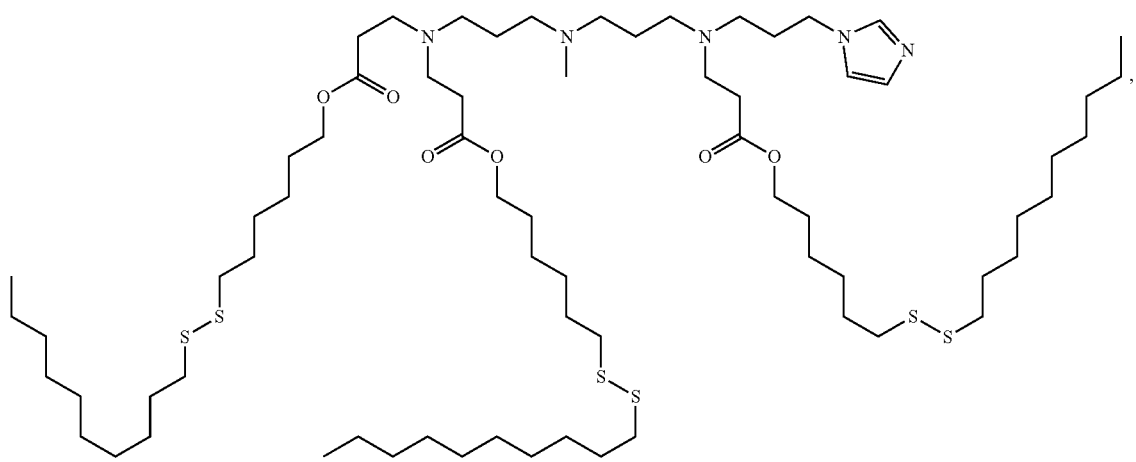

-continued
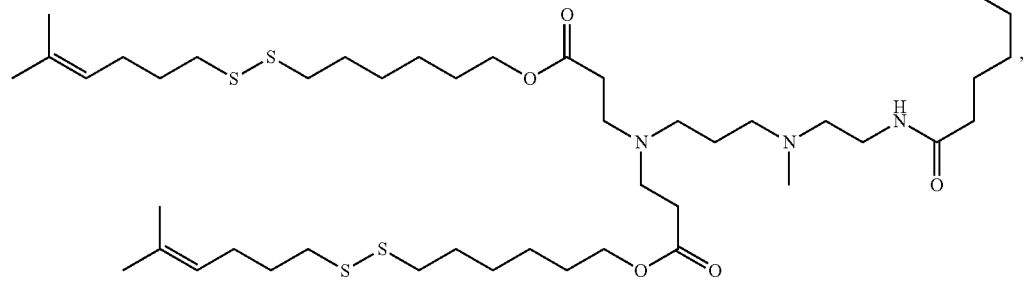
Compound 32
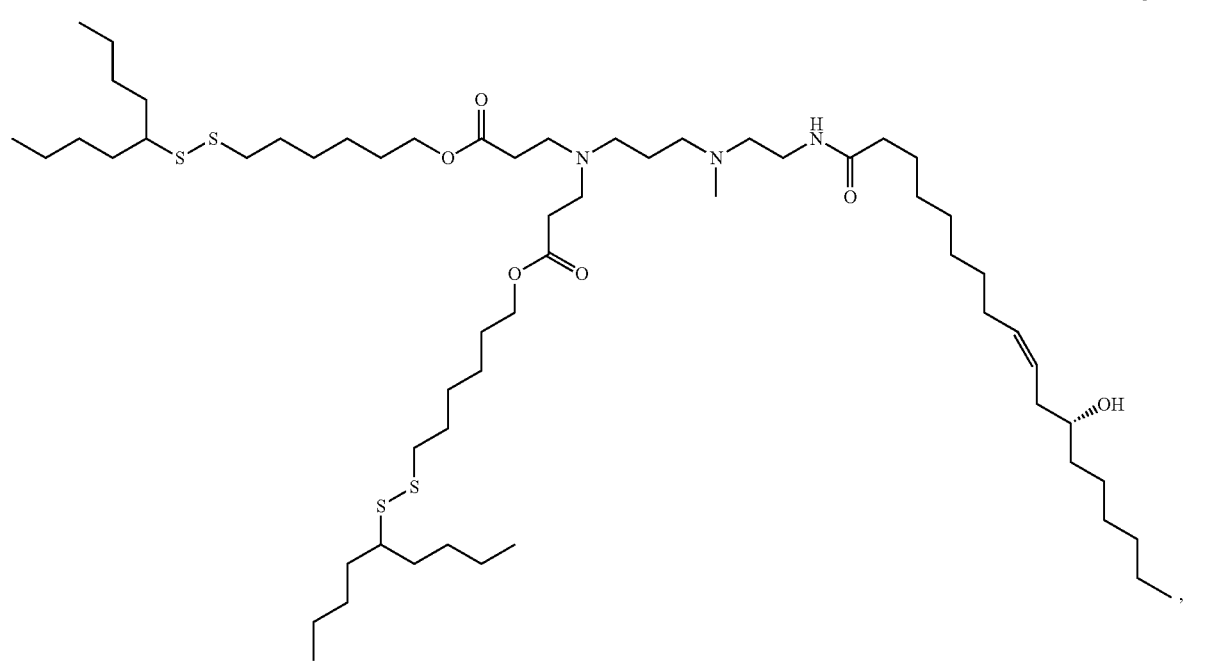
Compound 33
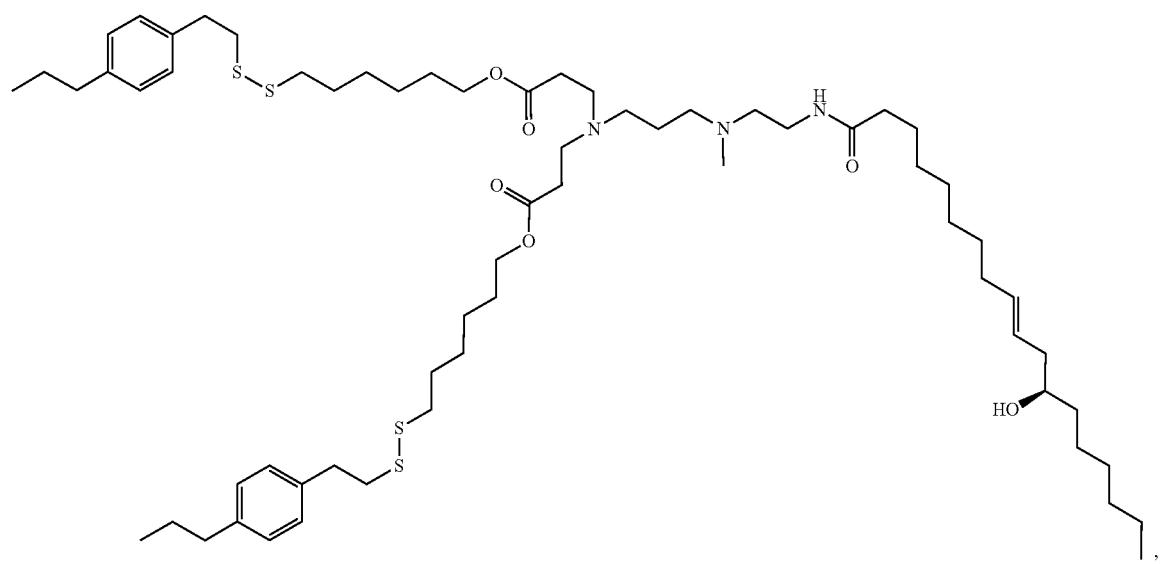
Compound 34

Compound 35
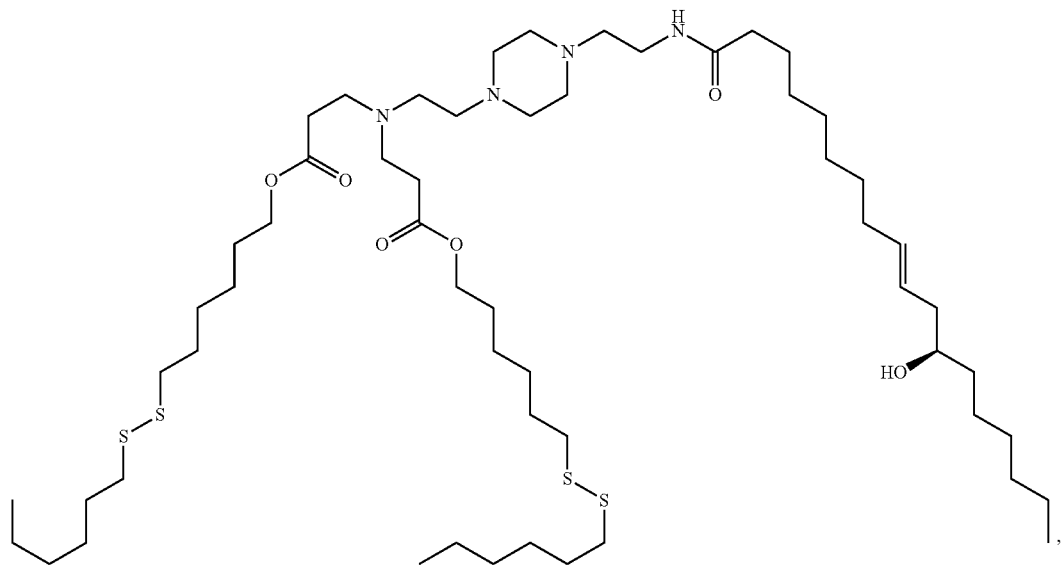
Compound 36
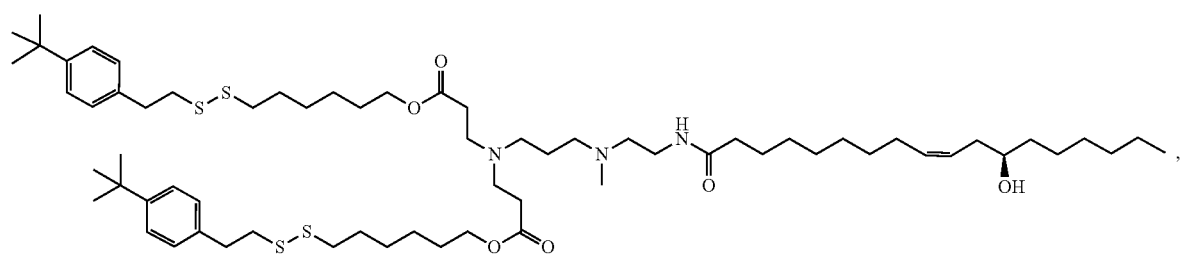
Compound 37
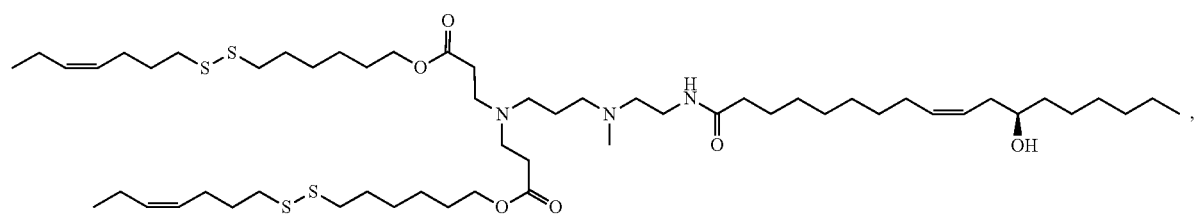
Compound 38
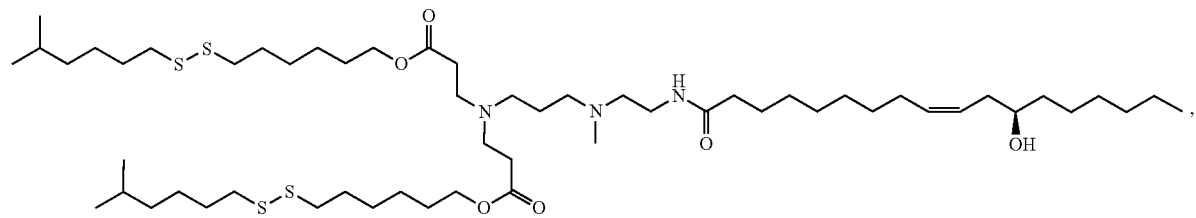

Compound 39
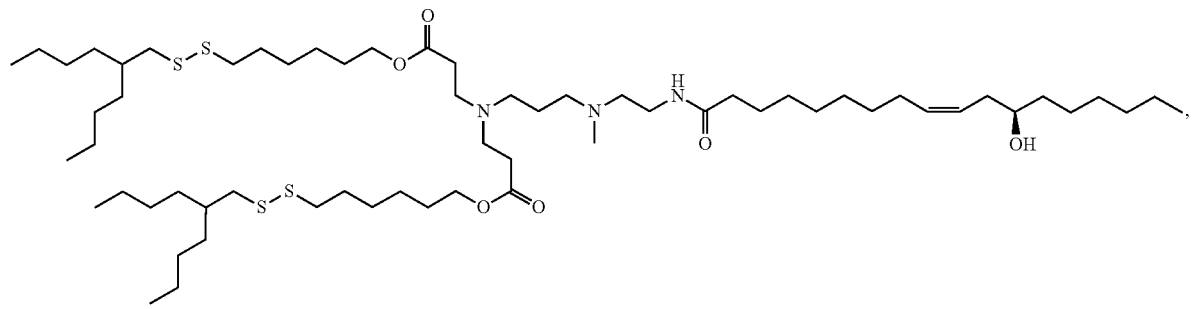
Compound 40
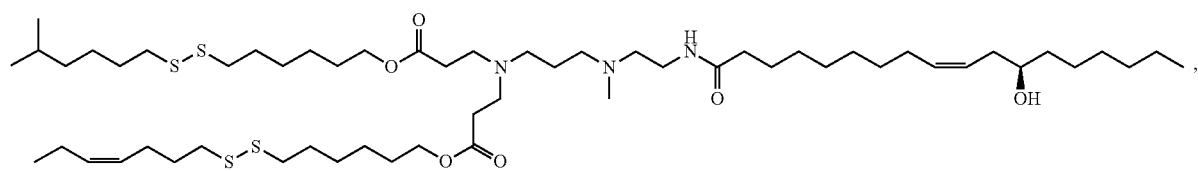
Compound 41
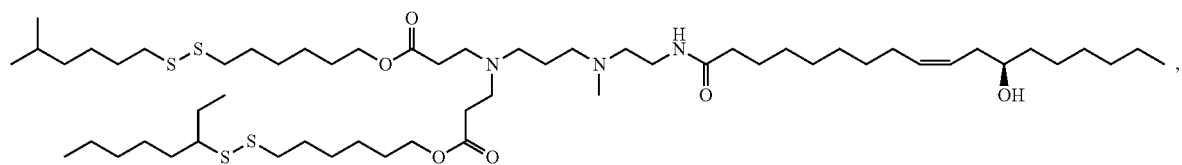
Compound 42
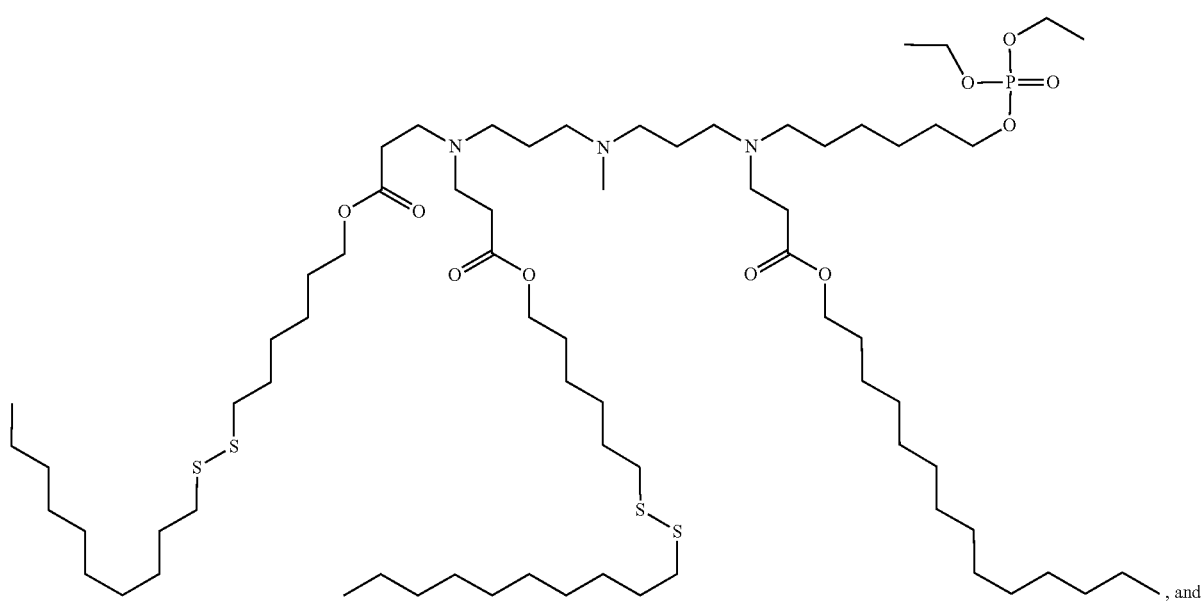
, and -continued
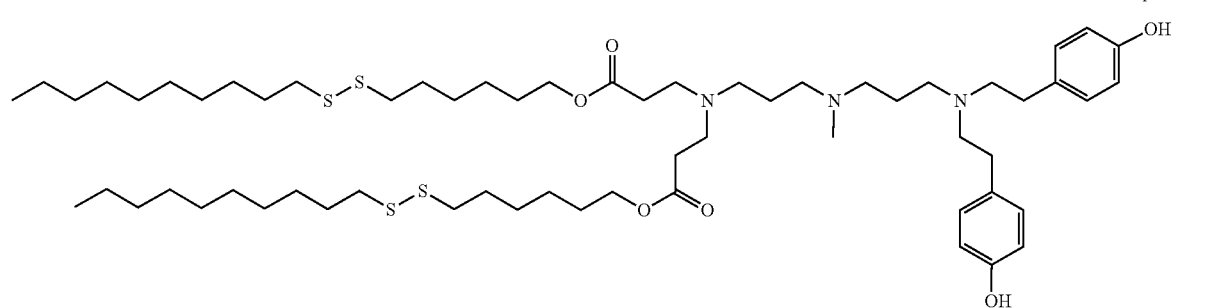
Compound 44
11. A compound selected from the group consisting of Compounds 3, 5, 6, 8, 9, 13, 15, 18, 20-22, and 25-44 as shown below:
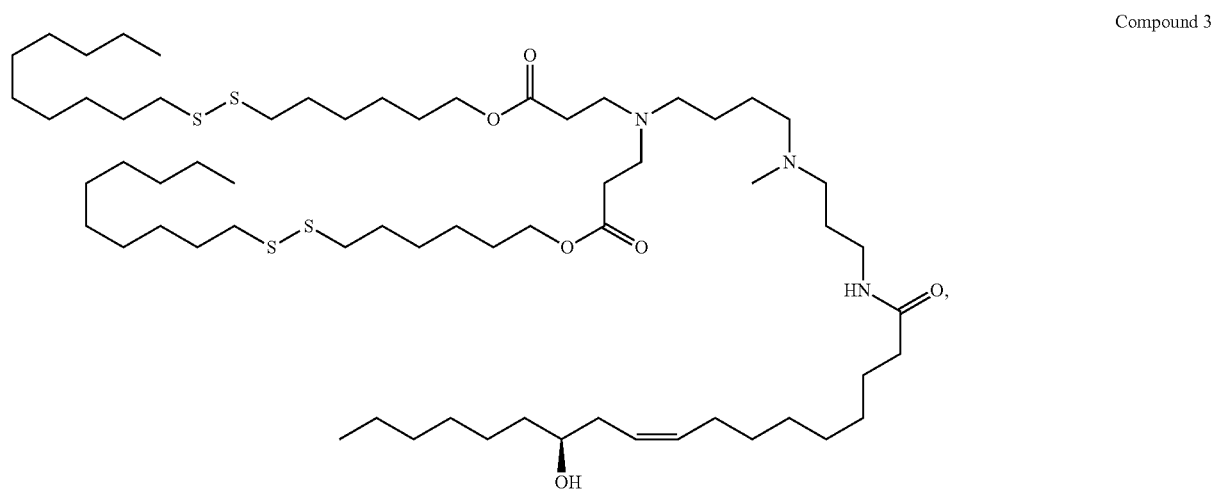
Compound 3
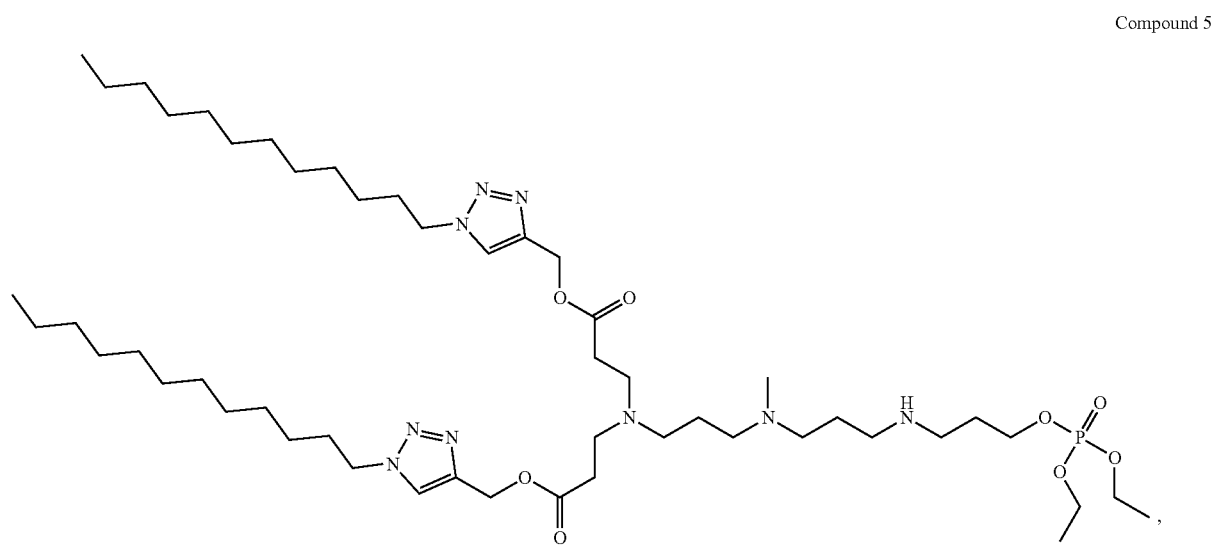
Compound 5

Compound 6
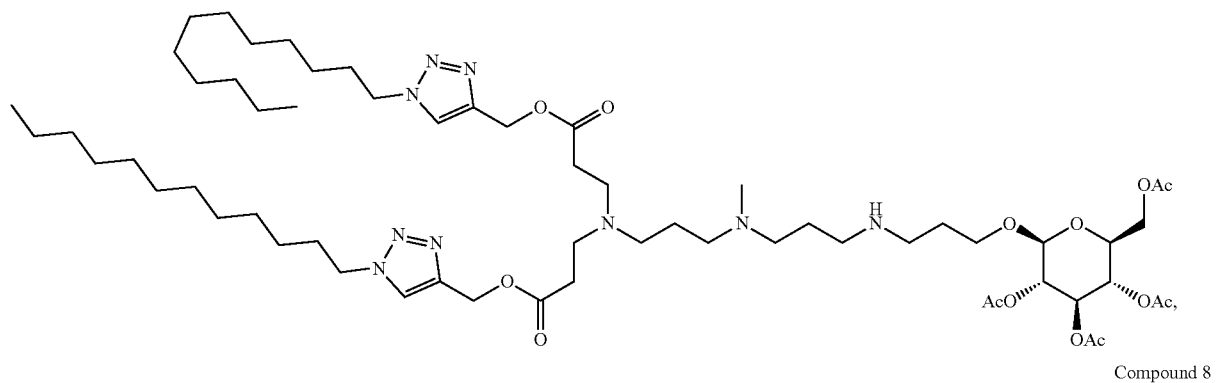
Compound 8
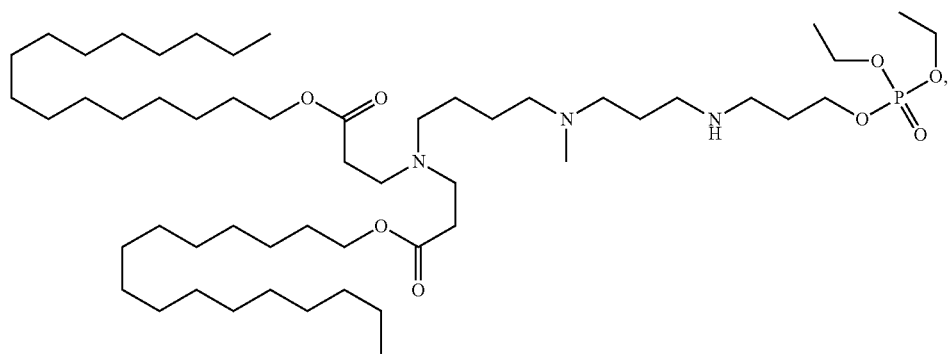
Compound 9
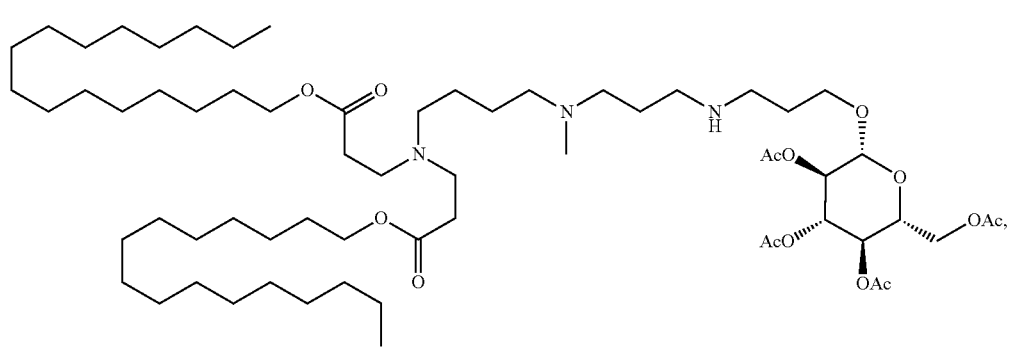
Compound 13
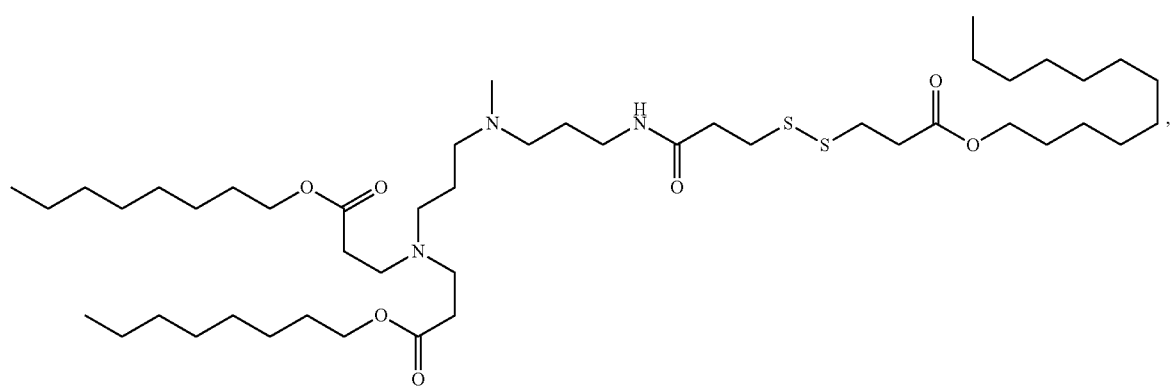

Compound 15
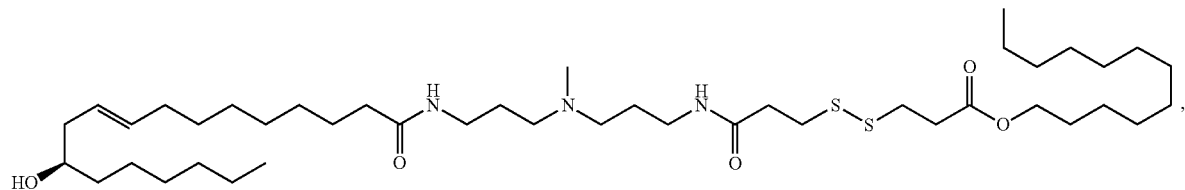
Compound 18
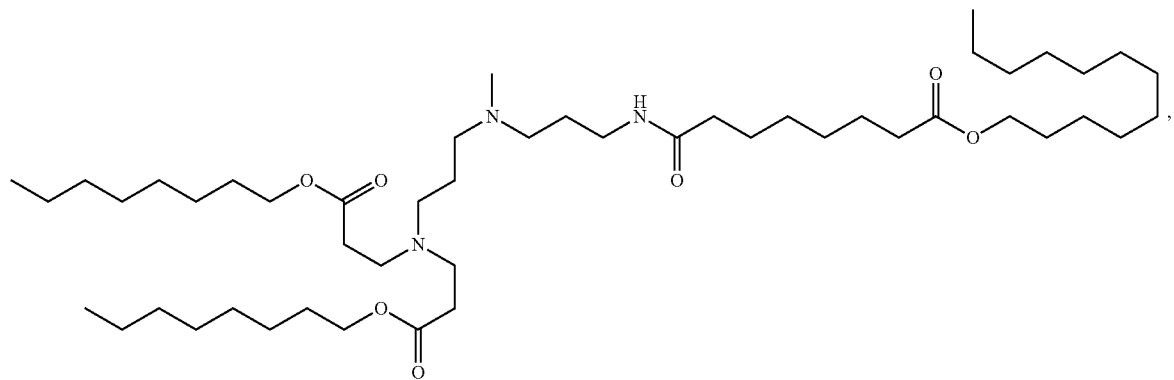
Compound 20
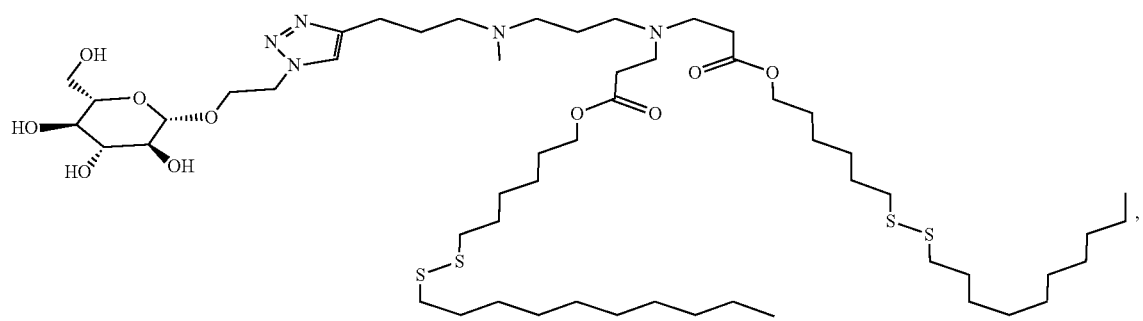
Compound 21
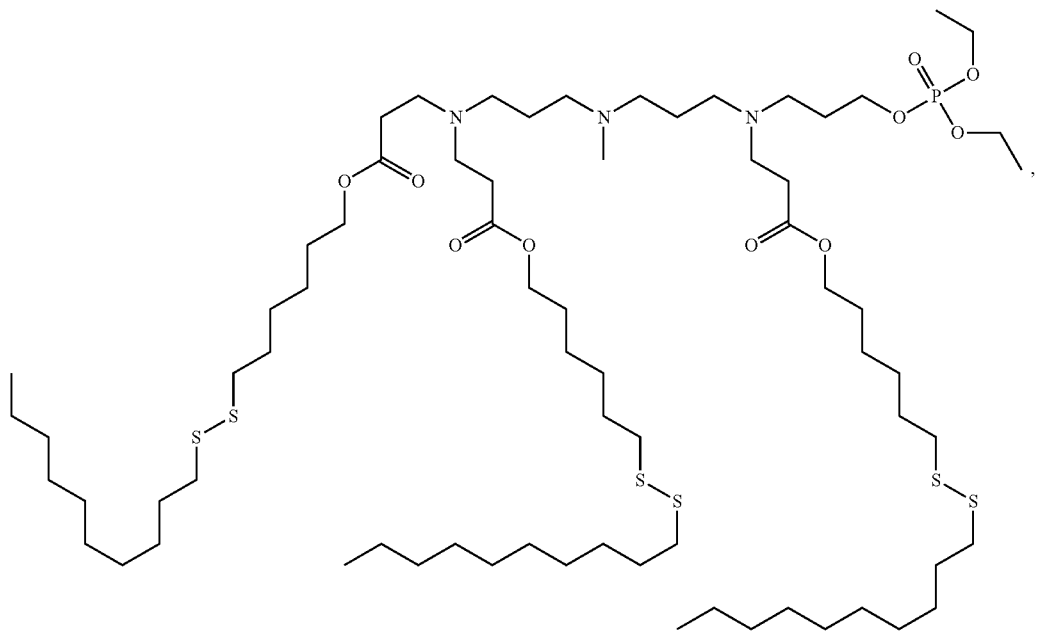

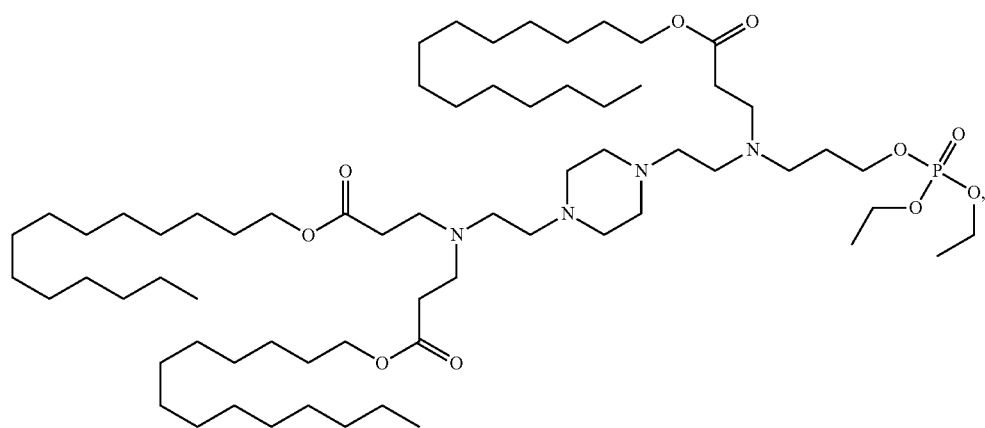
Compound 22
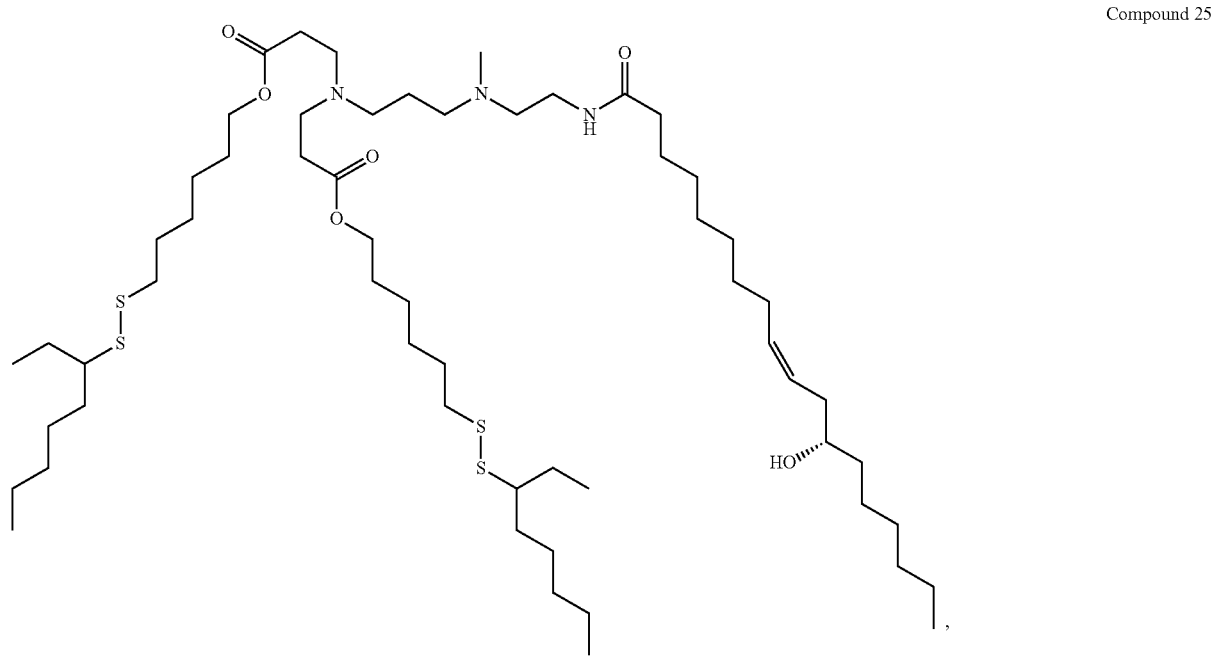
Compound 25
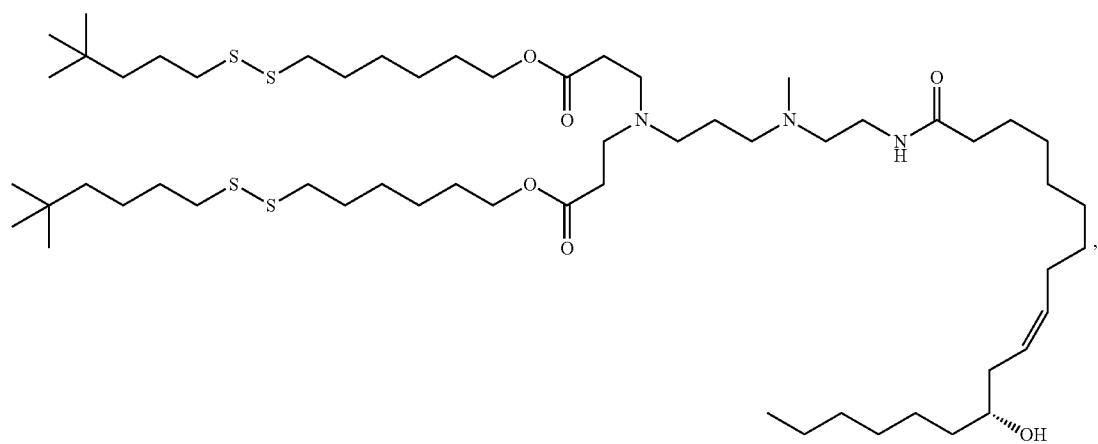
Compound 26

Compound 27
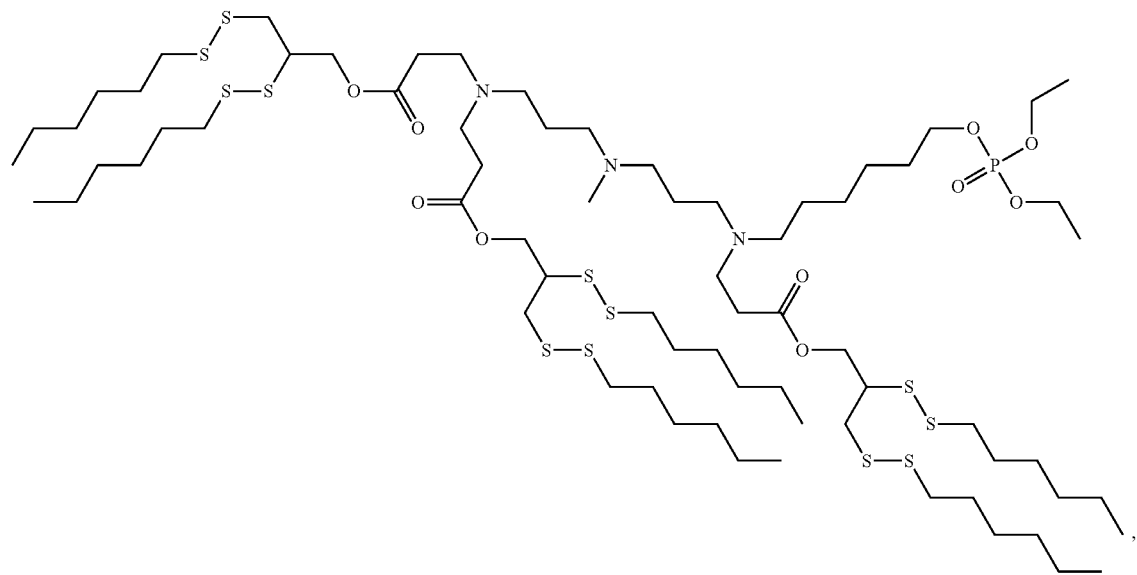
Compound 28
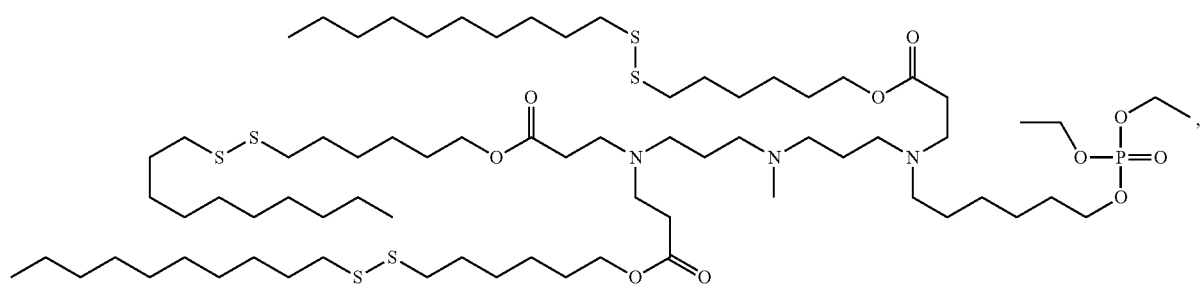
Compound 29
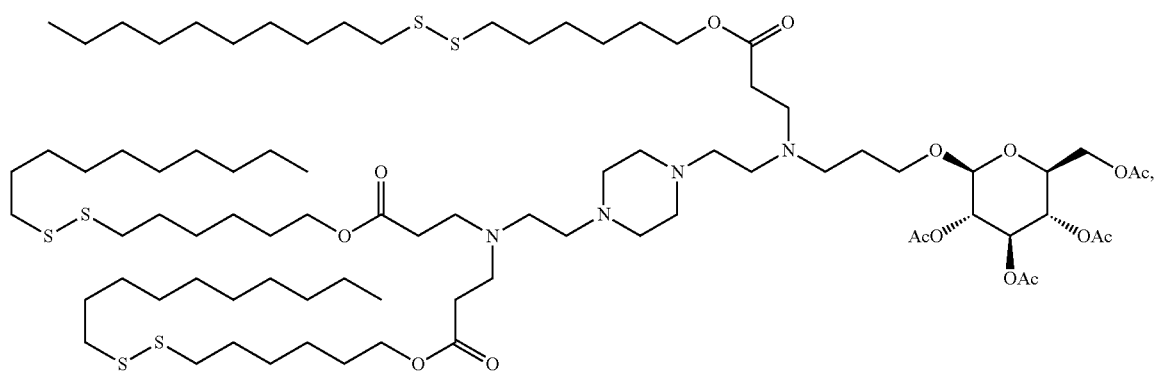

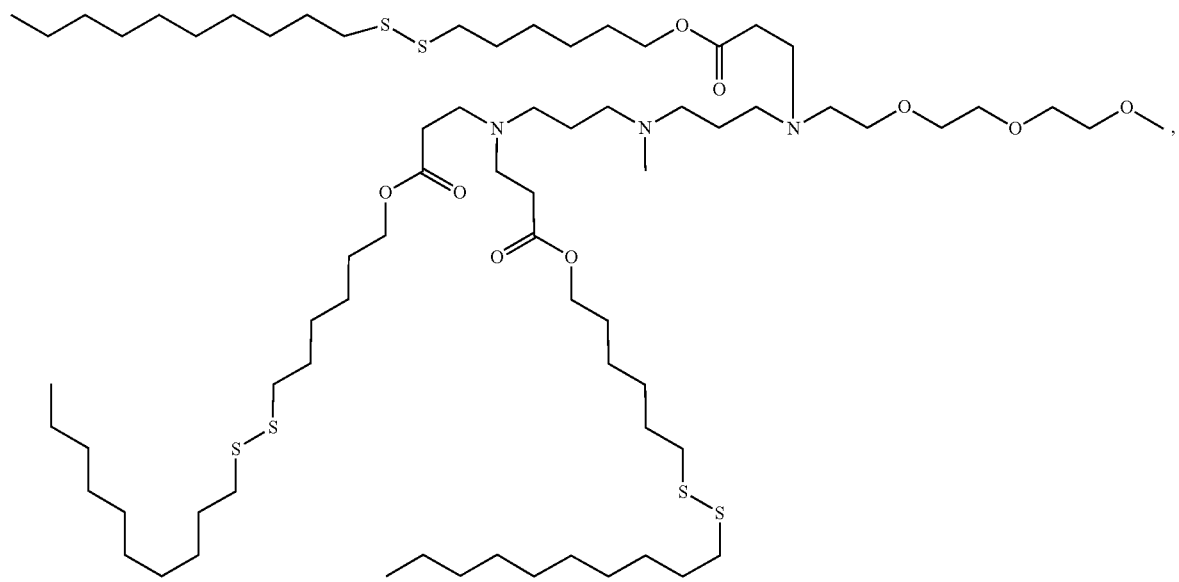
Compound 30
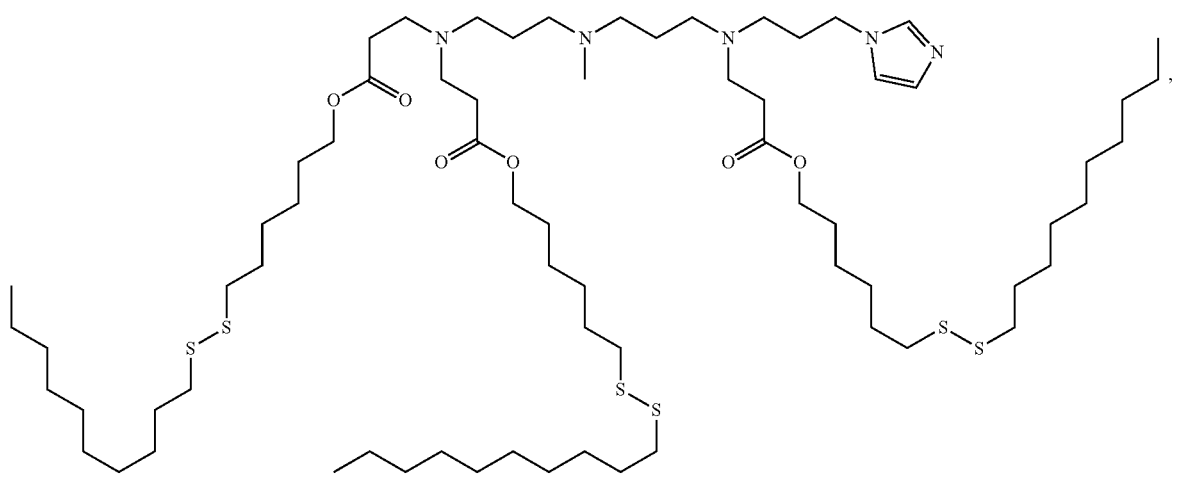
Compound 31
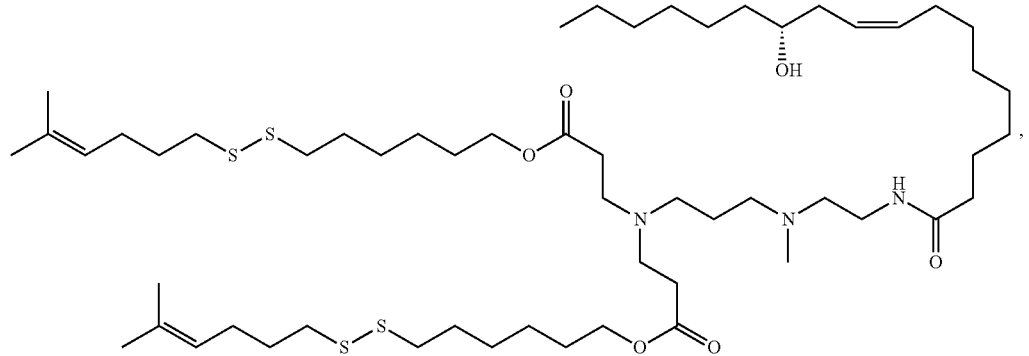
Compound 32

Compound 33
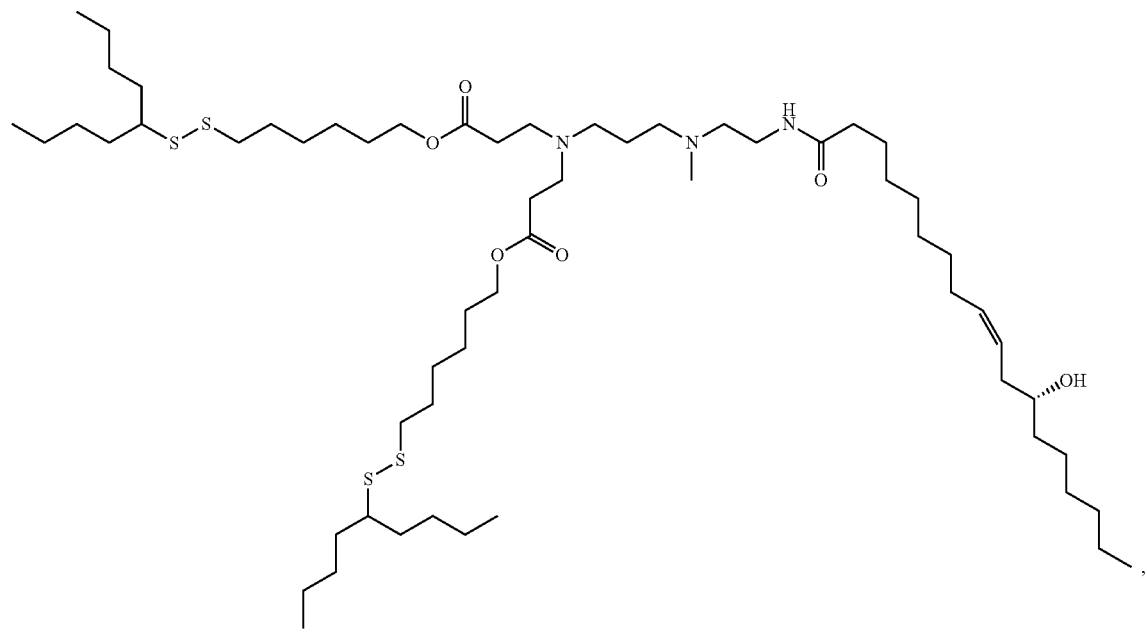
Compound 34
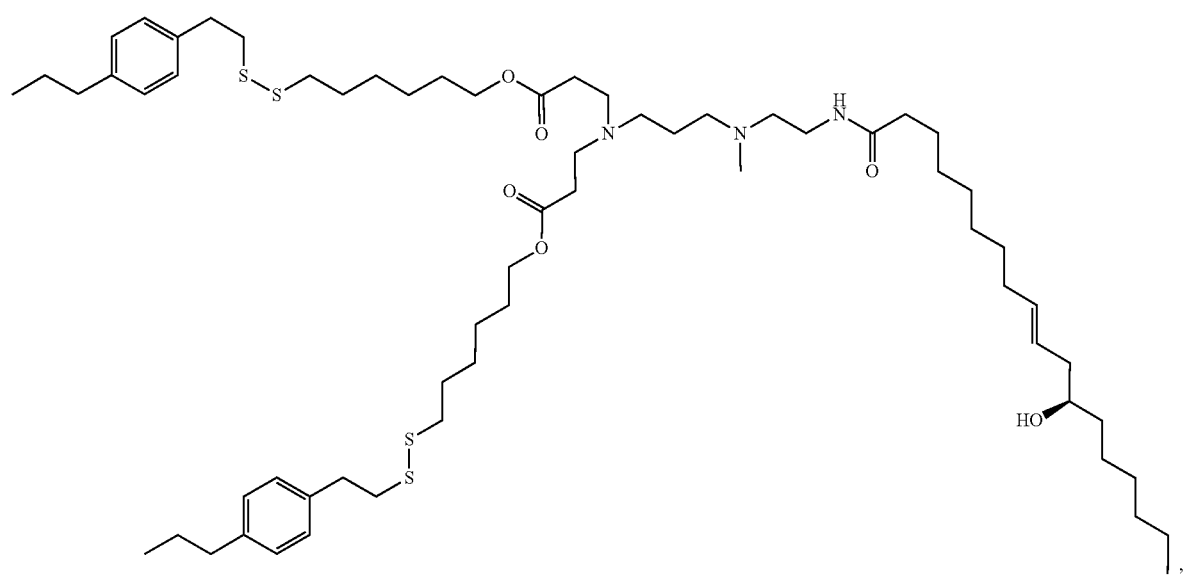

-continued
Compound 35
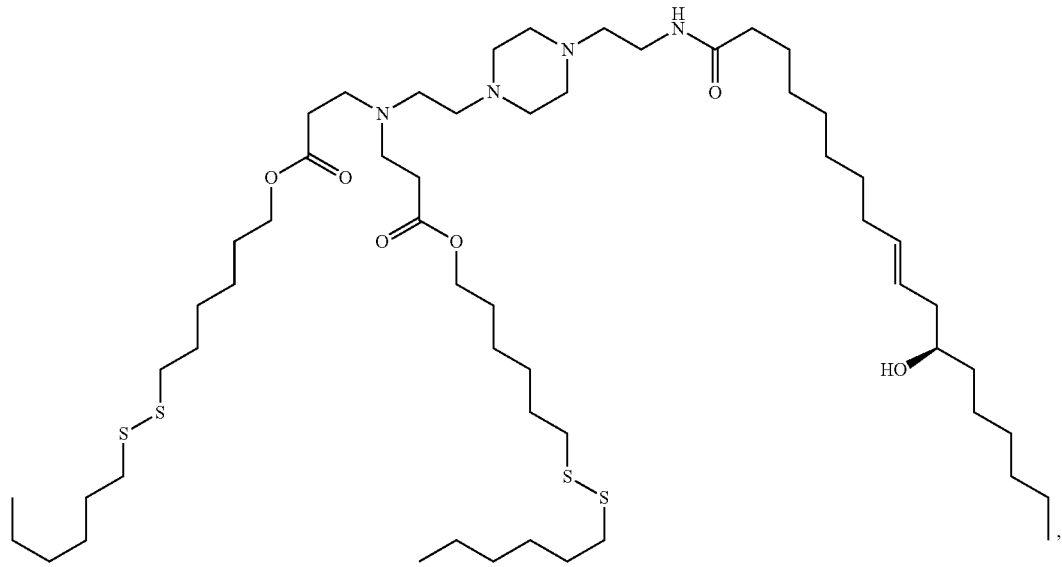
Compound 36
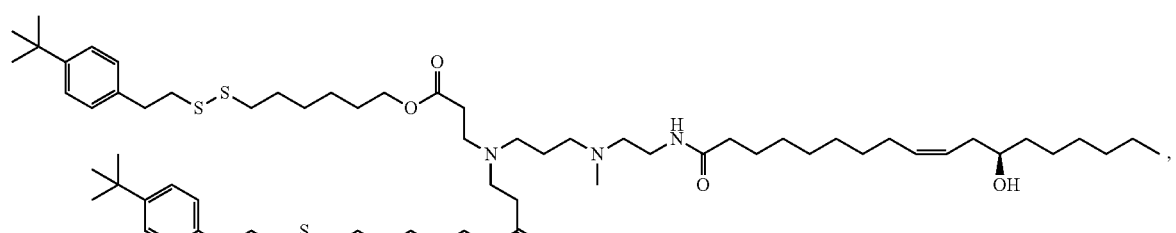
Compound 37
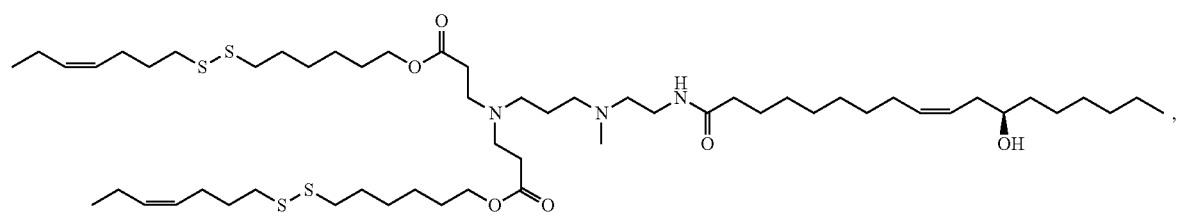
Compound 38
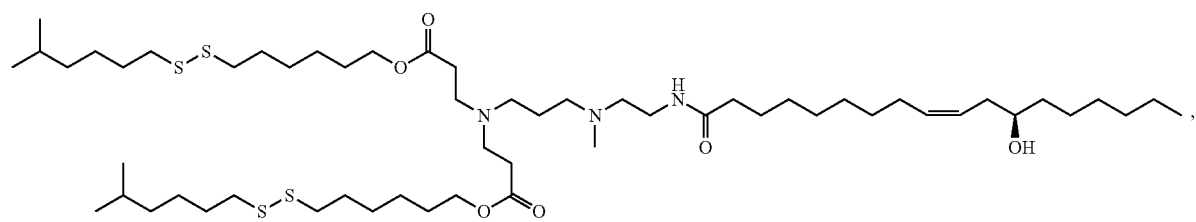
Compound 39
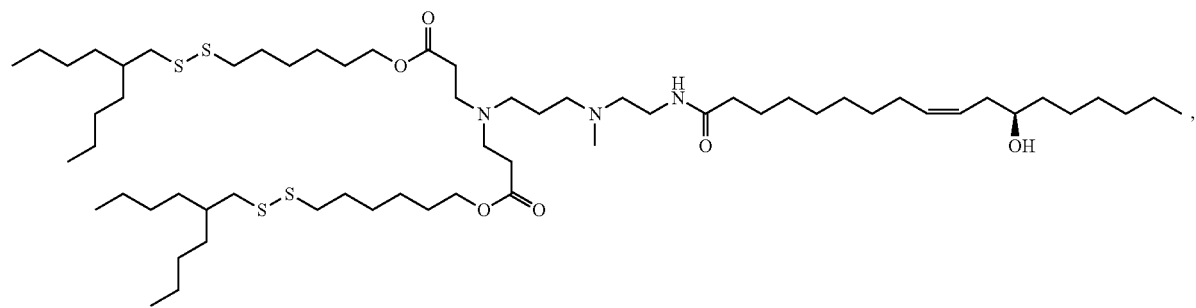

Compound 40
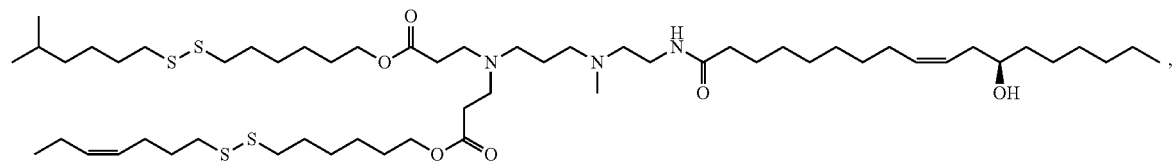
Compound 41
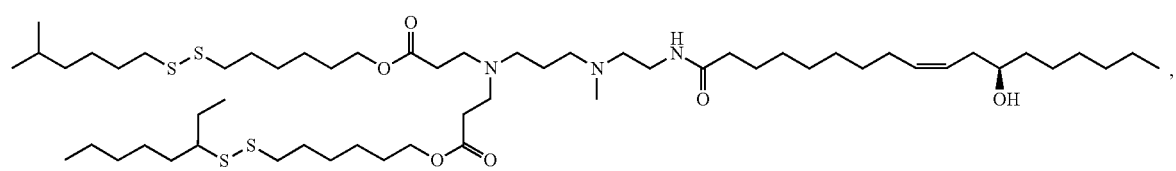
Compound 42
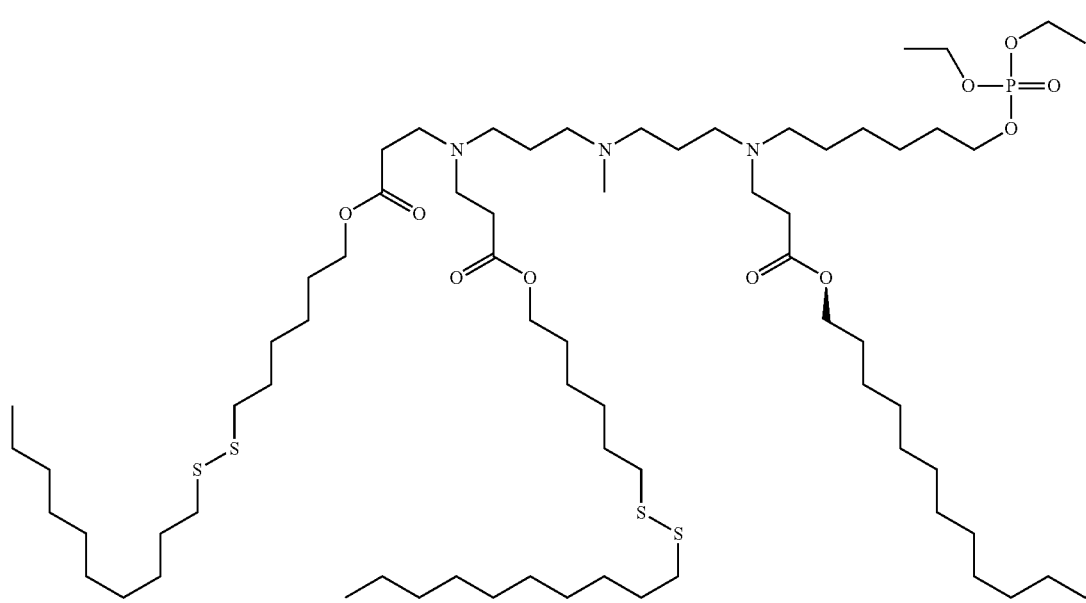
Compound 43
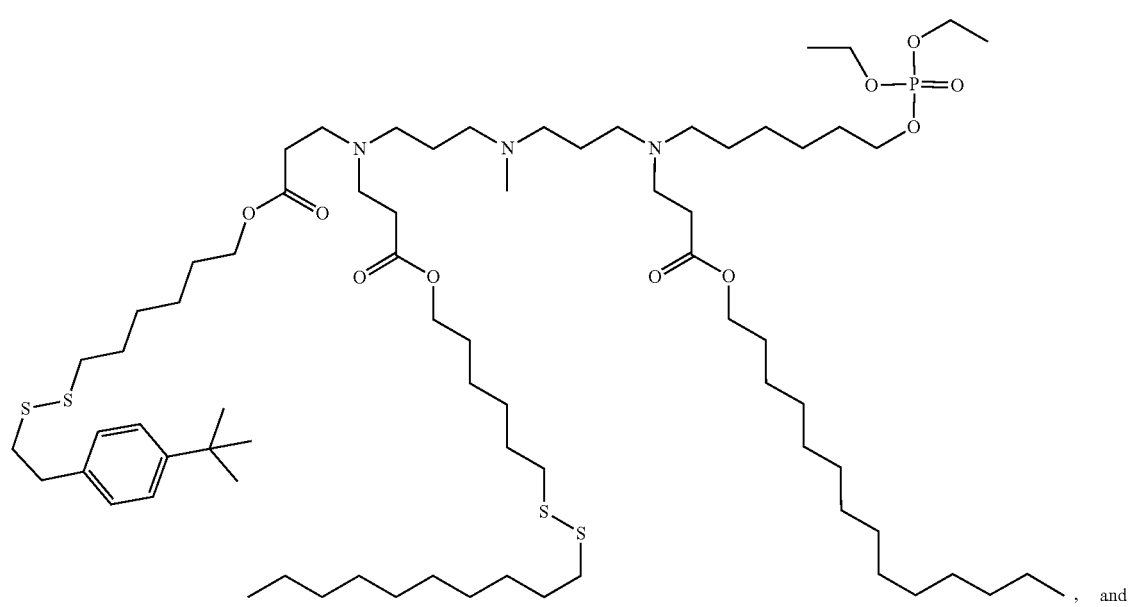
, and -continued

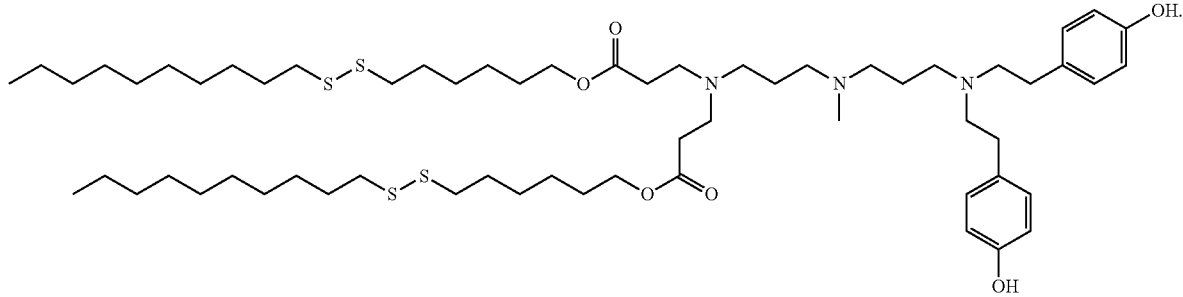

Compound 44

12. A nanoparticle composition comprising a compound of claim 1, and a therapeutic or immunogenic nucleic acid agent fully or partially encapsulated therein.

13. The nanoparticle composition of claim 12, wherein the therapeutic or immunogenic nucleic acid agent is selected from the group consisting of a polynucleotide, oligonucleotide, DNA, cDNA, RNA, repRNA, siRNA, miRNA, sgRNA, and mRNA.

14. The nanoparticle composition of claim 12, wherein the therapeutic or immunogenic nucleic acid agent encodes one or more antigens selected from the group consisting of infectious disease, pathogen, cancer, autoimmunity disease and allergenic disease.

15. The nanoparticle composition of claim 12, wherein the therapeutic or immunogenic nucleic acid agent comprises an RNA or DNA capable of silencing, inhibiting or modifying the activity of a gene.

16. The nanoparticle composition of claim 12 further comprising a PEG-lipid.

17. The nanoparticle composition of claim 12, further comprising a PEG-lipid, where the PEG-lipid is 1,2-dimyristoyl-sn-glycero-3-phosphoethanolamine-N-[methoxy (polyethylene glycol)-2000] or 1,2-dimyristoyl-rac-glycero-3-methoxypolyethylene glycol-2000.

18. The nanoparticle composition of claim 17, wherein the nanoparticle composition comprises the PEG-lipid in a range from 0.1 mol % to 10 mol % of the PEG-lipid per nanoparticle composition.

19. The nanoparticle composition of claim 12, further comprising at least one of a phospholipid and cholesterol or derivative thereof.

20. The nanoparticle composition of claim 19, wherein the phospholipid is 1,2-dioleoyl-sn-glycero-3-phosphoethanolamine (DOPE) or distearoylphosphatidylcholine (DSPC).

21. The nanoparticle composition of claim 19, wherein the nanoparticle composition comprises the phospholipid in a range from 10 mol % to 60 mol % of the phospholipid per nanoparticle composition.

22. The nanoparticle composition of claim 19, wherein the nanoparticle composition comprises the cholesterol or derivative thereof in a range from 20 mol % to 75 mol % of the cholesterol or derivative thereof per nanoparticle composition.

23. A method for treating a disease or condition in a subject comprising: administering a therapeutically effective amount of the nanoparticle composition of claim 12 to a subject.

24. A method for delivering a nucleic acid to a subject comprising administering the nanoparticle composition of claim 12 to the subject.

* * * * *